US008614042B2

(12) United States Patent
Fukuri et al.

(10) Patent No.: US 8,614,042 B2
(45) Date of Patent: Dec. 24, 2013

(54) ELECTROPHOTOGRAPHIC TONER

(75) Inventors: Norihiro Fukuri, Wakayama (JP);
Takashi Kubo, Wakayama (JP);
Yasunori Inagaki, Wakayama (JP)

(73) Assignee: Kao Corporation, Tokyo (JP)

( * ) Notice: Subject to any disclaimer, the term of this patent is extended or adjusted under 35 U.S.C. 154(b) by 113 days.

(21) Appl. No.: 13/258,248

(22) PCT Filed: Apr. 23, 2010

(86) PCT No.: PCT/JP2010/057238
§ 371 (c)(1),
(2), (4) Date: Sep. 21, 2011

(87) PCT Pub. No.: WO2010/123099
PCT Pub. Date: Oct. 28, 2010

(65) Prior Publication Data
US 2012/0021350 A1 Jan. 26, 2012

(30) Foreign Application Priority Data

| Apr. 23, 2009 | (JP) | 2009-105527 |
| Jun. 4, 2009 | (JP) | 2009-135003 |
| Aug. 10, 2009 | (JP) | 2009-185781 |
| Oct. 23, 2009 | (JP) | 2009-244075 |
| Dec. 28, 2009 | (JP) | 2009-297939 |

(51) Int. Cl.
*G03G 9/087* (2006.01)
*C09D 135/02* (2006.01)

(52) U.S. Cl.
USPC .............. 430/109.4; 430/137.14; 524/13; 524/494

(58) Field of Classification Search
USPC ............... 524/13, 494; 430/109.4, 137.14
See application file for complete search history.

(56) References Cited

U.S. PATENT DOCUMENTS

| 4,814,417 | A | 3/1989 | Sugimori | |
| 6,080,530 | A * | 6/2000 | Shao et al. | 430/325 |
| 2001/0016614 | A1* | 8/2001 | Yamaguchi et al. | 524/13 |
| 2004/0058092 | A1* | 3/2004 | Sameuls et al. | 428/1.1 |
| 2005/0227157 | A1 | 10/2005 | Shirai | |
| 2005/0227160 | A1 | 10/2005 | Shirai et al. | |
| 2006/0157672 | A1* | 7/2006 | Mazaki et al. | 252/299.01 |
| 2007/0135615 | A1 | 6/2007 | Shirai et al. | |
| 2007/0219313 | A1* | 9/2007 | Mizuhata et al. | 524/599 |
| 2008/0248414 | A1 | 10/2008 | Mizuhata et al. | |

FOREIGN PATENT DOCUMENTS

| JP | 57-125217 | 4/1986 |
| JP | 63-254127 | 10/1988 |
| JP | 11-7156 | 1/1999 |
| JP | 2001-13726 | 1/2001 |
| JP | 2005-300867 | 10/2005 |
| JP | 2005-321747 | 11/2005 |
| JP | 2006-71970 | 3/2006 |
| JP | 2007-163682 | 6/2007 |
| JP | 2007-248582 | 9/2007 |
| JP | 2008-51873 | 3/2008 |

OTHER PUBLICATIONS

U.S. Appl. No. 13/498,501, filed Mar. 27, 2012, Fukuri, et al.
U.S. Appl. No. 13/498,471, filed Mar. 27, 2012, Fukuri, et al.
International Search Report issued Aug. 10, 2010, in PCT/JP2010/057238.
Qianjin Zhao, et al., "Syntheses and photoluminescence properties of UV Photocrosslinkable polyesters based on fluorene", Polymer, vol. 50, No. 4, Feb. 9, 2009, pp. 998-1004.
Jie Du, et al., "Synthesis and characterization of Poly(L-lactic acid) reinforced by biomesogenic units", Polymer Degradation and Stability, vol. 93, No. 4, Apr. 2008, pp. 838-845.
Fukuji Higashi, et al., "Preparation of Aromatic Copolyesters from Hydroxycinnamic Acids and Hydroxybenzoic Acids", Makromolekulare Chemie, Rapid Communications, vol. 2, No. 1, Mar. 16, 1981, pp. 29-33.
Joaquin A. Palacios, et al., "Poly(ferulic acid) by oxalyl chloride activated Polycondensation", New Polymeric Materials, vol. 2, No. 2, 1990, pp. 167-174.
Chinese Office Action issued Oct. 31, 2012 in Patent Application No. 201080017466.2 with English Translation.
Office Action issued Mar. 4, 2013 in Japanese Patent Application No. 2009-185781.

* cited by examiner

*Primary Examiner* — Hoa V Le
(74) *Attorney, Agent, or Firm* — Oblon, Spivak, McClelland, Maier & Neustadt, L.L.P.

(57) ABSTRACT

A polyester resin for a toner, obtained by polycondensing a carboxylic acid component and an alcohol component, wherein the carboxylic acid component and/or the alcohol component contains an aromatic compound represented by the formula (Ia):

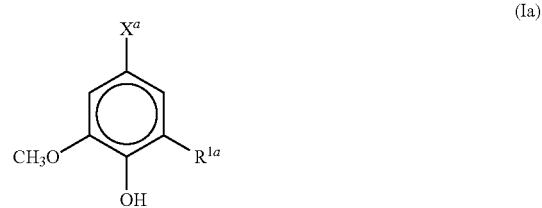

(Ia)

wherein $R^{1a}$ is a hydrogen atom, a hydroxyl group, or a methoxy group; and $X^a$ is a hydrogen atom, an aldehyde group, an allyl group, a vinyl group, a methoxy group, or a hydroxyl group or carboxyl group which may have a linking group. The toner for electrophotography containing a polyester resin for a toner of the present invention is suitably used for a resin binder of a toner used in developing and the like of latent images formed in electrophotography, electrostatic recording method, electrostatic printing method or the like.

18 Claims, No Drawings

ELECTROPHOTOGRAPHIC TONER

CROSS REFERENCE TO RELATED APPLICATION

This application is a 371 of PCT/JP2010/057238, filed on Apr. 23, 2010, and claims priority to the following Japanese Patent Applications: 2009-105527, filed on Apr. 23, 2009; 2009-135003, filed on Jun. 4, 2009; 2009-185781, filed on Aug. 10, 2009; 2009-244075, filed on Oct. 23, 2009; and 2009-297939, filed on Dec. 28, 2009.

TECHNICAL FIELD

The present invention relates to a polyester resin for a toner usable in developing latent images formed in electrophotography, electrostatic recording method, electrostatic printing method or the like, a resin binder for use in a toner containing the polyester resin, and a toner for electrophotography containing the resin binder.

BACKGROUND ART

In the recent years, with the advancement of speeding up of the machines and energy conservation, a toner having excellent low-temperature fixing ability is required. In view of the above, as a resin binder for use in a toner, numerous studies on polyesters having excellent low-temperature fixing ability are made, and among them, a polyester obtained by using a carboxylic acid having an aromatic ring as a raw material monomer capable of improving glass transition temperature while maintaining a low softening point is used. However, a toner using the polyester has a disadvantage that initial rise of triboelectric charging is delayed.

Patent Publication 1 discloses, as an objective of providing a toner having excellent initial rise in triboelectric charging, and moisture-resistant, heat-resistant storage ability, a toner for electrostatic image development containing at least a resin binder, a wax, a colorant, and a charge control agent, the toner for electrostatic image development characterized in that a metal complex of an aromatic hydroxycarboxylic acid is used as the charge control agent, and further that a hydroxylated aromatic hydroxycarboxylic acid compound is contained as a third substance.

Patent Publication 2 discloses a toner obtained by dissolving or dispersing toner materials containing at least a resin binder and a charge control agent in an organic solvent to provide a solution or dispersion, dispersing a solution or dispersion in an aqueous medium, and removing the organic solvent from the dispersion, characterized in that the above-mentioned resin binder at least has an ionically bindable functional group, and that the charge control agent is ionically bonded to the above-mentioned resin binder in the internal of the above-mentioned toner.

Patent Publication 3 discloses, as an objective of providing a toner having excellent low-temperature fixing ability and offset resistance, and being capable of reducing stains in the machines, a polyester for a toner obtained by polycondensing an alcohol component and a carboxylic acid component containing 0.5 to 50% by mol of an alkylsuccinic acid having 10 or more carbon atoms and/or an alkenylsuccinic acid having 10 or more carbon atoms, wherein a polyester for a toner having amounts of 6-methyl-2-heptanone and 5-methyl-2-heptanone detected of 0.5 ppm or less each according to thermal desorption-gas chromatograph-mass spectrometry.

Patent Publication 4 discloses a polyester having excellent hydrolytic resistance usable in the production of a toner including the step of forming particles from raw material components containing a resin binder containing at least a polyester in an aqueous medium or a solution, the polyester being obtainable by polycondensing an alcohol component and a carboxylic acid component containing at least one member selected from alkylsuccinic acids and alkenylsuccinic acids, and a polyester for use in a toner for electrophotography having excellent storage property and fixing ability, containing the above polyester.

In addition, as a resin binder for a toner, a resin binder for a toner containing a crystalline polyester and an amorphous polyester resin is proposed.

In addition, Patent Publication 5 discloses a resin binder for a toner having excellent low-temperature fixing ability, environmental stability, and blocking resistance, the resin binder for a toner containing crystalline polyester and amorphous polyester resins, wherein the crystalline polyester is obtainable by polycondensing an alcohol component containing 70% by mol or more of an aliphatic diol having 2 to 8 carbon atoms, and a carboxylic acid component containing 70% by mol or more of an aromatic dicarboxylic acid compound.

Patent Publication 6 discloses, as a resin binder for a toner having not only excellent low-temperature fixing ability and triboelectric chargeability, but also excellent in dynamic strength, and having excellent durability even in a nonmagnetic monocomponent development method, a resin binder for a toner containing a crystalline polyester for a toner and an amorphous resin, wherein the crystalline polyester for a toner is a polyester obtained by polycondensing an alcohol component containing 70% by mol or more of 1,6-hexanediol and a carboxylic acid component containing 70% by mol or more of an aromatic carboxylic acid compound.

PRIOR ART PUBLICATIONS

Patent Publications

Patent Publication 1: Japanese Patent Laid-Open No. 2006-71970
Patent Publication 2: Japanese Patent Laid-Open No. 2008-51873
Patent Publication 3: Japanese Patent Laid-Open No. 2007-163682
Patent Publication 4: Japanese Patent Laid-Open No. 2007-248582
Patent Publication 5: Japanese Patent Laid-Open No. 2005-300867
Patent Publication 6: Japanese Patent Laid-Open No. 2005-321747

SUMMARY OF THE INVENTION

Problems to be Solved by the Invention

However, in a toner meeting the needs of speeding-up of the machines, further improvement in initial rise in triboelectric charging is desired.

The present invention relates to a toner for electrophotography, which is capable of improving initial rise in triboelectric charging, while maintaining low-temperature fixing ability and storage property of the toner, a resin binder for use in the toner, and a polyester resin for a toner.

Also, the present invention relates to a polyester resin for a toner, having excellent initial rise in triboelectric charging and triboelectric stability under high-temperature, high-humidity conditions, while maintaining excellent low-temperature fixing ability and storage property, a resin binder containing the polyester resin; and a toner for electrophotography containing the resin binder.

In addition, the present invention relates to a polyester resin for a toner, which is capable of improving initial rise in triboelectric charging, while maintaining low-temperature fixing ability, storage property and hot offset resistance of the toner, a resin binder containing the polyester resin, and a toner for electrophotography containing the resin binder.

The present invention also relates to a polyester resin for a toner, which is capable of improving initial rise in triboelectric charging, while maintaining low-temperature fixing ability, storage property and durability of the toner, and a method for production thereof, a polyester resin for a toner containing the polyester resin; a resin binder containing the polyester resin; and a toner for electrophotography containing the resin binder.

Means to Solve the Problems

The present invention relates to:
[1] a polyester resin for a toner, obtained by polycondensing a carboxylic acid component and an alcohol component, wherein the carboxylic acid component and/or the alcohol component contains an aromatic compound represented by the formula (Ia):

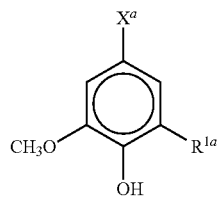

(Ia)

wherein $R^{1a}$ is a hydrogen atom, a hydroxyl group, or a methoxy group; and $X^a$ is a hydrogen atom, an aldehyde group, an allyl group, a vinyl group, a methoxy group, or a hydroxyl group or carboxyl group which may have a linking group;

[2] a polyester resin for a toner, obtained by polycondensing
a reaction product of one or more aromatic compounds themselves, represented by the formula (Ib):

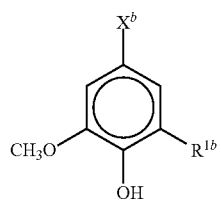

(Ib)

wherein $R^{1b}$ is a hydrogen atom, a hydroxyl group, or a methoxy group; and $X^b$ is a hydroxyl group or carboxyl group which may have a linking group, and
at least one of the carboxylic acid component and the alcohol component;

[3] a polyester resin for a toner obtained by polycondensing:
a reaction product obtained by reacting an aromatic compound represented by the formula (Ic):

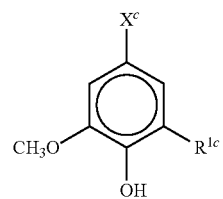

(Ic)

wherein $R^{1c}$ is a hydrogen atom, a hydroxyl group or a methoxy group; and $X^c$ is an unsaturated hydrocarbon group which may have a hydroxyl group or carboxyl group, and a carboxylic acid having an unsaturated reactive group,
a carboxylic acid component, and
an alcohol component;

[4] a resin binder for use in a toner for electrophotography, containing the polyester resin for a toner as defined in any one of the above [1] to [3];

[5] a resin binder for use in a toner for electrophotography containing a high-softening point resin and a low-softening point resin, of which softening points differ by 10° C. or more, wherein at least one of the high-softening point resin and the low-softening point resin is the polyester resin as defined in any one of the above [1] to [3];

[6] a resin binder for use in a toner for electrophotography containing an amorphous resin and a crystalline resin, wherein both of the amorphous resin and the crystalline resin are polycondensation resins obtained by polycondensing an alcohol component and a carboxylic acid component, and wherein at least one of the amorphous resin and the crystalline resin is the polyester resin as defined in any one of the above [1];

[7] a toner for electrophotography containing the resin binder as defined in the above [4] to [6]; and

[8] a toner for electrophotography obtained by a method including the step of forming particles from raw materials containing a resin binder in an aqueous medium, wherein the resin binder contains the polyester resin as defined in the above [1] to [3].

Effects of the Invention

The toner for electrophotography of the present invention exhibits an excellent effect that initial rise in triboelectric charging can be improved, while maintaining low-temperature fixing ability and storage property. In addition, since a specified succinic acid derivative is used as a carboxylic acid component in a polyester resin used as a resin binder, triboelectric stability under high-temperature, high-humidity conditions is even more improved. Also, since a reaction product formed between specified aromatic compounds themselves is used in a polyester resin used as a resin binder, hot offset resistance is even more improved. In addition, a reaction product formed between a specified aromatic compound and a carboxylic acid having an unsaturated reactive group is used in a polyester resin used as a resin binder, durability is even more improved. Also, since a polyester resin is used in a toner for electrophotography obtained by a method including the step of forming particles from raw material components containing a resin binder in an aqueous medium, triboelectric stability under high-temperature, high-humidity conditions and resistance to background fogging are improved.

MODES FOR CARRYING OUT THE INVENTION

A feature of the polyester resin for a toner of the present invention resides in that the resin is obtained using an aromatic compound having a specified basic structure in which a hydroxyl group and a methoxy group are bound to adjacent carbon atoms. There are the following three Embodiments (Embodiments A to C).

Embodiment A

A polyester resin for a toner, obtained by polycondensing a carboxylic acid component and an alcohol component, wherein the carboxylic acid component and/or the alcohol component contains an aromatic compound represented by the formula (Ia):

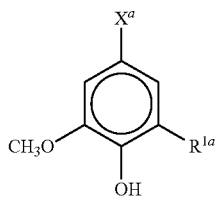

(Ia)

wherein $R^{1a}$ is a hydrogen atom, a hydroxyl group, or a methoxy group; and $X^a$ is a hydrogen atom, an aldehyde group, an allyl group, a vinyl group, a methoxy group, or a hydroxyl group or carboxyl group which may have a linking group.

Embodiment B

A polyester resin for a toner, obtained by polycondensing
a reaction product (reaction product (i)) of one or more aromatic compounds themselves, represented by the formula (Ib):

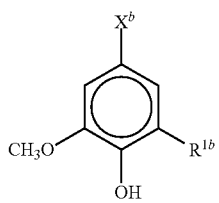

(Ib)

wherein $R^{1b}$ is a hydrogen atom, a hydroxyl group, or a methoxy group; and $X^b$ is a hydroxyl group or carboxyl group which may have a linking group, and
at least one of the carboxylic acid component and the alcohol component.

Embodiment C

A polyester resin for a toner obtained by polycondensing:
a reaction product (reaction product (ii)) obtained by reacting an aromatic compound represented by the formula (Ic):

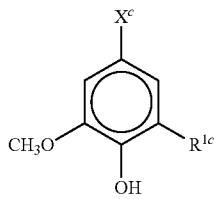

(Ic)

wherein $R^{1c}$ is a hydrogen atom, a hydroxyl group or a methoxy group; and $X^c$ is an unsaturated hydrocarbon group which may have a hydroxyl group or carboxyl group, and a carboxylic acid having an unsaturated reactive group,
a carboxylic acid component, and
an alcohol component.

The polyester resin for a toner of the present invention has excellent initial rise in triboelectric charging, while maintaining low-temperature fixing ability and storage property of the toner. Though the details of the reasons therefor are unclear, it is presumably as described below. Since the aromatic compound used in the present invention has an aromatic ring, in a case where the compound is used as a monomer for a polyester, a glass transition temperature can be increased, while having a low softening point. Besides, as compared with conventional phthalic acid and isophthalic acid, since a methoxy group having an electron donating property is bound an aromatic ring at a position adjacent to a hydroxyl group, a monomer having a phenolic hydroxyl group has a higher pKa (isoelectric point), so that electrons are stored in the aromatic ring, thereby increasing electron density in the aromatic ring, whereby consequently initial rise in triboelectric charging is improved. The number of the methoxy groups on the carbon atom positioned adjacent to the carbon atom to which a hydroxyl group is bound may be at least one to improve initial rise in triboelectric charging of the toner, or the number may be two.

First, the polyester resin of Embodiment A will be described.

A major feature of Embodiment A resides in that the resin is obtained by polycondensing a carboxylic acid component and an alcohol component, wherein the carboxylic acid component and/or the alcohol component contains an aromatic compound represented by the formula (Ia):

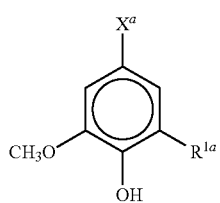

(Ia)

wherein $R^{1a}$ is a hydrogen atom, a hydroxyl group, or a methoxy group; and $X^a$ is a hydrogen atom, an aldehyde group, an allyl group, a vinyl group, a methoxy group, or a hydroxyl group or carboxyl group which may have a linking group.

In $X^a$, the linking group that the hydroxyl group or carboxyl group may have is preferably a divalent hydrocarbon group having an unsaturated bond, and desirably a divalent hydrocarbon group having preferably 2 to 4 carbon atoms, and more preferably 2 or 3 carbon atoms. In a case of without having a linking group, $X^a$ would be a hydroxyl group or a carboxyl group. Specific examples of more preferred $X^a$ include a group represented by —CH═CH—COOH or —CH═CH—CH$_2$OH. Here, the carboxyl group may be an alkyl(1 to 3 carbon atoms) ester, provided that when $X^a$ is a carboxyl group, namely a carboxyl group without a linking group, $R^{1a}$ preferably is a methoxy group.

As preferable combinations of $R^{1a}$ and $X^a$, in a case where $R^{1a}$ is a hydrogen atom, it is preferable that $X^a$ is an aldehyde group, an allyl group, a vinyl group, a methoxy group, or a hydroxyl group or carboxyl group which may have a linking group. In a case where $R^{1a}$ is a hydroxyl group, it is preferable that $X^a$ is a methoxy group, or a hydroxyl group or carboxyl group which may have a linking group. Also, in a case where $R^{1a}$ is a methoxy group, it is preferable that $X^a$ is a hydrogen atom, an aldehyde group, or a hydroxyl group or carboxyl group which may have a linking group.

The aromatic compound has a molecular weight of preferably 1,000 or less, more preferably 800 or less, even more preferably 400 or less, and still even more preferably 300 or less, from the viewpoint of reactivity in the polycondensation. In addition, the lower limit is 124, which is the case where both of $R^{1a}$ and $X^a$ are hydrogen atoms.

The aromatic compound represented by the formula (Ia) acts as any component of the carboxylic acid component and the alcohol component during the polycondensation, depending on the kinds of the functional group, as a raw material monomer for a polyester. A hydroxycarboxylic acid is polycondensed mainly as a carboxylic acid component; therefore, in the present invention, for the sake of convenience, in a case where the aromatic compound is a hydroxycarboxylic acid in which $X^a$ has a carboxyl group, the aromatic compound is regarded as a carboxylic acid component, and in a case where the aromatic compound is an alcohol in which $X^a$ has no carboxyl groups, the aromatic compound is regarded as an alcohol component, to be used in the calculation of the content or the molar ratio. In general, the reactivity of a hydroxyl group bound directly to an aromatic ring is low. The aromatic compound represented by the formula (Ia) is considered to have an increased reactivity because a methoxy group is bound to a carbon atom positioned adjacent to the carbon atom to which a hydroxyl group is bound.

In the aromatic compound represented by the formula (Ia), an aromatic compound to be used as the carboxylic acid component is preferably at least one hydroxycarboxylic acid selected from the group consisting of ferulic acid ($X^a$: —CH═CH—COOH, $R^{1a}$: hydrogen atom), 5-hydroxyferulic acid ($X^a$: —CH═CH—COOH, $R^{1a}$: hydroxyl group), sinapic acid ($X^a$: —CH═CH—COOH, methoxy group), vanillic acid ($X^a$: —COOH, $R^{1a}$: H) and syringic acid ($X^a$: —COOH, methoxy group), and more preferably at least one hydroxycarboxylic acid selected from the group consisting of ferulic acid, 5-hydroxyferulic acid, sinapic acid and syringic acid, from the viewpoint of initial rise in triboelectric charging, triboelectric stability and resistance to background fogging of the toner.

Also, the aromatic compound used as the alcohol component includes mono-alcohols (phenolic hydroxyl group), such as vanillin ($X^a$: —CHO, $R^{1a}$: hydrogen atom), eugenol ($X^a$: —CH$_2$—CH═CH$_2$, $R^{1a}$: hydrogen atom), 2-methoxy-4-vinylphenol ($X^a$: —CH═CH$_2$, $R^{1a}$: hydrogen atom), 2,4-dimethoxyphenol ($X^a$: methoxy group, Rh: hydrogen atom), and 2,6-dimethoxyphenol ($X^a$: hydrogen atom, $R^{1a}$: methoxy group); and diols (containing phenolic hydroxyl group), such as coniferyl alcohol ($X^a$: —CH═CH—CH$_2$OH, $R^{1a}$: hydrogen atom), 5-hydroxyconiferyl alcohol ($X^a$: —CH═CH—CH$_2$OH, $R^{1a}$: hydroxyl group), and sinapyl alcohol ($X^a$: —CH═CH—CH$_2$OH, $R^{1a}$: methoxy group). Among them, the diols are preferred, and at least one diol selected from the group consisting of coniferyl alcohol, 5-hydroxyconiferyl alcohol and sinapyl alcohol is more preferred, from the viewpoint of initial rise in triboelectric charging, triboelectric stability and resistance to background fogging of the toner.

In the polyester resin for a toner of the present invention, the aromatic compound represented by the formula (Ia) may be contained in any one of the carboxylic acid component and the alcohol component, or both. In addition, two or more kinds of aromatic compounds represented by the formula (Ia) may be used.

The aromatic compound represented by the formula (Ia) is contained in an amount of preferably from 0.5 to 80% by mol, more preferably from 2.5 to 80% by mol, even more preferably from 2.5 to 60% by mol, still even more preferably from 5 to 50% by mol, and still even more preferably from 5 to 25% by mol, of a total amount of the carboxylic acid component and the alcohol component constituting the polyester resin, from the viewpoint of storage property, initial rise in triboelectric charging, triboelectric stability under high-temperature, high-humidity conditions, and resistance to background fogging of the toner.

In a case where an aromatic compound represented by the formula (Ia) is a hydroxycarboxylic acid, the hydroxycarboxylic acid is contained in an amount of preferably from 5 to 100% by mol, preferably from 5 to 90% by mol, more preferably from 10 to 90% by mol, still even more preferably from 10 to 80% by mol, and still even more preferably from 10 to 50% by mol, of a total amount of the carboxylic acid component constituting the polyester resin, from the viewpoint of initial rise in triboelectric charging, triboelectric stability under high-temperature, high-humidity conditions, and resistance to background fogging of the toner.

In a case where an aromatic compound represented by the formula (Ia) is a diol having no carboxyl groups, the diol is contained in an amount of preferably from 5 to 100% by mol, more preferably from 10 to 100% by mol, even more preferably from 10 to 80% by mol, and still even more preferably from 10 to 50% by mol, of a total amount of the alcohol component constituting the polyester resin, from the viewpoint of initial rise in triboelectric charging, triboelectric stability under high-temperature, high-humidity conditions, and resistance to background fogging of the toner.

In a case where an aromatic compound represented by the formula (Ia) is a mono-alcohol having no carboxyl groups, the mono-alcohol is contained in an amount of preferably from 1 to 80% by mol, more preferably from 3 to 70% by mol, and even more preferably from 5 to 50% by mol, of a total amount of the alcohol component constituting the polyester resin, from the viewpoint of initial rise in triboelectric charging, triboelectric stability under high-temperature, high-humidity conditions and resistance to background fogging of the toner.

The carboxylic acid component and the alcohol component used in the polyester resin for use in a toner of the present invention may contain a carboxylic acid compound and/or an alcohol other than the above-mentioned aromatic compound.

As the alcohol component other than the above-mentioned aromatic compound, preferred is an alkylene oxide adduct of bisphenol A represented by the formula (II):

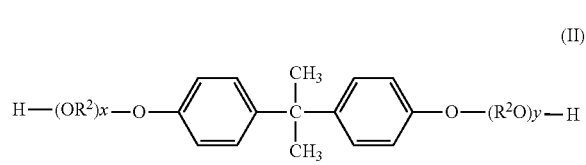

wherein $R^2O$ and $OR^2$ are an oxyalkylene group, wherein $R^2$ is an ethylene group and/or a propylene group; and each of x and y is a positive number showing an average number of moles of alkylene oxide added, wherein an average number of the sum of x and y is preferably from 1 to 16, more preferably from 1 to 8, and even more preferably from 1.5 to 4, or an aliphatic diol.

The alkylene oxide adduct of bisphenol A is preferred from the viewpoint of the storage property of the toner.

Specific examples of the alkylene oxide adduct of bisphenol A represented by the formula (II) include an alkylene oxide adduct of bisphenol A, such as a polyoxypropylene adduct of 2,2-bis(4-hydroxyphenyl)propane and a polyoxyethylene adduct of 2,2-bis(4-hydroxyphenyl)propane; and the like.

The above-mentioned alkylene oxide adduct of bisphenol A is contained in an amount of preferably from 20 to 100% by mol, more preferably from 30 to 100% by mol, and even more preferably from 50 to 100% by mol, of the alcohol component, from the viewpoint of storage property of the toner.

In a case where the above-mentioned aromatic compound is used as a carboxylic acid component, i.e. in a case where the aromatic compound represented by the formula (Ia) is a hydroxycarboxylic acid having a carboxyl group, hereinafter referred to the same, the above-mentioned alkylene oxide adduct of bisphenol A is contained in an amount of preferably from 30 to 100% by mol, more preferably from 50 to 100% by mol, and even more preferably from 80 to 100% by mol, of the alcohol component, from the viewpoint of storage property of the toner.

In a case where the above-mentioned aromatic compound is used as an alcohol component, i.e. in a case where the aromatic compound represented by the formula (Ia) is an alcohol having no carboxyl groups, hereinafter referred to the same, or in a case where the above-mentioned aromatic compound is used in both of an alcohol component and a carboxylic acid component, the above-mentioned alkylene oxide adduct of bisphenol A is contained in an amount of preferably from 0 to 90% by mol, more preferably from 20 to 80% by mol, and even more preferably from 30 to 80% by mol, of the alcohol component, from the viewpoint of storage property of the toner.

It is preferable that the aliphatic diol is an aliphatic diol having preferably 2 to 8 carbons atoms, and more preferably 2 to 6 carbons atom, from the viewpoint of low-temperature fixing ability of the toner.

The aliphatic diol includes ethylene glycol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 1,4-butenediol, neopentyl glycol, 2,3-butanediol, 2,3-pentanediol, 2,4-pentanediol, 2,3-hexanediol, 3,4-hexanediol, 2,4-hexanediol, 2,5-hexanediol, and the like.

Among them, aliphatic diols having a hydroxyl group bound to a secondary carbon atom are preferred, from the viewpoint of being excellent in low-temperature fixing ability and storage stability of the toner. The aliphatic diols have preferably 3 to 8 carbon atoms, and more preferably 3 to 6 carbon atoms, from the viewpoint of low-temperature fixing ability and storage property. Specific preferred examples include 1,2-propanediol, 1,2-butanediol, 1,3-butanediol, 2,3-butanediol, 1,2-pentanediol, 1,3-pentanediol, 2,3-pentanediol, 2,4-pentanediol, and the like.

Therefore, in a case the above-mentioned aromatic compound is used as a carboxylic acid component, the carboxylic acid component containing at least one hydroxycarboxylic acid selected from the group consisting of ferulic acid ($X^a$: —CH=CH—COOH, $R^{1a}$: hydrogen atom), 5-hydroxyferulic acid ($X^a$: —CH=CH—COOH, $R^{1a}$: hydroxyl group), vanillic acid ($X^a$: —COOH, $R^{1a}$: H), sinapic acid ($X^a$: —CH=CH—COOH, $R^{1a}$: methoxy group), and syringic acid ($X^a$: —COOH, $R^{1a}$: methoxy group), a polyester resin obtainable therefrom with the above-mentioned aliphatic diol is preferred, from the viewpoint of increased reactivity and a balance among low-temperature fixing ability, storage property and initial rise in triboelectric charging.

The aliphatic diol is contained in an amount of preferably from 20 to 100% by mol, more preferably from 30 to 100% by mol, and even more preferably from 50 to 100% by mol, of the alcohol component, from the viewpoint of low-temperature fixing ability of the toner.

In a case where the above-mentioned aromatic compound is used as a carboxylic acid component, the above-mentioned aliphatic diol is contained in an amount of preferably from 30 to 100% by mol, more preferably from 50 to 90% by mol, and even more preferably from 80 to 100% by mol, of the alcohol component, from the viewpoint of low-temperature fixing ability of the toner.

In a case where the above-mentioned aromatic compound is used as an alcohol component, or in a case where the above-mentioned aromatic compound is used in both of an alcohol component and a carboxylic acid component, the above-mentioned aliphatic diol is contained in an amount of preferably from 0 to 90% by mol, more preferably from 20 to 80% by mol, and even more preferably from 30 to 80% by mol, of the alcohol component, from the viewpoint of low-temperature fixing ability of the toner.

As other alcohols, a trihydric or higher polyhydric alcohol such as glycerol, pentaerythritol, or trimethylolpropane may be used.

As a carboxylic acid component other than the above-mentioned aromatic compound, an aromatic dicarboxylic acid compound or an aliphatic dicarboxylic acid compound is preferred. In the present invention, carboxylic acids and derivatives such as acid anhydrides and alkyl(1 to 3 carbon atoms) esters are collectively referred to as the carboxylic acid compound.

An aromatic dicarboxylic acid compound such as phthalic acid, isophthalic acid, or terephthalic acid is preferred, from the viewpoint of low-temperature fixing ability and storage property of the toner.

Therefore, in a case where the above-mentioned aromatic compound is used as an alcohol component, the alcohol component containing at least one diol selected from the group consisting of coniferyl alcohol ($X^a$: —CH=CH—CH$_2$OH, $R^{1a}$: hydrogen atom), 5-hydroxyconiferyl alcohol ($X^a$: —CH=CH—CH$_2$OH, $R^{1a}$: hydroxyl group), and sinapyl alcohol ($X^a$: —CH=CH—CH$_2$OH, $R^{1a}$: methoxy group), a polyester resin obtained therefrom with a carboxylic acid containing an aromatic dicarboxylic acid compound is preferred, from the viewpoint of the balance among low-temperature fixing ability, storage property and initial rise in triboelectric charging.

The aromatic dicarboxylic acid compound is contained in an amount of preferably from 20 to 100% by mol, more preferably from 30 to 90% by mol, and even more preferably from 40 to 80% by mol, of the carboxylic acid component, from the viewpoint of low-temperature fixing ability and storage property of the toner.

In a case where the above-mentioned aromatic compound is used as a carboxylic acid component, or in a case where the above-mentioned aromatic compound is used in both of an alcohol component and a carboxylic acid component, the above-mentioned aromatic dicarboxylic acid compound is contained in an amount of preferably from 20 to 90% by mol, more preferably from 30 to 90% by mol, and even more preferably from 30 to 80% by mol, of the carboxylic acid component, from the viewpoint of low-temperature fixing ability and storage property of the toner.

In a case where the above-mentioned aromatic compound is used as an alcohol component, the above-mentioned aromatic dicarboxylic acid compound is contained in an amount of preferably from 20 to 100% by mol, more preferably from 30 to 90% by mol, and even more preferably from 40 to 80% by mol, of the carboxylic acid component, from the viewpoint of low-temperature fixing ability and storage property of the toner.

Aliphatic dicarboxylic acid compounds, preferably aliphatic dicarboxylic acid compounds having 2 to 8 carbon atoms, such as oxalic acid, malonic acid, maleic acid, fumaric acid, citraconic acid, itaconic acid, glutaconic acid, succinic acid, adipic acid, sebacic acid, and azelaic acid are preferred, from the viewpoint of the low-temperature fixing ability.

In addition, it is preferable that the carboxylic acid component contains at least one succinic acid derivative selected from alkylsuccinic acids of which alkyl moiety has 9 to 18 carbon atoms and alkenylsuccinic acids of which alkenyl moiety has 9 to 18 carbon atoms, from the viewpoint of even more increasing low-temperature fixing ability and triboelectric stability under high-temperature, high-humidity conditions of the toner. Here, the succinic acid derivative may be an anhydride or a lower alkyl ester having 1 to 3 carbon atoms of alkylsuccinic acids of which alkyl moiety has 9 to 18 carbon atoms and alkenylsuccinic acids of which alkenyl moiety has 9 to 18 carbon atoms. The reasons why the triboelectric stability is increased under high-temperature, high-humidity conditions by the above-mentioned succinic acid derivative are presumably due to the fact that the above-mentioned aromatic compound having a specified structure increases hydrophobicity of a main chain of the polyester, and at the same time a succinic acid derivative having a long-chain hydrocarbon group having high hydrophobicity is used as a side chain, so that hygroscopicity is lowered.

The number of carbon atoms in the alkyl group or the alkenyl group in the alkylsuccinic acid and the alkenylsuccinic acid is from 9 to 18, and preferably from 9 to 14, and more preferably from 10 to 12, from the viewpoint of increasing low-temperature fixing ability, storage property and triboelectric stability under high-temperature, high-humidity conditions of the toner. Those alkyl group and alkenyl group may be linear or branched, and those groups are preferably branched, from the viewpoint of increasing triboelectric stability under high-temperature, high-humidity conditions.

Further, it is preferable that the succinic acid derivative is one comprising two or more members selected from the group consisting of alkylsuccinic acids having a branched alkyl group of 9 to 18 carbon atoms and preferably 9 to 14 carbon atoms, and alkenylsuccinic acids having a branched alkenyl group of 9 to 18 carbon atoms and preferably 9 to 14 carbon atoms, from the viewpoint of increasing low-temperature fixing ability and triboelectric stability under high-temperature, high-humidity conditions of the toner. Therefore, the succinic acid derivative is preferably one comprising two or more alkylsuccinic acids having a branched alkyl group of 9 to 18 carbon atoms and preferably 9 to 14 carbon atoms, or one comprising two or more alkenylsuccinic acids having a branched alkenyl group of 9 to 18 carbon atoms and preferably 9 to 14 carbon atoms, or one comprising one or more of each of the above-mentioned alkylsuccinic acids and the above-mentioned alkenylsuccinic acids.

By using succinic acid derivatives having branched alkyl groups and/or alkenyl groups with different numbers of carbon atoms in combination, the resulting resins have a broad endothermic peak near a glass transition temperature in accordance with the differential scanning calorimetry (DSC), so that the resins have very wide fixing temperature regions as a resin binder for use in a toner.

The "member" as used herein is originated from the alkyl group or the alkenyl group, and those having alkyl groups or alkenyl groups with different lengths of carbon chains and structural isomers are treated as different members of alkylsuccinic acids or alkenylsuccinic acids.

Specific examples of the branched alkyl group and alkenyl group having 9 to 18 carbon atoms include an isododecenyl group, an isododecyl group and the like.

It is preferable that the alkylsuccinic acid and alkenylsuccinic acid are those obtained from a compound having an alkylene group (alkylene compound), and at least one member selected from maleic acid, fumaric acid, and acid anhydrides thereof, from the viewpoint of improving storage property and low-temperature fixing ability, and triboelectric stability under high-temperature, high-humidity conditions of the toner.

It is preferable that the alkylene compound has 9 to 18 carbon atoms and preferably 9 to 14 carbon atoms, and specifically, those obtained from ethylene, propylene, isobutylene, normal butylene or the like, for example, a trimer thereof, a tetramer thereof or the like is preferably used. As a preferred raw material usable for the synthesis of the alkylene compound, propylene having a low molecular weight is preferable, from the viewpoint of increasing the number of structural isomers. In addition, the alkylene compound has preferably 2 or more, more preferably 10 or more, even more preferably 20 or more, and still even more preferably 30 or more of the peaks ascribed to an alkylene compound having 9 to 18 carbon atoms and preferably 9 to 14 carbon atoms in accordance with gas chromatography mass spectrometry under the measurement conditions described later, and the alkylene compound also preferably 80 or less, and more preferably 60 or less of the peaks, from the viewpoint that the polycondensation resin obtained from a succinic acid derivative has a very wide fixing temperature region as a resin binder for use in a toner.

Preferred catalysts usable in the synthesis of alkylene compound include liquid phosphoric acid, solid phosphoric acid, tungsten, boron trifluoride complex, and the like. Here, a method of carrying out random polymerization, and subjecting a reaction mixture to distillation to adjust the number is preferred, from the viewpoint of easiness in control of the number of structural isomers.

Meanwhile, among maleic acid, fumaric acid and acid anhydrides thereof, maleic anhydride is preferred from the viewpoint of reactivity.

The alkylsuccinic acid and alkenylsuccinic acid can be obtained by a known manufacturing method; for example, the alkylsuccinic acid and alkenylsuccinic acid can be obtained by mixing an alkylene compound and at least one member selected from maleic acid, fumaric acid and acid anhydrides thereof while heating, thereby utilizing of an ene reaction (see, JP-A-Sho-48-23405, JP-A-Sho-48-23404, U.S. Pat. No. 3,374,285, or the like).

The succinic acid derivative is contained in an amount of preferably from 3 to 60% by mol, more preferably from 5 to 45% by mol, and even more preferably from 10 to 40% by mol, of the carboxylic acid component, from the viewpoint of low-temperature fixing ability, storage property and triboelectric stability under high-temperature, high-humidity conditions of the toner.

The molar ratio of the succinic acid derivative to the above-mentioned aromatic compound, i.e. the succinic acid derivative/the above-mentioned aromatic compound, is preferably from 0.1 to 5, more preferably from 0.2 to 3, and even more preferably from 0.25 to 1.5, from the viewpoint of initial rise in triboelectric charging and triboelectric stability under high-temperature, high-humidity conditions.

The carboxylic acid component may contain, in addition to the succinic acid derivative, a dicarboxylic acid compound or a tricarboxylic or higher polycarboxylic acid compound.

The dicarboxylic acid compound includes aliphatic dicarboxylic acids such as oxalic acid, malonic acid, maleic acid, fumaric acid, citraconic acid, itaconic acid, glutaconic acid, succinic acid, adipic acid, sebacic acid, and azelaic acid; aromatic dicarboxylic acids such as phthalic acid, isophthalic acid, and terephthalic acid; alicyclic dicarboxylic acids such as cyclohexanedicarboxylic acid; anhydrides and alkyl(1 to 3 carbon atoms) esters of these acids; and the like. In the present invention, the acids, anhydrides of these acids, and alkyl esters of the acids as mentioned above are collectively referred to herein as the carboxylic acid compound.

In a case where the carboxylic acid component contains the above-mentioned succinic acid derivative, it is preferable that the carboxylic acid component contains an aromatic dicarboxylic acid compound, from the viewpoint of storage property. The aromatic dicarboxylic acid compound is contained in an amount of preferably from 10 to 80% by mol, more preferably from 20 to 80% by mol, and even more preferably from 20 to 70% by mol, of the carboxylic acid component, from the viewpoint of low-temperature fixing ability and storage property of the toner.

Other carboxylic acid compounds include alicyclic dicarboxylic acids such as cyclohexanedicarboxylic acid; tricarboxylic or higher polycarboxylic acid such as trimellitic acid and pyromellitic acid; rosins; rosins modified with fumaric acid, maleic acid, or acrylic acid; and the like.

The tricarboxylic or higher polycarboxylic acid compound includes aromatic carboxylic acids, such as 1,2,4-benzenetricarboxylic acid (trimellitic acid), 2,5,7-naphthalenetricarboxylic acid, and pyromellitic acid; and derivatives such as acid anhydrides and alkyl (1 to 3 carbon atoms) esters thereof.

It is desirable that the carboxylic acid component contains a tricarboxylic or higher polycarboxylic acid compound, preferably a trimellitic acid compound, and more preferably trimellitic anhydride, from the viewpoint of elevating molecular weight of the resin and increasing low-temperature fixing ability and storage property of the toner. The tricarboxylic or higher polycarboxylic acid compound is contained in an amount of preferably from 0.1 to 30% by mol, more preferably from 1 to 25% by mol, and even more preferably from 5 to 25% by mol, of the carboxylic acid component.

Here, the alcohol component may properly contain a monohydric alcohol, and the carboxylic acid component may properly contain a monocarboxylic acid compound, from the viewpoint of adjusting molecular weight of the resin and improving offset resistance of the toner.

The molar ratio of the carboxylic acid component to the alcohol component, i.e. the carboxylic acid component/the alcohol component, is preferably from 0.75 to 1.3, and more preferably from 0.8 to 1.3.

It is preferable that the polycondensation of the alcohol component and the carboxylic acid component is carried out at a temperature of from 160° to 250° C. in an inert gas atmosphere in the presence of an esterification catalyst such as a tin compound or a titanium compound, and the polycondensation reaction after the addition of the above-mentioned aromatic compound is carried out at preferably from 160° to 210° C., and more preferably from 170° to 200° C., from the viewpoint of reactivity and pyrolysis. More preferably, it is preferable that a dihydric alcohol component other than the above-mentioned aromatic compound and the carboxylic acid component are subjected to a polycondensation reaction, the above-mentioned aromatic compound is then added thereto, and the polycondensation reaction is carried out at a temperature mentioned above, from the viewpoint of reactivity and pyrolysis.

As the tin compound, for example, dibutyltin oxide is known; however, in the present invention, tin(II) compounds without containing a Sn—C bond are preferred from the viewpoint of excellent dispersibility in the polyester.

As the tin(II) compound without containing a Sn—C bond, a tin(II) compound having a Sn—O bond, a tin(II) compound having a Sn—X bond, wherein X is a halogen atom, or the like is preferable, and the tin(II) compound having a Sn—O bond is more preferable.

The tin(II) compound having a Sn—O bond includes tin (II) carboxylates having a carboxylate group having 2 to 28 carbon atoms, such as tin(II) oxalate, tin(II) acetate, tin(II) octanoate, tin(II) 2-ethylhexanoate, tin(II) laurate, tin(II) stearate, and tin(II) oleate; alkoxy tin(II) compound having an alkoxy group having 2 to 28 carbon atoms, such as octyloxy tin(II), lauroxy tin(II), stearoxy tin(II), and oleyloxy tin(II); tin(II) oxide; tin(II) sulfate; and the like. The tin(II) having a Sn—X bond, wherein X is a halogen atom, includes tin(II) halides, such as tin(II) chloride and tin(II) bromide, and the like. Among them, a fatty acid tin(II) represented by $(R^3COO)_2Sn$, wherein $R^3$ is an alkyl group or an alkenyl group having 5 to 19 carbon atoms, an alkoxy tin(II) represented by $(R^4O)_2Sn$, wherein $R^4$ is an alkyl group or alkenyl group having 6 to 20 carbon atoms, and tin(II) oxide represented by SnO are preferable; the fatty acid tin(II) represented by $(R^3COO)_2Sn$ and tin oxide (II) are more preferable; tin(II) octanoate, tin(II) 2-ethylhexanoate, tin(II) stearate, and tin (II) oxide are even more preferable, from the viewpoint of an effect in initial rise in triboelectric charging and catalytic ability.

The titanium compound is preferably a titanium compound having a Ti—O bond, and a titanium compound having an alkoxy group having a total of 1 to 28 carbon atoms, an alkenyloxy group having a total of 2 to 28 carbon atoms, or an acyloxy group having a total of 1 to 28 carbon atoms.

Specific examples of the titanium compound include titanium diisopropylate bis(triethanolaminate) $[Ti(C_6H_{14}O_3N)_2(C_3H_7O)_2]$, titanium diisopropylate bis(diethanolaminate) $[Ti(C_4H_{10}O_2N)_2(C_3H_7O)_2]$, titanium dipentylate bis(triethanolaminate) $[Ti(C_6H_{14}O_3N)_2(C_5H_{11}O)_2]$, titanium diethylate bis(triethanolaminate) $[Ti(C_6H_{14}O_3N)_2(C_2H_5O)_2]$, titanium dihydroxyoctylate bis(triethanolaminate) $[Ti(C_6H_{14}O_3N)_2(OHC_8H_{16}O)_2]$, titanium distearate bis(triethanolaminate) $[Ti(C_6H_{14}O_3N)_2(C_{18}H_{37}O)_2]$, titanium triisopropylate triethanolaminate $[Ti(C_6H_{14}O_3N)(C_3H_7O)_3]$, titanium monopropylate tris(triethanolaminate) $[Ti(C_6H_{14}O_3N)_3(C_3H_7O)]$, and the like. Among them, titanium diisopropylate bis(triethanolaminate), titanium diisopropylate bis(diethanolaminate) and titanium dipentylate bis(triethanolaminate) are preferable, which are available as marketed products, for example, of Matsumoto Trading Co., Ltd.

Specific examples of other preferred titanium compounds include tetra-n-butyl titanate $[Ti(C_4H_9O)_4]$, tetrapropyl titanate $[Ti(C_3H_7O)_4]$, tetrastearyl titanate $[Ti(C_{18}H_{37}O)_4]$, tetramyristyl titanate $[Ti(C_{14}H_{29}O)_4]$, tetraoctyl titanate $[Ti(C_8H_{17}O)_4]$, dioctyl dihydroxyoctyl titanate $[Ti(C_8H_{17}O)_2(OHC_8H_{16}O)_2]$, dimyristyl dioctyl titanate $[Ti(C_{14}H_{29}O)_2(C_8H_{17}O)_2]$, and the like. Among them, tetrastearyl titanate, tetramyristyl titanate, tetraoctyl titanate and dioctyl dihydroxyoctyl titanate are preferable. These titanium compounds can be obtained by, for example, reacting a titanium halide with a corresponding alcohol, or are also available as marketed products of Nisso, or the like.

The above-mentioned tin (II) compounds and titanium compounds may be used alone or in combination with two or more members.

The esterification catalyst is present in an amount of preferably from 0.01 to 2.0 parts by weight, more preferably from 0.1 to 1.5 parts by weight, and even more preferably from 0.2 to 1.0 part by weight, based on 100 parts by weight of a total amount of the alcohol component and the carboxylic acid component. Here, the amount of the esterification catalyst present means an entire formulation amount of the catalysts used in the polycondensation reaction.

It is preferable that a pyrogallol compound having a benzene ring of which three hydrogen atoms bound to carbon atoms adjacent to each other are substituted by hydroxyl groups is used together with an esterification catalyst, from the viewpoint of increasing reactivity of the aromatic compound used in the present invention and improving storage property of the toner.

The pyrogallol compound includes pyrogallol, pyrogallic acid, pyrogallic acid esters, benzophenone derivatives such as 2,3,4-trihydroxybenzophenone and 2,2',3,4-tetrahydroxybenzophenone, catechin derivatives such as epigallocatechin and epigallocatechin gallate, and the like. Among them, a compound represented by the formula (III):

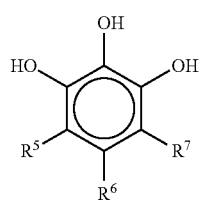

(III)

wherein each of $R^5$ to $R^7$ is independently a hydrogen atom or —$COOR^8$, wherein $R^8$ is a hydrogen atom or a hydrocarbon group having 1 to 12 carbon atoms, preferably an alkyl group having 1 to 12 carbon atoms or an alkenyl group having 2 to 12 carbon atoms, is preferable, from the viewpoint of durability of the resin obtained. In the formula, the hydrocarbon group of $R^8$ has preferably 1 to 8 carbon atoms, and more preferably 1 to 4 carbon atoms, from the viewpoint of reaction activity. Among the compounds represented by the formula (III), a compound where each of $R^5$ and $R^7$ is a hydrogen atom, and $R^6$ is a hydrogen atom or —$COOR^8$ is more preferable. Specific examples include pyrogallol ($R^5$ to $R^7$: hydrogen atoms), pyrogallic acid ($R^5$ and $R^7$: hydrogen atoms, $R^6$: —COOH), pyrogallic acid esters, such as ethyl pyrogallate ($R^5$ and $R^7$: hydrogen atoms, $R^6$: —$COOC_2H_5$), propyl pyrogallate ($R^5$ and $R^7$: hydrogen atoms, $R^6$: —$COOC_3H_7$), butyl pyrogallate ($R^5$ and $R^7$: hydrogen atoms, $R^6$: —$COOC_4H_9$), octyl pyrogallate ($R^5$ and $R^7$: hydrogen atoms, $R^6$: —$COOC_8H_{17}$), and lauryl pyrogallate ($R^5$ and $R^7$: hydrogen atoms, $R^6$: —$COOC_{12}H_{25}$), and the like. Pyrogallic acid and the pyrogallic acid esters are preferred from the viewpoint of storage property of the toner.

The pyrogallol compound is present in the polycondensation reaction in an amount of preferably from 0.001 to 1.0 part by weight, more preferably from 0.005 to 0.4 parts by weight, and even more preferably from 0.01 to 0.2 parts by weight, based on 100 parts by weight of the raw material monomers subjected to the polycondensation reaction, from the viewpoint of storage property of the toner. The amount of pyrogallol compound present as referred to herein means an entire formulation amount of pyrogallol compounds used in the polycondensation reaction.

It is considered that the pyrogallol compound acts as a promoter for the esterification catalyst. The esterification catalyst used together with the pyrogallol compound is preferably at least one metal catalyst selected from the group consisting of tin compounds, titanium compounds, antimony trioxide, zinc acetate, and germanium dioxide.

The weight ratio of the pyrogallol compound to the esterification catalyst, i.e. the pyrogallol compound/the esterification catalyst, is preferably from 0.01 to 0.5, more preferably from 0.03 to 0.3, and even more preferably from 0.05 to 0.2, from the viewpoint of storage property of the toner.

The polyester resin of Embodiment A refers to a resin containing a polyester unit formed by polycondensation of an alcohol component and a carboxylic acid component, which includes not only polyesters but also polyester-polyamides and the like. Among them, the polyesters are preferred from the viewpoint of durability and initial rise in triboelectric charging.

Here, the polyester may contain a polyester modified to an extent that the properties are not substantially impaired.

The modified resins of polyesters include, for instance, urethane-modified polyesters in which a polyester is modified with an urethane bond, epoxy-modified polyesters in which a polyester is modified with an epoxy bond, composite resins having two or more resin components including a polyester component and a vinyl resin component, and the like.

The composite resin containing a polyester component and a vinyl resin component may be produced by any of the methods, including, for example, a method including melt-kneading each of the resins in the presence of an initiator or the like as necessary, a method including dissolving each of the resins in a solvent, and mixing the solutions, and a method including polymerizing a mixture of raw material monomers for each of the resins. The composite resin is preferably a resin obtained by a polycondensation reaction and an addition polymerization reaction using the raw material monomers for the polyester component and the raw material monomers for the vinyl resin component mentioned above (JP-A-Hei-7-98518). Specifically, it is preferable that the composite resin is a hybrid resin obtained by further using, in addition to the raw materials monomers for a polycondensation resin and the raw material monomers for an addition polymerization resin, a compound capable of reacting with both of the raw material monomers for a polycondensation resin and the raw material monomers for an addition polymerization resin (dually reactive monomer), i.e. a resin in which a polycondensation resin and an addition polymerization resin are partially bonded via a dually reactive monomer. It is preferable that the dually reactive monomer is a compound having in its molecule an ethylenically unsaturated bond and at least one functional group selected from the group consisting of a hydroxyl group, a carboxyl group, an epoxy group, a primary amino group and a secondary amino group, preferably a hydroxyl group and/or a carboxyl group, and more preferably a carboxyl group. It is more preferable that the dually reactive monomer is acrylic acid, methacrylic acid, or fumaric acid.

The raw material monomers for a vinyl resin component includes styrenic compounds such as styrene and α-methylstyrene; ethylenically unsaturated monoolefins such as ethylene and propylene; diolefins such as butadiene; vinyl halides such as vinyl chloride; vinyl esters such as vinyl acetate and vinyl propionate; esters of ethylenic monocarboxylic acids such as alkyl(1 to 18 carbon atoms) esters of (meth)acrylic acid and dimethylaminoethyl(meth)acrylate;

vinyl ethers such as vinyl methyl ether; vinylidene halides such as vinylidene chloride; N-vinyl compounds such as N-vinylpyrrolidone; and the like. Styrene, butyl acrylate, 2-ethylhexyl acrylate, and methyl methacrylate are preferable, from the viewpoint of reactivity, pulverizability and triboelectric stability. It is more preferable that styrene and/or an alkyl ester of (meth)acrylic acid is contained in an amount of 50% by weight or more, preferably from 80 to 100% by weight of the vinyl resin component.

When the raw material monomers for a vinyl resin component are polymerized, a polymerization initiator, a crosslinking agent, or the like may be used, as necessary.

The weight ratio of the raw material monomers for a polyester component to the raw material monomers for a vinyl resin component, i.e. the raw material monomers for a polyester component/the raw material monomers for a vinyl resin component, is preferably from 55/45 to 95/5, more preferably from 60/40 to 95/5, and even more preferably from 70/30 to 90/10, from the viewpoint of forming the continuous matrix by the polyester component. Here, a dually reactive monomer is regarded as a raw material monomer for the polyester component.

The polyester resin of the present invention has a softening point of preferably from 90° to 160° C., more preferably from 100° to 150° C., and even more preferably from 105° to 145° C., from the viewpoint of fixing ability, storage property and durability of the toner.

In a case where the polyester resin is used as a resin binder, it is preferable to use both a resin having a higher softening point and a resin having a lower softening point, from the viewpoint of low-temperature fixing ability and storage property of the toner. It is preferable that the resin binder comprises a high-softening point resin and a low-softening point resin, the softening points of which have a difference of preferably 10° C. or more, more preferably from 10° to 60° C., and even more preferably from 20° to 60° C. The high-softening point resin has a softening point of preferably from exceeding 125° to 160° C., and more preferably from 130° to 150° C., and the low-softening point resin has a softening point of preferably from 90° to 125° C., and more preferably from 90° to 110° C. The weight ratio of the high-softening point resin to the low-softening point resin, i.e. high-softening point resin/low-softening point resin, is preferably from 1/3 to 3/1, and more preferably from 1/2 to 2/1. It is preferable that at least one of the high-softening point resin and the low-softening point resin is a polyester resin of the present invention, and it is more preferable that both the resins are polyester resins of the present invention.

The glass transition temperature is preferably from 45° to 85° C., and more preferably from 50° to 80° C., from the viewpoint of fixing ability, storage property and durability of the toner.

From the viewpoint of initial rise in triboelectric charging, the acid value is preferably from 5 to 90 mgKOH/g, more preferably from 10 to 80 mgKOH/g, and even more preferably from 10 to 70 mgKOH/g, and the hydroxyl value is preferably from 1 to 80 mgKOH/g, more preferably from 8 to 60 mgKOH/g, and even more preferably from 8 to 55 mgKOH/g.

Next, the polyester resin of Embodiment B will be described.

A feature of the polyester resin for a toner of Embodiment B resides in that the resin is obtained by a polycondensation reaction of:
at least one of the carboxylic acid component and the alcohol component, and a reaction product (i) formed between one or more aromatic compounds themselves, in which a hydroxyl group and a methoxy group are bonded to adjoining carbon atoms, represented by the formula (Ib):

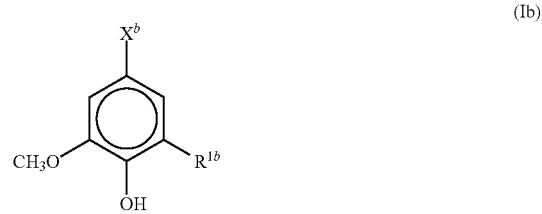

(Ib)

wherein $R^{1b}$ is a hydrogen atom, a hydroxyl group, or a methoxy group; and $X^b$ is a hydroxyl group or carboxyl group which may have a linking group.

In Embodiment B, in addition to low-temperature fixing ability, storage property and initial rise in triboelectric charging, hot offset resistance is also maintained. It is presumably due to the fact that since a reaction product (i) formed between above-mentioned aromatic compounds themselves is used, reactivity of the above-mentioned aromatic compound is enhanced, as compared to the case where the above-mentioned aromatic compounds are directly subjected to a polycondensation reaction, so that the polyester resin can be formed to have a larger molecular weight.

In the present invention, the reaction of the above-mentioned aromatic compounds themselves represented by the formula (Ib) includes:
(i) a condensation reaction which takes place in a case where the above-mentioned aromatic compound has a carboxyl group and a hydroxyl group;
(ii) an ether reaction which takes place in a case where the above-mentioned aromatic compound has two or more hydroxyl groups;
(iii) an addition reaction which takes place in a case where the above-mentioned aromatic compound has an unsaturated hydrocarbon group; and the like.
Here, in the addition reaction, a dicarboxylic acid compound and a trihydric or higher polyhydric alcohol compound can also be formed. In addition, as the above-mentioned aromatic compound, only one compound may be reacted, or two or more compounds may be concurrently reacted. Therefore, the reactions (i) to (iii) mentioned above may concurrently take place.

It is preferable that the linking group in $X^b$ is an unsaturated divalent hydrocarbon group having preferably 2 to 4 carbon atoms, and more preferably 2 or 3 carbon atoms. Specific examples of $X^b$ include groups represented by —CH═CH—COOH, —CH═CH—CH$_2$OH, —COOH, —OH, and the like.

The aromatic compound represented by the formula (Ib) includes at least one hydroxycarboxylic acid selected from the group consisting of ferulic acid ($X^b$: —CH═CH—COOH, $R^{1b}$: hydrogen atom), 5-hydroxyferulic acid ($X^b$: —CH═CH—COOH, $R^{1b}$: hydroxyl group), sinapic acid ($X^b$: —CH═CH—COOH, $R^{1b}$: methoxy group), syringic acid ($X^b$: —COOH, $R^{1b}$: methoxy group) and vanillic acid ($X^b$: —COOH, $R^{1b}$: H); diols such as coniferyl alcohol ($X^b$: —CH═CH—CH$_2$OH, $R^{1b}$: hydrogen atom), 5-hydroxyconiferyl alcohol ($X^b$: —CH═CH—CH$_2$OH, $R^{1b}$: hydroxyl group), and sinapyl alcohol ($X^b$: —CH═CH—CH$_2$OH, $R^{1b}$: methoxy group); and the like, from the viewpoint of initial rise in triboelectric charging. The hydroxycarboxylic acid is preferred from the viewpoint of reactivity.

The aromatic compound represented by the formula (Ib) has a molecular weight of preferably 800 or less, more preferably 500 or less, even more preferably 300 or less, and even more preferably 250 or less, from the viewpoint of reactivity in the polycondensation. In addition, the lower limit is 140, which is the case where $R^{1b}$ is a hydrogen atom and $X^b$ is a hydroxyl group.

The reaction temperature during the reaction of the aromatic compounds themselves represented by the formula (Ib) is preferably from 140° to 210° C., and more preferably from 150° to 180° C., from the viewpoint of reactivity and thermal stability of the aromatic compound represented by the formula (Ib). As previously described, it is presumed that a condensation reaction takes place in a case where an aromatic compound represented by the formula (Ib) has a carboxyl group, while an etherification by a reaction between hydroxyl groups takes place in a case where an aromatic compound represented by the formula (Ib) has no carboxyl groups. In addition, it is presumed that an addition reaction may also take place in a case where the compound has an unsaturated hydrocarbon group as a linking group in $X^b$.

From the viewpoint of reactivity, in the aromatic compound represented by the formula (Ib), $X^b$ preferably has an unsaturated hydrocarbon group as a linking group, and preferably has a carboxyl group as a functional group.

A solvent may be properly used. The reaction time is preferably from 2 to 20 hours, and more preferably from 5 to 13 hours.

As a catalyst, an acid, an alkali, or a metal catalyst described later or the like may be properly used, depending on the reaction of interest.

The endpoint of reaction can be set so that in the molecular weight measurement according to GPC described later, a weight-average molecular weight is, as a rule of thumb, equal to or greater than a molecular weight of a dehydration polycondensation product (dimer) of the aromatic compound. The weight-average molecular weight of the reaction product (i) obtained is preferably from 350 to 2,000, more preferably from 400 to 1,500, even more preferably from 450 to 1,000, and still even more preferably from 450 to 800, from the viewpoint of initial rise in triboelectric charging and hot offset resistance of the toner.

It is considered that a reaction product (i) contains, as a main component, a product obtained by an addition reaction, in a case of a condensation reaction or etherification of the aromatic compounds themselves represented by the formula (Ib), or in a case where the aromatic compound has an unsaturated hydrocarbon group as a linking group. In the present invention, it is considered that since a reaction product (i) formed between the aromatic compounds themselves represented by the formula (Ib) is used, reactivity is enhanced in the polycondensation reaction with at least any one of the carboxylic acid component and the alcohol component, whereby consequently the aromatic compound represented by the formula (Ib) can be efficiently incorporated in the molecular chain of the polyester The polyester resin for a toner of the present invention can be obtained by polycondensing a reaction product (i) formed between one or more aromatic compounds themselves, and at least either one of the carboxylic acid component and the alcohol component. For example, in a case where a reaction product (i) formed between the aromatic compounds themselves in which $X^b$ is a carboxyl group is used, the reaction product (i) may be reacted with only the alcohol component. In the case where a reaction product (i) formed between the aromatic compounds in which $X^b$ is a hydroxyl group, the reaction product (i) may be reacted with only the carboxylic acid component. From the viewpoint of improving reactivity of polycondensation and improving storage property of the toner, preferable is a polyester resin for a toner obtained by polycondensing the above-mentioned reaction product (i) formed between one or more of the aromatic compounds themselves, the carboxylic acid component, and the alcohol component.

As the alcohol component, preferred is an alkylene oxide adduct of bisphenol A represented by the formula (II):

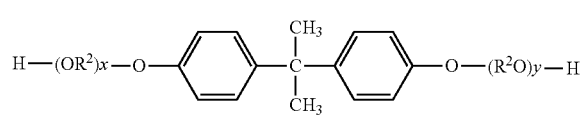

(II)

wherein $R^2O$ and $OR^2$ are an oxyalkylene group, wherein $R^2$ is an ethylene group and/or a propylene group; and each of x and y is a positive number showing an average number of moles of alkylene oxide added, wherein an average number of the sum of x and y is preferably from 1 to 16, more preferably from 1 to 8, and even more preferably from 1.5 to 4, or an aliphatic diol.

The alkylene oxide adduct of bisphenol A is preferred from the viewpoint of the storage property of the toner.

Specific examples of the alkylene oxide adduct of bisphenol A represented by the formula (II) include an alkylene oxide adduct of bisphenol A such as a polyoxypropylene adduct of 2,2-bis(4-hydroxyphenyl)propane and polyoxyethylene adduct of 2,2-bis(4-hydroxyphenyl)propane; and the like.

The above-mentioned alkylene oxide adduct of bisphenol A is contained in an amount of preferably from 20 to 100% by mol, more preferably from 30 to 100% by mol, and even more preferably from 50 to 100% by mol, of the alcohol component, from the viewpoint of storage property of the toner.

It is preferable that the aliphatic diol is an aliphatic diol having preferably 2 to 8 carbons atoms, and more preferably 2 to 6 carbons atoms, from the viewpoint of low-temperature fixing ability of the toner.

The aliphatic diol includes ethylene glycol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 1,4-butenediol, neopentyl glycol, 2,3-butanediol, 2,3-pentanediol, 2,4-pentanediol, 2,3-hexanediol, 3,4-hexanediol, 2,4-hexanediol, 2,5-hexanediol, and the like.

Among them, aliphatic diols having a hydroxyl group bound to a secondary carbon atom are preferred, from the viewpoint of being excellent in low-temperature fixing ability and storage stability of the toner. The aliphatic diols have preferably 3 to 8 carbon atoms, and more preferably 3 to 6 carbon atoms, from the viewpoint of low-temperature fixing ability and storage property. Specific preferred examples include 1,2-propanediol, 1,2-butanediol, 1,3-butanediol, 2,3-butanediol, 1,2-pentanediol, 1,3-pentanediol, 2,3-pentanediol, 2,4-pentanediol, and the like.

The aliphatic diol is contained in an amount of preferably from 20 to 100% by mol, more preferably from 30 to 100% by mol, and even more preferably from 50 to 100% by mol, of the alcohol component, from the viewpoint of low-temperature fixing ability of the toner.

As other alcohols, a trihydric or higher polyhydric alcohol such as glycerol, pentaerythritol, or trimethylolpropane may be used.

As a carboxylic acid component, an aromatic dicarboxylic acid compound, or an aliphatic dicarboxylic acid compound having 2 to 8 carbons atoms is preferred. In the present invention, carboxylic acids and derivatives such as acid anhydrides and alkyl(1 to 3 carbon atoms) esters are collectively referred to as the carboxylic acid compound.

An aromatic dicarboxylic acid compound such as phthalic acid, isophthalic acid, or terephthalic acid is preferred, from the viewpoint of a balance among low-temperature fixing ability, storage property and initial rise in triboelectric charging of the toner.

The aromatic dicarboxylic acid compound is contained in an amount of preferably from 20 to 100% by mol, more preferably from 30 to 90% by mol, and even more preferably from 40 to 80% by mol, of the carboxylic acid component, from the viewpoint of low-temperature fixing ability and storage property of the toner.

The aliphatic dicarboxylic acid such as oxalic acid, malonic acid, maleic acid, fumaric acid, citraconic acid, itaconic acid, glutaconic acid, succinic acid, adipic acid, sebacic acid, or azelaic acid is preferred, from the viewpoint of low-temperature fixing ability.

Other carboxylic acid compounds include alicyclic dicarboxylic acids such as cyclohexanedicarboxylic acid; tricarboxylic or higher polycarboxylic acid such as trimellitic acid and pyromellitic acid; rosins; rosins modified with fumaric acid, maleic acid, or acrylic acid; and the like.

It is desirable that the carboxylic acid component contains a tricarboxylic or higher polycarboxylic acid compound, preferably a trimellitic acid compound, and more preferably trimellitic anhydride, from the viewpoint of elevating molecular weight and increasing low-temperature fixing ability and storage property of the toner. The tricarboxylic or higher polycarboxylic acid compound is contained in an amount of preferably from 0.1 to 50% by mol, more preferably from 1 to 30% by mol, and even more preferably from 5 to 25% by mol, of the carboxylic acid component.

Here, the alcohol component may properly contain a monohydric alcohol, and the carboxylic acid component may properly contain a monocarboxylic acid compound, from the viewpoint of adjusting molecular weight of the resin and improving offset resistance of the toner.

The molar ratio of the carboxylic acid component to the alcohol component, i.e. the carboxylic acid component/the alcohol component, is preferably from 0.5 to 1.3, and more preferably from 0.6 to 1.1.

A reaction product (i) formed between aromatic compounds represented by the formula (Ib), an alcohol component, and a carboxylic acid component are polycondensed, to obtain a polyester resin for a toner of the present invention.

The reaction product (i) subjected to the polycondensation reaction is used in an amount of preferably from 2.5 to 160 parts by weight, more preferably from 2.5 to 80 parts by weight, even more preferably from 10 to 70 parts by weight, and still even more preferably from 15 to 60 parts by weight, based on 100 parts by weight of a total amount of the carboxylic acid component and the alcohol component, from the viewpoint of the storage property, initial rise in triboelectric charging and hot offset resistance.

It is preferable that the polycondensation reaction is carried out at a temperature of from 160° to 250° C. in an inert gas atmosphere in the presence of an esterification catalyst such as a tin compound or a titanium compound, and it is more preferable that the method is desirably a method including the steps of carrying out a polycondensation reaction of the carboxylic acid component and the alcohol component at preferably from 200° to 250° C., and more preferably from 210° to 240° C., thereafter adding the above-mentioned reaction product (i), and carrying out a polycondensation reaction at preferably from 160° to 210° C., and more preferably from 170° to 200° C., from the viewpoint of improving reactivity of the above-mentioned reaction product (i), improving initial rise in triboelectric charging and hot offset resistance, and also improving stability to decomposition.

The tin compound and the titanium compound include the same compounds as those in Embodiment A.

The esterification catalyst is present in an amount of preferably from 0.01 to 2.0 parts by weight, more preferably from 0.1 to 1.5 parts by weight, and even more preferably from 0.2 to 1.0 part by weight, based on 100 parts by weight of a total amount of the above-mentioned reaction product (i), the alcohol component and the carboxylic acid component. Here, the amount of the esterification catalyst present means an entire formulation amount of the catalysts used in the polycondensation reaction.

It is preferable to that a pyrogallol compound having a benzene ring of which three hydrogen atoms bound to carbon atoms adjacent to each other are substituted by hydroxyl groups is used together with an esterification catalyst, from the viewpoint of increasing reactivity of the reaction product (i) used in Embodiment B and improving storage property of the toner.

The pyrogallol compound includes the same compounds as those in Embodiment A.

The pyrogallol compound is present in the polycondensation reaction in an amount of preferably from 0.001 to 1.0 part by weight, more preferably from 0.005 to 0.4 parts by weight, and even more preferably from 0.01 to 0.2 parts by weight, based on 100 parts by weight of a total amount of the above-mentioned reaction product (i), the alcohol component and the carboxylic acid component subjected to the polycondensation reaction, from the viewpoint of storage property of the toner. The amount of pyrogallol compound present as referred to herein means an entire formulation amount of pyrogallol compounds used in the polycondensation reaction.

It is considered that the pyrogallol compound acts as a promoter for the esterification catalyst. The esterification catalyst used together with the pyrogallol compound is preferably at least one metal catalyst selected from the group consisting of tin compounds, titanium compounds, antimony trioxide, zinc acetate, and germanium dioxide.

The weight ratio of the pyrogallol compound to the esterification catalyst, i.e. the pyrogallol compound/the esterification catalyst, is preferably from 0.01 to 0.5, more preferably from 0.03 to 0.3, and even more preferably from 0.05 to 0.2, from the viewpoint of storage property of the toner.

The polyester resin for a toner of Embodiment B refers to a resin containing a polyester unit formed by polycondensation of the reaction product (i), an alcohol component, and a carboxylic acid component.

Here, the polyester may contain a polyester modified to an extent that the properties are not substantially impaired.

The modified resins of polyesters include, for instance, polyester-polyamides, urethane-modified polyesters in which a polyester is modified with an urethane bond, epoxy-modified polyesters in which a polyester is modified with an epoxy bond, composite resins containing two or more resin components including a polyester component and a vinyl resin component, and the like.

The composite resin containing a polyester component and a vinyl resin component is the same resin as that in Embodiment A.

The weight ratio of the raw material monomers including the reaction product (i) for a polyester component to the raw material monomers for a vinyl resin component, i.e. the raw material monomers for a polyester component/the raw material monomers for a vinyl resin component, is preferably from 55/45 to 95/5, more preferably from 60/40 to 95/5, and even more preferably from 70/30 to 90/10, from the viewpoint of forming the continuous matrix by the polyester component. Here, a dually reactive monomer is regarded as a raw material monomer for the polyester component.

The polyester resin for a toner has a softening point of preferably from 90° to 160° C., more preferably from 100° to 150° C., and even more preferably from 105° to 145° C., from the viewpoint of fixing ability, storage property and hot offset resistance of the toner.

In a case where the polyester resin is used as a resin binder, it is preferable to use both a resin having a higher softening point and a resin having a lower softening point, from the viewpoint of low-temperature fixing ability, storage property and initial rise in triboelectric charging of the toner. It is preferable that the resin binder comprises a high-softening point resin and a low-softening point resin, the softening points of which have a difference of preferably 10° C. or more, more preferably from 10° to 60° C., and even more preferably from 20° to 60° C. The high-softening point resin has a softening point of preferably from exceeding 125° to 160° C., and more preferably from 130° to 150° C., and the low-softening point resin has a softening point of preferably from 90° to 125° C., and more preferably from 90° to 110° C. The weight ratio of the high-softening point resin to the low-softening point resin, i.e. high-softening point resin/low-softening point resin, is preferably from 1/3 to 3/1, and more preferably from 1/2 to 2/1. It is preferable that at least one of the high-softening point resin and the low-softening point resin is a polyester resin of the present invention, and it is more preferable that both the resins are polyester resins of the present invention.

The glass transition temperature is preferably from 45° to 85° C., and more preferably from 50° to 80° C., from the viewpoint of fixing ability, storage property and hot offset resistance of the toner.

From the viewpoint of initial rise in triboelectric charging, the acid value is preferably from 5 to 90 mgKOH/g, more preferably from 10 to 80 mgKOH/g, and even more preferably from 10 to 70 mgKOH/g, and the hydroxyl value is preferably from 1 to 80 mgKOH/g, more preferably from 8 to 60 mgKOH/g, and even more preferably from 8 to 55 mgKOH/g.

Next, the polyester resin of Embodiment C will be described.

A major feature of the polyester resin for a toner of Embodiment C resides in that the resin is obtained by polycondensing, in addition to the alcohol component and the carboxylic acid component:

a reaction product (ii) obtained by reacting an aromatic compound represented by the formula (Ic):

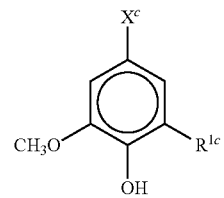

(Ic)

wherein $R^{1c}$ is a hydrogen atom, a hydroxyl group or a methoxy group; and $X^c$ is an unsaturated hydrocarbon group which may have a hydroxyl group or carboxyl group, and a carboxylic acid having an unsaturated reactive group.

In Embodiment C, in addition to low-temperature fixing ability, storage property and initial rise in triboelectric charging, durability is also maintained. It is presumably due to the fact that a reaction product (ii) formed between the above-mentioned aromatic compound and a carboxylic acid having a reactive unsaturated group is used, reactivity of the above-mentioned aromatic compound is enhanced, as compared to the case where the above-mentioned aromatic compound is directly subjected to a polycondensation reaction, so that the polyester resin can be formed to have a higher molecular weight.

In $X^c$, it is desired that the unsaturated hydrocarbon group which may have a hydroxyl group or a carboxyl group is an unsaturated hydrocarbon group having preferably 2 to 4 carbon atoms, and more preferably 2 or 3 carbon atoms. Specific examples of $X^c$ include groups represented by —CH=CH—COOH, —CH=CH—CH$_2$OH, —CH=CH—CH$_3$, —CH$_2$—CH=CH$_2$, —CH=CH$_2$, and the like.

The aromatic compound has a molecular weight of preferably 1,000 or less, and more preferably 800 or less, from the viewpoint of reactivity in the polycondensation. In addition, the lower limit is 140, which is the case where $R^{1c}$ is a hydrogen atom and $X^c$ is —CH=CH$_2$.

The aromatic compound represented by the formula (Ic) includes at least one hydroxycarboxylic acid selected from the group consisting of ferulic acid ($X^c$: —CH=CH—COOH, $R^{1c}$: hydrogen atom), 5-hydroxyferulic acid ($X^c$: —CH=CH—COOH, $R^{1c}$: hydroxyl group), and sinapic acid ($X^c$: —CH=CH—COOH, $R^{1c}$: methoxy group); monoalcohols such as eugenol ($X^c$: —CH$_2$—CH=CH$_2$, $R^{1c}$: hydrogen atom), and 2-methoxy-4-vinylphenol ($X^c$: —CH=CH$_2$, $R^{1c}$: hydrogen atom); diols such as coniferyl alcohol ($X^c$: —CH=CH—CH$_2$OH, $R^{1c}$: hydrogen atom), 5-hydroxyconiferyl alcohol ($X^c$: —CH=CH—CH$_2$OH, Ru: hydroxyl group), and sinapyl alcohol ($X^c$: —CH=CH—CH$_2$OH, $R^{1c}$: methoxy group); and the like.

Among them, from the viewpoint of initial rise in triboelectric charging, the hydroxycarboxylic acid is preferably at least one member selected from the group consisting of ferulic acid, 5-hydroxyferulic acid, and sinapic acid, and the diol is preferably at least one member selected from the group consisting of coniferyl alcohol, 5-hydroxyconiferyl alcohol and sinapyl alcohol.

The carboxylic acid having an unsaturated reactive group includes monocarboxylic acids, such as acrylic acid, methacrylic acid, and crotonic acid; and polycarboxylic acids, such as itaconic acid, maleic acid, fumaric acid, citraconic acid, and 2-methacryloyloxymethylsuccinic acid, and the carboxylic acid is preferably (meth)acrylic acid, fumaric acid, and maleic acid, from the viewpoint of reactivity. These carboxylic acids may be used as an alkyl(1 to 8 carbon atoms) ester or an anhydride.

The reaction temperature during the reaction of the aromatic compound represented by the formula (Ic) and the carboxylic acid having an unsaturated reactive group is preferably from 140° to 210° C., and more preferably from 150° to 180° C. During the reaction, it is preferable that a polymerization inhibitor is used in order to prevent an addition reaction of the carboxylic acids themselves having an unsaturated reactive group. The molar ratio of the mixture of the aromatic compound represented by the formula (Ic) and the carboxylic acid having an unsaturated reactive group to be used in the reaction is preferably from 1/5 to 5/1, more preferably from 1/3 to 3/1, even more preferably from 1/2 to 2/1, and still even more preferably nearly equimolar, from the viewpoint of improving reactivity and improving initial rise in triboelectric charging and durability.

From the viewpoint of reactivity, it is preferable that the aromatic compound represented by the formula (Ic) is thermally melted, and then reacted with the carboxylic acid having an unsaturated reactive group. A solvent may be properly used within the range that would not impair the effects of the present invention. The reaction time is preferably from 2 to 20 hours, and more preferably from 5 to 13 hours.

Considering that the addition reaction is a main reaction, the endpoint of reaction can be can be set so that in the molecular weight measurement according to GPC described later, a weight-average molecular weight is, as a rule of thumb, equal to or greater than a total molecular weight of the aromatic compound and the carboxylic acid having an unsaturated reactive group used. In general, a time point when a weight-average molecular weight according to GPC reaches 350 may be regarded as an endpoint of the addition reaction. The weight-average molecular weight of the reaction product (ii) obtained is preferably from 350 to 2,000, more preferably from 350 to 1,500, even more preferably from 350 to 1,000, and even more preferably from 350 to 700, under the conditions described below.

It is considered that a reaction product (ii) contains, as a main component, a product obtained by an addition reaction of the aromatic compound represented by the formula (Ic) and the carboxylic acid having an unsaturated reactive group. Specifically, in a case where the above-mentioned aromatic compound is a hydroxycarboxylic acid having a carboxyl group, a main reaction product obtainable by an addition reaction of the aromatic compound and the carboxylic acid having an unsaturated reactive group is presumably a dicarboxylic acid having a hydroxyl group or a tricarboxylic or higher polycarboxylic acid having a hydroxyl group. Also, in a case where the above-mentioned aromatic compound is a diol, the main reaction product obtainable by an addition reaction of the aromatic compound and the carboxylic acid having an unsaturated reactive group is presumably a carboxylic acid having two hydroxyl groups or a dicarboxylic or higher polycarboxylic acid having two hydroxyl groups. In the present invention, it is preferable that the reaction product (ii) contains a dicarboxylic acid compound, from the viewpoint of reactivity in the polycondensation reaction of the alcohol component and the carboxylic acid component.

The alcohol component and the carboxylic acid component include the same components as those in Embodiment B.

The polyester resin for a toner of the present invention can be obtained by polycondensing a reaction product (ii) obtained by a reaction of the aromatic compound represented by the formula (Ic) and the carboxylic acid having a reactive unsaturated group, an alcohol component, and a carboxylic acid component.

The reaction product (ii) subjected to a polycondensation reaction of the carboxylic acid component and the alcohol component is used in an amount of preferably from 2.5 to 80 parts by weight, more preferably from 5 to 50 parts by weight, even more preferably from 5 to 30 parts by weight, and still even more preferably from 10 to 30 parts by weight, based on 100 parts by weight of a total amount of the carboxylic acid component and the alcohol component, from the viewpoint of low-temperature fixing ability, storage property, initial rise in triboelectric charging and durability of the toner.

The molar ratio of the carboxylic acid component to the alcohol component, i.e. the carboxylic acid component/the alcohol component, is preferably from 0.5 to 1.3, and more preferably from 0.6 to 1.1.

It is preferable that the polycondensation reaction is carried out at a temperature of from 160° to 250° C. in an inert gas atmosphere in the presence of an esterification catalyst such as a tin compound or a titanium compound, and it is more preferable that the method is desirably a method including the steps of carrying out a polycondensation reaction of the carboxylic acid component and the alcohol component at preferably from 200° to 250° C., and more preferably from 210° to 240° C., thereafter adding the above-mentioned reaction product (ii), and carrying out a polycondensation reaction at preferably from 160° to 210° C., and more preferably from 170° to 200° C., from the viewpoint of improving reactivity of the above-mentioned reaction product (ii), improving initial rise in triboelectric charging and durability, and also improving stability to decomposition.

The tin compound and the titanium compound include the same compounds as those in Embodiment A.

The esterification catalyst is present in an amount of preferably from 0.01 to 2.0 parts by weight, more preferably from 0.1 to 1.5 parts by weight, and even more preferably from 0.2 to 1.0 part by weight, based on 100 parts by weight of a total amount of the above-mentioned reaction product (ii), the alcohol component and the carboxylic acid component. Here, the amount of the esterification catalyst present means an entire formulation amount of the catalysts used in the polycondensation reaction.

It is preferable to that a pyrogallol compound having a benzene ring of which three hydrogen atoms bound to carbon atoms adjacent to each other are substituted by hydroxyl groups is used together with an esterification catalyst, from the viewpoint of increasing reactivity of the reaction product (ii) used in Embodiment C and improving storage property of the toner.

The pyrogallol compound includes the same compounds as those in Embodiment A.

The pyrogallol compound is present in the polycondensation reaction in an amount of preferably from 0.001 to 1.0 part by weight, more preferably from 0.005 to 0.4 parts by weight, and even more preferably from 0.01 to 0.2 parts by weight, based on 100 parts by weight of a total amount of the above-mentioned reaction product (ii), the alcohol component and the carboxylic acid component subjected to the polycondensation reaction, from the viewpoint of storage property of the toner. The amount of pyrogallol compound present as referred to herein means an entire formulation amount of pyrogallol compounds used in the polycondensation reaction.

It is considered that the pyrogallol compound acts as a promoter for the esterification catalyst. The esterification catalyst used together with the pyrogallol compound is preferably at least one metal catalyst selected from the group consisting of tin compounds, titanium compounds, antimony trioxide, zinc acetate, and germanium dioxide.

The weight ratio of the pyrogallol compound to the esterification catalyst, i.e. the pyrogallol compound/the esterification catalyst, is preferably from 0.01 to 0.5, more preferably from 0.03 to 0.3, and even more preferably from 0.05 to 0.2, from the viewpoint of durability of the resin.

The polyester resin of the present invention refers to a resin containing a polyester unit formed by polycondensation of the reaction product (ii), an alcohol component and a carboxylic acid component.

Here, the polyester may contain a polyester modified to an extent that the properties are not substantially impaired.

The modified resins of polyesters include, for instance, polyester-polyamides, urethane-modified polyesters in which a polyester is modified with an urethane bond, epoxy-modified polyesters in which a polyester is modified with an epoxy bond, composite resins containing two or more resin components including a polyester component and a vinyl resin component, and the like.

The composite resin having a polyester component and a vinyl resin component is the same resin as that in Embodiment A.

The weight ratio of the raw material monomers (including the reaction product (ii)) for the polyester component to the raw material monomers for the vinyl resin component, i.e. the raw material monomers for polyester component/the raw material monomers for vinyl resin component, is preferably from 55/45 to 95/5, more preferably from 60/40 to 95/5, even more preferably from 70/30 to 90/10, from the viewpoint of forming the continuous phase by the polyester component. Here, a dually reactive monomer is regarded as a raw material monomer for the polyester component.

The polyester resin for a toner has a softening point of preferably from 90° to 160° C., more preferably from 100° to 150° C., and even more preferably from 105° to 145° C., from the viewpoint of fixing ability, storage property and durability of the toner.

In a case where the polyester resin is used as a resin binder, it is preferable to use both a resin having a higher softening point and a resin having a lower softening point, from the viewpoint of low-temperature fixing ability, storage property and initial rise in triboelectric charging of the toner. It is preferable that the resin binder comprises a high-softening point resin and a low-softening point resin, the softening points of which have a difference of preferably 10° C. or more, more preferably from 10° to 60° C., and even more preferably from 20° to 60° C. The high-softening point resin has a softening point of preferably from exceeding 125° to 160° C., and more preferably from 130° to 150° C., and the low-softening point resin has a softening point of preferably from 90° to 125° C., and more preferably from 90° to 110° C. The weight ratio of the high-softening point resin to the low-softening point resin, i.e. high-softening point resin/low-softening point resin, is preferably from 1/3 to 3/1, and more preferably from 1/2 to 2/1. It is preferable that at least one of the high-softening point resin and the low-softening point resin is a polyester resin of the present invention, and it is more preferable that both the resins are polyester resins of the present invention.

The glass transition temperature is preferably from 45° to 85° C., and more preferably from 50° to 80° C., from the viewpoint of fixing ability, storage property and durability of the toner.

From the viewpoint of initial rise in triboelectric charging, the acid value is preferably from 5 to 90 mgKOH/g, more preferably from 10 to 80 mgKOH/g, and even more preferably from 10 to 70 mgKOH/g, and the hydroxyl value is preferably from 1 to 80 mgKOH/g, more preferably from 8 to 60 mgKOH/g, and even more preferably from 8 to 55 mgKOH/g.

By using the polyester resin of the present invention as a resin binder, a toner for electrophotography having excellent initial rise in triboelectric charging, while maintaining low-temperature fixing ability and storage property of the toner, is obtained.

The resin binder for a toner of the present invention contains an amorphous resin and a crystalline resin. In a case where both of the resins are a polycondensation resin obtained by polycondensing an alcohol component and a carboxylic acid component, it is preferable that at least either of the amorphous resin and the crystalline resin is a resin obtained using an aromatic compound represented by the formula (Ia) as the carboxylic acid component and/or the alcohol component. It is considered that the aromatic compound represented by the formula (Ia) exhibits an effect on initial rise in triboelectric charging by the aromatic compound itself, and also that excessive compatibility between the crystalline resin and the amorphous resin in the resin is controlled by the aromatic compound represented by the formula (Ia), so that crystallization of the crystalline resin is likely to progress, thereby improving storage property.

The aromatic compound represented by the formula (Ia) may be used as a carboxylic acid component and/or an alcohol component for the amorphous resin, and the aromatic compound may be used as a carboxylic acid component and/or an alcohol component for the crystalline resin. However, it is preferable that the aromatic compound is contained in both the resins, from the viewpoint of storage property and initial rise in triboelectric charging. Here, the aromatic compound that is used as a carboxylic acid component is a case where the aromatic compound represented by the formula (Ia) has a carboxyl group.

In the present invention, it is preferable that both of the amorphous resin and the crystalline resin are polyester resins; however, the amorphous resin may be a composite resin containing a polycondensation resin and an addition polymerization resin, as described later.

The crystallinity of the resin is expressed by a ratio of a softening point to a temperature of the maximum endothermic peak determined with a differential scanning calorimeter, i.e., a ratio expressed by softening point/temperature of the maximum endothermic peak. Generally, when this value exceeds 1.4, the resin is amorphous; and when the value is less than 0.6, the resin is low in crystallinity and mostly amorphous. The crystallinity of the resin can be adjusted by the kinds of the raw material monomers and a ratio thereof, production conditions (for example, reaction temperature, reaction time, and cooling rate), and the like. In the present invention, the term "crystalline resin" refers to a resin having a value of softening point/temperature of the maximum endothermic peak of from 0.6 to 1.4, preferably from 0.8 to 1.2, and more preferably from 0.9 to 1.1, and the term "amorphous resin" refers to a resin having a value of softening point/temperature of the maximum endothermic peak of more than 1.4, or less than 0.6, and preferably more than 1.4. Here, the temperature of the maximum endothermic peak refers to a temperature of the peak on the higher temperature side among endothermic peaks observed. When a difference between the temperature of the maximum endothermic peak and the softening point is within 20° C., the temperature of the maximum endothermic peak is defined as a melting point. When the difference between the temperature of the maximum endothermic peak and the softening point exceeds 20° C., the peak is ascribed to a glass transition. Here, in the present invention, when simply referred to as a "resin," it is intended to mean both the crystalline resin and the amorphous resin.

(Crystalline Resin)

It is preferable that either one of the carboxylic acid component and the alcohol component which are the raw material monomers for the crystalline resin contains an aromatic compound represented by the formula (Ia) mentioned above, from the viewpoint of storage property and initial rise in triboelectric charging of the toner.

The aromatic compound represented by the formula (Ia) is contained in an amount of preferably from 0.5 to 40% by mol, more preferably from 2.5 to 40% by mol, even more preferably from 2.5 to 35% by mol, still even more preferably from 5 to 30% by mol, still even more preferably from 5 to 25% by mol, and still even more preferably from 5 to 15% by mol, of a total amount of the carboxylic acid component and the alcohol component to be subjected to the production of the crystalline resin, from the viewpoint of low-temperature fixing ability, storage property and initial rise in triboelectric charging and of the toner.

In a case where the aromatic compound represented by the formula (Ia) is a hydroxycarboxylic acid, the hydroxycarboxylic acid is contained in an amount of preferably from 1 to 80% by mol, more preferably from 5 to 80% by mol, even more preferably from 10 to 70% by mol, still even more preferably from 10 to 50% by mol, and still even more preferably from 10 to 30% by mol, of a total amount of the carboxylic acid component to be subjected to the production of the crystalline resin, from the viewpoint of low-temperature fixing ability, storage property and initial rise in triboelectric charging and of the toner.

In a case where the aromatic compound represented by the formula (Ia) is an alcohol having no carboxyl groups, the alcohol is contained in an amount of preferably from 1 to 80% by mol, more preferably from 3 to 70% by mol, still even more preferably from 5 to 50% by mol, still even more preferably from 10 to 50% by mol, and still even more preferably from 10 to 30% by mol, of a total amount of the alcohol component to be subjected to the production of the crystalline resin, from the viewpoint of low-temperature fixing ability, storage property and initial rise in triboelectric charging and of the toner.

The carboxylic acid component and the alcohol component used for the crystalline resin may contain a carboxylic acid compound and/or an alcohol other than the above-mentioned aromatic compound.

The alcohol component used for the crystalline resin is preferably an aliphatic diol, and preferably an α,ω-linear alkanediol. An aliphatic diol having preferably 2 to 8 carbon atoms, and more preferably 2 to 6 carbon atoms, is preferred, from the viewpoint of low-temperature fixing ability of the toner and crystallinity.

The aliphatic diol includes ethylene glycol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 1,4-butenediol, neopentyl glycol, 2,3-butanediol, 2,3-pentanediol, 2,4-pentanediol, 2,3-hexanediol, 3,4-hexanediol, 2,4-hexanediol, 2,5-hexanediol, and the like.

Among them, an α,ω-aliphatic diol having 2 to 8 carbons, more preferably 2 to 6 carbons, such as ethylene glycol, 1,3-propanediol, 1,4-butanediol, 1,5-pentanediol, 1,6-hexanediol, or 1,4-butenediol is preferred, from the viewpoint of low-temperature fixing ability of the toner and crystallinity. One kind of the aliphatic alcohol (of the same number of carbon atoms and the same structure) is contained in an amount of preferably 80% by mol or more, and more preferably 90% by mol or more, of the alcohol component, from the viewpoint of storage property of the toner.

The aliphatic diol is contained in an amount of preferably from 20 to 100% by mol, more preferably from 30 to 100% by mol, and even more preferably from 50 to 100% by mol, of the alcohol component for the crystalline resin, from the viewpoint of low-temperature fixing ability of the toner.

In a case where the above-mentioned aromatic compound is used as a carboxylic acid component (in other words, in a case where the aromatic compound represented by the formula (Ia) is a hydroxycarboxylic acid, hereinafter referred to the same), the above-mentioned aliphatic diol is contained in an amount of preferably from 30 to 100% by mol, more preferably from 50 to 100% by mol, and even more preferably from 80 to 100% by mol, of the alcohol component for the crystalline resin, from the viewpoint of low-temperature fixing ability of the toner.

In a case where the above-mentioned aromatic compound is used as an alcohol component (in other words, in a case where the aromatic compound represented by the formula (Ia) is an alcohol having no carboxyl groups, hereinafter referred to the same), or in a case where the above-mentioned aromatic compound is used in both of an alcohol component and a carboxylic acid component (in other words, in a case where a hydroxycarboxylic acid and an alcohol having no carboxyl groups are used in combination as the aromatic compounds represented by the formula (Ia), hereinafter referred to the same), the above-mentioned aliphatic diol is contained in an amount of preferably from 0 to 90% by mol, and more preferably from 20 to 90% by mol, of the alcohol component for the crystalline resin, from the viewpoint of low-temperature fixing ability of the toner.

As the alcohol component other than the above-mentioned aliphatic alcohol, preferred is an alkylene oxide adduct of bisphenol A represented by the formula (II):

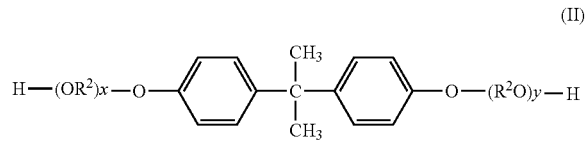

(II)

wherein R²O and OR² are an oxyalkylene group, wherein R² is an ethylene group and/or a propylene group; and each of x and y is a positive number showing an average number of moles of alkylene oxide added, wherein an average number of the sum of x and y is preferably from 1 to 16, more preferably from 1 to 8, and even more preferably from 1.5 to 4, from the viewpoint of storage property of the toner.

Specific examples of the alkylene oxide adduct of bisphenol A represented by the formula (II) include an alkylene oxide adduct of bisphenol A, such as a polyoxypropylene adduct of 2,2-bis(4-hydroxyphenyl)propane and a polyoxyethylene adduct of 2,2-bis(4-hydroxyphenyl)propane; and the like.

As other alcohols, a trihydric or higher polyhydric alcohol such as glycerol, pentaerythritol, or trimethylolpropane may be used.

As the carboxylic acid component used for the crystalline resin, an aromatic dicarboxylic acid compound or an aliphatic dicarboxylic acid compound is preferred. In the present invention, carboxylic acids including derivatives such as acid anhydrides and alkyl(1 to 3 carbon atoms) esters are collectively referred to herein as the carboxylic acid compound.

The aromatic dicarboxylic acid compound is preferably phthalic acid, isophthalic acid, terephthalic acid or the like from the viewpoint of low-temperature fixing ability and storage property of the toner.

The aliphatic dicarboxylic acid compound includes aliphatic dicarboxylic acids such as oxalic acid, malonic acid, maleic acid, fumaric acid, citraconic acid, itaconic acid, glutaconic acid, succinic acid, adipic acid, sebacic acid, azelaic acid, n-dodecylsuccinic acid, and n-dodecenylsuccinic acid. Among them, an aliphatic dicarboxylic acid having 2 to 8 carbon atoms is preferred, and fumaric acid is more preferred, from the viewpoint of low-temperature fixing ability of the toner and crystallinity. Here, the aliphatic dicarboxylic acid compound refers to aliphatic dicarboxylic acids, anhydrides thereof, and alkyl(1 to 3 carbon atoms) esters thereof, among which aliphatic dicarboxylic acids are preferred.

The aromatic dicarboxylic acid compound and/or the aliphatic dicarboxylic acid compound is contained in an amount of preferably from 20 to 100% by mol, more preferably from 30 to 90% by mol, and even more preferably from 40 to 80% by mol, of the carboxylic acid component, from the viewpoint of low-temperature fixing ability and storage property of the toner.

In a case where the aromatic compound represented by the formula (Ia) is used as a carboxylic acid component, or in a case where the aromatic compound represented by the formula (Ia) is used in both of an alcohol component and a carboxylic acid component, the aromatic dicarboxylic acid compound and/or the aliphatic dicarboxylic acid compound is contained in an amount of preferably from 20 to 90% by mol, and more preferably from 30 to 90% by mol, of the carboxylic acid component, from the viewpoint of low-temperature fixing ability and storage property of the toner.

In a case where the aromatic compound represented by the formula (Ia) is used as an alcohol component, the aromatic dicarboxylic acid compound and/or the aliphatic dicarboxylic acid compound is contained in an amount of preferably from 20 to 100% by mol, more preferably from 30 to 90% by mol, and even more preferably from 40 to 90% by mol, of the carboxylic acid component, from the viewpoint of low-temperature fixing ability and storage property of the toner.

Other carboxylic acid compounds include alicyclic dicarboxylic acids such as cyclohexanedicarboxylic acid; tricarboxylic or higher polycarboxylic acids such as trimellitic acid and pyromellitic acid; rosins; rosins modified with fumaric acid, maleic acid, or acrylic acid; and the like.

The tricarboxylic or higher polycarboxylic acid compound is contained in an amount of preferably 15% by mol or less, more preferably 10% by mol or less, and even more preferably 3% by mol or less, of the carboxylic acid component, from the viewpoint of low-temperature fixing ability of the toner.

(Amorphous Resin)

It is preferable that the aromatic compound represented by the formula (Ia) mentioned above is contained in either one of the carboxylic acid component and the alcohol component which are the raw material monomers for the amorphous resin, from the viewpoint of initial rise in triboelectric charging of the toner.

The aromatic compound represented by the formula (Ia) is contained in an amount of preferably from 0.5 to 80% by mol, more preferably from 2.5 to 80% by mol, even more preferably from 2.5 to 60% by mol, still even more preferably from 5 to 50% by mol, and still even more preferably from 5 to 25% by mol, of a total amount of the carboxylic acid component and the alcohol component to be subjected to the production of the amorphous resin, from the viewpoint of storage property and initial rise in triboelectric charging and of the toner.

In a case where the aromatic compound represented by the formula (Ia) is a hydroxycarboxylic acid, the hydroxycarboxylic acid is contained in an amount of preferably from 10 to 100% by mol, more preferably from 10 to 80% by mol, and even more preferably from 10 to 50% by mol, of a total amount of the carboxylic acid component to be subjected to the production of the amorphous resin, from the viewpoint of storage property and initial rise in triboelectric charging and of the toner.

In a case where the aromatic compound represented by the formula (Ia) is an alcohol having no carboxyl groups, the alcohol is contained in an amount of preferably from 10 to 100% by mol, more preferably from 10 to 70% by mol, and still even more preferably from 10 to 50% by mol, of a total amount of the alcohol component to be subjected to the production of the amorphous resin, from the viewpoint of storage property and initial rise in triboelectric charging and of the toner.

The carboxylic acid component and the alcohol component used for the amorphous resin may contain a carboxylic acid compound and/or an alcohol other than the above-mentioned aromatic compound.

The alcohol component used for the amorphous resin is preferably an aliphatic diol, and more preferably an aliphatic diol having preferably 2 to 8 carbon atoms, and more preferably 2 to 6 carbon atoms, from the viewpoint of low-temperature fixing ability of the toner.

The aliphatic diol includes ethylene glycol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 1,4-butenediol, neopentyl glycol, 2,3-butanediol, 2,3-pentanediol, 2,4-pentanediol, 2,3-hexanediol, 3,4-hexanediol, 2,4-hexanediol, 2,5-hexanediol, and the like.

Among them, aliphatic diols having a hydroxyl group bound to a secondary carbon atom are preferred, from the viewpoint of being excellent in low-temperature fixing ability and storage stability of the toner. The aliphatic diols have preferably 3 to 8 carbon atoms, and more preferably 3 to 6 carbon atoms, from the viewpoint of low-temperature fixing ability and storage property. Specific preferred examples include 1,2-propanediol, 1,2-butanediol, 1,3-butanediol, 2,3-butanediol, 1,2-pentanediol, 1,3-pentanediol, 2,3-pentanediol, 2,4-pentanediol, and the like.

The aliphatic diol is contained in an amount of preferably from 20 to 100% by mol, more preferably from 30 to 100% by mol, and even more preferably from 50 to 100% by mol, of the alcohol component for the amorphous resin, from the viewpoint of low-temperature fixing ability of the toner.

In a case where the aromatic compound represented by the formula (Ia) is used as a carboxylic acid component, the above-mentioned aliphatic diol is contained in an amount of preferably from 30 to 100% by mol, more preferably from 50 to 100% by mol, and even more preferably from 80 to 100% by mol, of the alcohol component for the crystalline resin, from the viewpoint of low-temperature fixing ability of the toner.

In a case where the above-mentioned aromatic compound is used as an alcohol component, or in a case where the above-mentioned aromatic compound is used in both of an alcohol component and a carboxylic acid component, the above-mentioned aliphatic diol is contained in an amount of preferably from 0 to 90% by mol, more preferably from 20 to 90% by mol, and even more preferably from 30 to 90% by mol, of the alcohol component for the amorphous resin, from the viewpoint of low-temperature fixing ability of the toner.

As the alcohol component other than the above-mentioned aliphatic alcohol, preferred is an alkylene oxide adduct of bisphenol A represented by the formula (II) mentioned above, from the viewpoint of storage property of the toner.

Specific examples of the alkylene oxide adduct of bisphenol A represented by the formula (II) include an alkylene oxide adduct of bisphenol A, such as a polyoxypropylene adduct of 2,2-bis(4-hydroxyphenyl)propane and a polyoxyethylene adduct of 2,2-bis(4-hydroxyphenyl)propane, and the like.

As the carboxylic acid component used for the amorphous resin, an aromatic dicarboxylic acid compound is preferred.

Aromatic dicarboxylic acid compounds such as phthalic acid, isophthalic acid, and terephthalic acid are preferred from the viewpoint of low-temperature fixing ability and storage property of the toner.

The aromatic dicarboxylic acid compound is contained in an amount of preferably from 20 to 100% by mol, more preferably from 30 to 90% by mol, and even more preferably from 40 to 80% by mol, of the carboxylic acid component, from the viewpoint of low-temperature fixing ability and storage property of the toner.

In a case where the aromatic compound represented by the formula (Ia) is used as a carboxylic acid component, or in a case where the aromatic compound represented by the formula (Ia) is used in both of an alcohol component and a carboxylic acid component, the aromatic dicarboxylic acid compound is contained in an amount of preferably from 20 to 90% by mol, more preferably from 30 to 90% by mol, and even more preferably from 30 to 80% by mol, of the carboxylic acid component, from the viewpoint of low-temperature fixing ability and storage property of the toner.

In a case where the aromatic compound represented by the formula (Ia) is used as an alcohol component, the aromatic dicarboxylic acid compound is contained in an amount of preferably from 20 to 100% by mol, more preferably from 30 to 90% by mol, and even more preferably from 40 to 80% by mol, of the carboxylic acid component, from the viewpoint of low-temperature fixing ability and storage property of the toner.

Other carboxylic acid includes aliphatic dicarboxylic acids such as oxalic acid, malonic acid, maleic acid, fumaric acid, citraconic acid, itaconic acid, glutaconic acid, succinic acid, adipic acid, sebacic acid, azelaic acid, n-dodecylsuccinic acid, and n-dodecenylsuccinic acid; anhydrides and alkyl(1 to 3 carbon atoms) esters of these acids; and the like. Among them, an aliphatic dicarboxylic acid having 2 to 8 carbon atoms is preferred, and fumaric acid is more preferred. Here, the aliphatic dicarboxylic acid compound refers to aliphatic dicarboxylic acids, anhydrides thereof, and alkyl(1 to 3 carbon atoms) esters thereof, among which aliphatic dicarboxylic acids are preferred.

Other carboxylic acid compounds include alicyclic dicarboxylic acids such as cyclohexanedicarboxylic acid; tricarboxylic or higher polycarboxylic acid such as trimellitic acid and pyromellitic acid; rosins; rosins modified with fumaric acid, maleic acid, or acrylic acid; and the like.

The tricarboxylic or higher polycarboxylic acid compound is contained in an amount of preferably from 0 to 30% by mol, and more preferably from 3 to 20% by mol, of the carboxylic acid component, from the viewpoint of low-temperature fixing ability of the toner.

Here, in either of the crystalline resin and the amorphous resin, the alcohol component may properly contain a monohydric alcohol, and the carboxylic acid component may properly contain a monocarboxylic acid compound, from the viewpoint of adjusting molecular weight of the resin and improving offset resistance of the toner.

In either of the amorphous resin and the crystalline resin, the molar ratio of the total number of moles of hydroxyl groups to the total number of moles of carboxylic groups (total number of moles of hydroxyl groups/total number of moles of carboxylic groups), which are contained in the alcohol component and the carboxylic acid component including the above-mentioned aromatic compound, is preferably from 0.9 to 1.5, more preferably from 1.0 to 1.4, and even more preferably from 1.0 to 1.3, from the viewpoint of increasing reactivity of the above-mentioned aromatic compound and improving initial rise in triboelectric charging of the toner.

In either of the amorphous resin and the crystalline resin, the polycondensation reaction of the alcohol component and the carboxylic acid component can be carried out, for example, in an inert gas atmosphere in the presence of an esterification catalyst such as a tin compound or a titanium compound, a polymerization inhibitor, or the like, and it is preferable that the temperature conditions are usually from 150° to 250° C. or so. From the viewpoint of improving reactivity of the above-mentioned aromatic compound, improving initial rise in triboelectric charging, and also improving stability to decomposition, it is desirable that a reaction after the addition of the above-mentioned aromatic compound is carried out at preferably from 150° to 200° C., more preferably from 160° to 200° C. An even more preferred embodiment is a method including the steps of subjecting to a polycondensation reaction a carboxylic acid component, such as an aromatic dicarboxylic acid compound or an aliphatic dicarboxylic acid compound, and an alcohol component, such as an aliphatic diol or an aromatic diol, other than the above-mentioned aromatic compound, at preferably from 200° to 250° C., and more preferably from 210° to 240° C., and then adding the above-mentioned aromatic compound, and thereafter subjecting components to a polycondensation reaction at preferably from 150° to 200° C., and more preferably from 160° to 200° C., from the viewpoint of improving reactivity of the above-mentioned aromatic compound, improving initial rise in triboelectric charging, and also improving stability to decomposition. The reaction ratio of the carboxylic acid component and the alcohol component mentioned above when the above-mentioned aromatic compound is added thereto is preferably from 50 to 100%, and more preferably from 60 to 90%, calculated from the value of theoretical amount of water formed by reaction.

The esterification catalyst is the same as those in Embodiment A.

It is preferable that a pyrogallol compound having a benzene ring of which three hydrogen atoms bound to carbon atoms adjacent to each other are substituted by hydroxyl groups is used as a promoter together with an esterification catalyst, from the viewpoint of increasing reactivity of the aromatic compound used in the present invention and improving storage property of the toner.

The pyrogallol compound is the same as those in Embodiment A.

It is considered that the pyrogallol compound acts as a promoter for the esterification catalyst. The esterification catalyst used together with the pyrogallol compound is preferably at least one metal catalyst selected from the group consisting of tin compounds, titanium compounds, antimony trioxide, zinc acetate, and germanium dioxide.

The weight ratio of the pyrogallol compound to the esterification catalyst, i.e. pyrogallol compound/esterification catalyst, is preferably from 0.01 to 0.5, more preferably from 0.03 to 0.3, and even more preferably from 0.05 to 0.2, from the viewpoint of storage property of the toner.

The polycondensation resin includes polyesters, polyester-polyamides, and the like, from the viewpoint of low-temperature fixing ability of the toner. The polyesters are preferred from the viewpoint of durability and triboelectric stability of the toner.

Here, the polyester may contain a polyester modified to an extent that the properties are substantially not impaired. For example, a modified polyester refers to a polyester grafted or blocked with phenol, urethane, epoxy, or the like according to a method described in JP-A-Hei-11-133668, JP-A-Hei-10-239903, JP-A-Hei-8-20636 or the like.

In addition, the amorphous resin may be a composite resin containing a polycondensation resin and an addition polymerization resin such as a vinyl resin. The composite resin may be any resin that contains a polycondensation resin and an addition polymerization resin. For example, the composite resin can be obtained by polymerizing raw material monomers for a polycondensation resin and raw material monomers for an addition polymerization resin in the same reaction vessel.

It is preferable that the composite resin is a hybrid resin obtainable by using a dually reactive monomer capable of reacting with both of the raw material monomers for a polycondensation resin and the raw material monomers for an addition polymerization resin, wherein the addition polymerization resin is dispersed more finely and homogeneously in the polycondensation resin. The dually reactive monomer is a compound having in its molecule an ethylenically unsaturated bond, and at least one functional group selected from the group consisting of a hydroxyl group, a carboxyl group, an epoxy group, a primary amino group and a secondary amino group, preferably a hydroxyl group and/or a carboxyl group, and more preferably a carboxyl group. The dually reactive monomer is preferably acrylic acid, methacrylic acid, fumaric acid or the like.

Here, in the present invention, the amount of the dually reactive monomer is included in a total amount of the alcohol component and the carboxylic acid component as the raw material monomers for the polycondensation resin.

The amorphous resin has a softening point of preferably from 90° to 160° C., more preferably from 95° to 155° C., and even more preferably 115° to 150° C., from the viewpoint of low-temperature fixing ability and storage property of the toner. The glass transition temperature is preferably from 45° to 85° C., more preferably from 50° to 80° C., and even more preferably from 58° to 75° C., from the viewpoint of low-temperature fixing ability and storage property of the toner. Here, the glass transition temperature is a property intrinsically owned by an amorphous resin, and is distinguished from the temperature of the maximum endothermic peak.

The acid value is preferably from 5 to 90 mgKOH/g, more preferably from 10 to 80 mgKOH/g, and even more preferably from 10 to 70 mgKOH/g, from the viewpoint of triboelectric chargeability and environmental stability of the toner, and the hydroxyl value is preferably from 1 to 80 mgKOH/g, more preferably from 8 to 60 mgKOH/g, and even more preferably from 8 to 55 mgKOH/g, from the viewpoint of triboelectric chargeability and environmental stability.

On the other hand, the crystalline resin has a melting point of preferably from 70° to 140° C., more preferably from 80° to 120° C., and even more preferably from 90° to 115° C., from the viewpoint of low-temperature fixing ability of the toner. The melting point of the crystalline resin can be determined as the temperature of the maximum endothermic peak of the resin as described later.

The crystalline resin has a softening point of preferably from 60° to 130° C., more preferably from 70° to 125° C., and even more preferably 85° to 120° C., from the viewpoint of low-temperature fixing ability of the toner. The melting point and the softening point of the crystalline resin can be easily adjusted by the adjustment of the composition of raw material monomers, polymerization initiator, molecular weight, amount of catalyst, and the like, or the selection of the reaction conditions.

In the resin binder of the present invention, the weight ratio of the crystalline resin to the amorphous resin, i.e. crystalline resin/amorphous resin, is preferably from 10/90 to 50/50, more preferably from 10/90 to 40/60, even more preferably from 10/90 to 30/70, and still even more preferably from 20/80 to 30/70.

In the toner of the present invention, a known resin binder other than the resin binder of the present invention, for example, a resin including a polyester, a vinyl resin such as styrene-acrylic resin, an epoxy resin, a polycarbonate, or a polyurethane may be used together within the range that would not impair the effects of the present invention. The resin binder of the present invention is contained in an amount of preferably 30% by weight or more, more preferably 50% by weight or more, even more preferably 70% by weight or more, even more preferably 80% by weight or more, even more preferably 90% by weight or more, and even more preferably essentially 100% by weight, of the entire resin binder.

The toner of the present invention may further properly contain an additive such as a colorant, a releasing agent, a charge control agent, a charge control resin, a magnetic powder, a fluidity improver, an electric conductivity modifier, an extender pigment, a reinforcing filler such as a fibrous material, an antioxidant, an anti-aging agent, or a cleanability improver.

As the colorant, all of the dyes, pigments and the like which are used as colorants for toners can be used. The colorant includes carbon blacks, black pigments, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow, and the like. These colorants can be used alone or in admixture of two or more members. The toner of the present invention may be any of black toner and color toner.

The colorant is contained in an amount of preferably from 1 to 40 parts by weight, and more preferably from 2 to 10 parts by weight, based on 100 parts by weight of the resin binder.

The releasing agent includes waxes including polyolefin waxes, paraffin waxes, and silicones; fatty acid amides, such as oleic acid amide, erucic acid amide, ricinoleic acid amide, and stearic acid amide; vegetable waxes, such as carnauba wax, rice wax, candelilla wax, wood wax, and jojoba oil; animal waxes, such as beeswax; and mineral and petroleum waxes, such as montan wax, ozokerite, ceresin, microcrystalline wax, and Fischer-Tropsch wax. These releasing agents can be used alone, or in a mixture of two or more kinds.

The releasing agent has a melting point of preferably from 60° to 160° C., and more preferably from 60° to 150° C., from the viewpoint of low-temperature fixing ability and offset resistance of the toner.

The releasing agent is contained in an amount of preferably from 0.5 to 10 parts by weight, more preferably from 1 to 8 parts by weight, and even more preferably from 1.5 to 7 parts by weight, based on 100 parts by weight of the resin binder, from the viewpoint of dispersibility of the releasing agent in the resin binder.

The charge control agent is not particularly limited, and the charge control agent may contain any one of positively chargeable and negatively chargeable charge control agents.

The positively chargeable charge control agent includes Nigrosine dyes, for example, "Nigrosine Base EX," "Oil Black BS," "Oil Black SO," "BONTRON N-01," "BONTRON N-07," "BONTRON N-09," "BONTRON N-11" (hereinabove manufactured by Orient Chemical Co., Ltd.), and the like; triphenylmethane-based dyes containing a tertiary amine as a side chain; quaternary ammonium salt compounds, for example, "BONTRON P-51" (manufactured by Orient Chemical Co., Ltd.), cetyltrimethylammonium bromide, "COPY CHARGE PX VP435" (manufactured by Hoechst), and the like; polyamine resins, for example, "AFP-B" (manufactured by Orient Chemical Co., Ltd.), and the like; imidazole derivatives, for example, "PLZ-2001," "PLZ-8001" (hereinabove manufactured by SHIKOKU CHEMICAL CORPORATION), and the like.

In addition, the negatively chargeable charge control agent includes metal-containing azo dyes, for example, "VARIFAST BLACK 3804," "BONTRON S-31" (hereinabove manufactured by Orient Chemical Co., Ltd.), "T-77" (manufactured by Hodogaya Chemical Co., Ltd.), "BONTRON S-32," "BONTRON S-34," "BONTRON S-36," (hereinabove manufactured by Orient Chemical Co., Ltd.), "AIZEN SPILON BLACK TRH" (manufactured by Hodogaya Chemical Co., Ltd.), and the like; metal compounds of benzilic acid compounds, for example, "LR-147," "LR-297" (hereinabove manufactured by Japan Carlit, Ltd.), and the like; metal compounds of salicylic acid compounds, for example, "BONTRON E-81," "BONTRON E-84," "BONTRON E-88," "E-304" (hereinabove manufactured by Orient Chemical Co., Ltd.), and the like; "TN-105" (manufactured by Hodogaya Chemical Co., Ltd.); copper phthalocyanine dyes; quaternary ammonium salts, for example, "COPY CHARGE NX VP434" (manufactured by Hoechst), and the like; nitroimidazole derivatives; organometallic compounds, for example, "TN-105" (manufactured by Hodogaya Chemical Co., Ltd.); and the like.

The charge control agent is contained in an amount of preferably from 0.01 to 10 parts by weight, more preferably from 0.01 to 5 parts by weight, even more preferably from 0.3 to 3 parts by weight, still even more preferably from 0.5 to 3 parts by weight, and still even more preferably from 1 to 2 parts by weight, based on 100 parts by weight of the resin binder, from the viewpoint of initial rise in triboelectric charging of the toner.

It is preferable that the toner of the present invention contains a charge control resin in order to improve triboelectric chargeability. The charge control resin is preferably a styrenic resin. A quaternary ammonium salt group-containing styrenic resin is preferred, from the viewpoint of exhibiting positive chargeability of the toner, and a sulfonic acid group-containing styrenic resin is preferred, from the viewpoint of exhibiting negative chargeability of the toner.

The quaternary ammonium salt group-containing styrenic resin is more preferably a quaternary ammonium salt group-containing styrene-acrylic resin obtained by the polymerization of a monomer mixture containing a monomer represented by the formula (IVa):

wherein $R^9$ is a hydrogen atom or a methyl group; a monomer represented by the formula (IVb):

wherein $R^{10}$ is a hydrogen atom or a methyl group, and $R^{11}$ is an alkyl group having 1 to 12 carbon atoms;
a monomer represented by the formula (IVc):

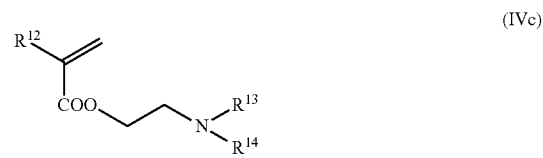

wherein $R^{12}$ is a hydrogen atom or a methyl group, and each of $R^{13}$ and $R^{14}$ is an alkyl group having 1 to 4 carbon atoms, or a quaternary compound thereof. The monomers may be previously subjected to formation of quaternary compounds, or the formation of quaternary compounds may be carried out after the polymerization. A quaternary compound-forming agent includes alkyl halides such as methyl chloride and methyl iodide, diethyl sulfate, di-n-propyl sulfate, and the like.

The monomer represented by the formula (IVa) is preferably a styrene in which $R^9$ is a hydrogen atom, and the monomer represented by the formula (IVb) is a monomer in which $R^{10}$ is preferably a hydrogen atom and $R^{11}$ is an alkyl group having preferably from 1 to 6 carbon atoms, and more preferably from 1 to 4 carbon atoms. Specific examples of the monomer represented by the formula (IVb) include butyl acrylate, 2-ethylhexyl acrylate, and the like. The monomer represented by the formula (IVc) is preferably a monomer in which $R^{12}$ is a methyl group, and $R^{13}$ and $R^{14}$ are a methyl group or an ethyl group, and the monomer is more preferably dimethylaminoethyl methacrylate in which $R^{12}$, $R^{13}$ and $R^{14}$ are a methyl group, each being desirable.

In the quaternary ammonium salt group-containing styrenic resin, it is desirable that the monomer represented by the formula (IVa) is contained in an amount of preferably from 60 to 97% by weight, and more preferably from 70 to 90% by weight, of the monomer mixture, that the monomer represented by the formula (IVb) is contained in an amount of preferably from 1 to 33% by weight, and more preferably from 5 to 20% by weight, of the monomer mixture, and that the monomer represented by the formula (IVc) or a quaternary compound thereof is contained in an amount of preferably from 2 to 35% by weight, and more preferably from 5 to 20% by weight, of the monomer mixture.

Specific examples of the quaternary ammonium salt group-containing styrenic resin obtained from the monomers represented by the formulae (IVa) to (IVc) include butyl acrylate/N,N-diethyl-N-methyl-2-(methacryloyloxy)ethyl ammonium/styrene copolymers, and the like.

It is preferable that the sulfonic acid group-containing styrenic resin is a sulfonic acid group-containing styrenic resin obtained by polymerizing a monomer mixture containing a monomer represented by the formula (IVa), a monomer represented by the formula (IVb), as mentioned above, and a sulfonic acid group-containing monomer.

The sulfonic acid group-containing monomer includes (meth)allylsulfonic acid, 2-(meth)acrylamide-2-methylpropanesulfonic acid, and styrenesulfonic acid. Specific examples of the sulfonic acid group-containing monomer include 2-ethylhexyl acrylate/2-acrylamide-2-methyl-1-propanesulfonic acid/styrene copolymers, and the like.

In the sulfonic acid group-containing styrenic resin, it is desirable that the monomer represented by the formula (IVa) is contained in an amount of preferably from 60 to 97% by weight, and more preferably from 70 to 90% by weight, that the monomer represented by the formula (IVb) is contained in an amount of preferably from 1 to 33% by weight, and more preferably from 5 to 20% by weight, and that the sulfonic acid group-containing monomer is contained in an amount of preferably from 2 to 35% by weight, and more preferably from 5 to 20% by weight, of the monomer mixture.

In both of the quaternary ammonium salt group-containing styrenic resin and the sulfonic acid group-containing styrenic resin, the polymerization of the monomer mixture can be carried out by, for example, heating a monomer mixture to 50° to 100° C. in an inert gas atmosphere in the presence of a polymerization initiator such as azobisdimethylvaleronitrile. Here, the polymerization method may be any of solution polymerization, suspension polymerization, or bulk polymerization, and preferably solution polymerization.

The styrenic resin has a softening point of preferably from 100° to 140° C., and more preferably from 110° to 130° C., from the viewpoint of low-temperature fixing ability of the toner.

The styrenic resin contained as a charge control resin is used in an amount of preferably from 3 to 40 parts by weight, preferably from 4 to 30 parts by weight, and even more preferably from 5 to 20 parts by weight, based on 100 parts by weight of the resin binder, from the viewpoint of exhibiting triboelectric chargeability of the toner.

The toner of the present invention may be a toner obtained by any of conventionally known methods such as a melt-kneading method, an emulsion phase-inversion method, and a polymerization method, and a pulverized toner produced by the melt-kneading method is preferable, from the viewpoint of productivity and dispersibility of a colorant. In the case of a pulverized toner produced by a melt-kneading method, for example, a toner can be produced by homogeneously mixing raw materials such as a resin binder, a colorant, and a charge control agent, with a mixer such as a Henschel mixer, thereafter melt-kneading the mixture with a closed kneader, a single-screw or twin-screw extruder, an open roller-type kneader, or the like, cooling, pulverizing, and classifying the product. On the other hand, a toner produced by the polymerization method is preferable, from the viewpoint of forming a toner having a small particle size.

Also, by using a method including the step of forming particles from raw materials containing a resin binder containing a polyester resin of the present invention in an aqueous medium, triboelectric stability under high-temperature, high-humidity conditions and resistance to background fogging are improved. Therefore, another embodiment of the toner for electrophotography of the present invention is a toner for electrophotography obtained by a method including the step of forming particles from raw materials containing a resin binder in an aqueous medium, wherein the resin binder is a resin obtained by using an aromatic compound represented by the formula (Ia) as a carboxylic acid component and/or an alcohol component. The aromatic compound represented by the formula (Ia) is also effective in the improvement of triboelectric stability under high-temperature, high-humidity conditions (hereinafter also simply referred to as triboelectric stability), as compared to a case where a conventional aromatic carboxylic acid compound such as terephthalic acid or isophthalic acid is used. This is considered to be due to the fact that the aromatic ring is subjected to resonance stabilization, and consequently, electrons are stored in the aromatic ring. Further, since an aromatic compound represented by the formula (Ia) is used upon the step of forming particles from raw material components containing a resin binder in an aqueous medium, resistance to background fogging that is generated upon printing is also improved. This is presumably due to the fact that hydrophilicity is enhanced by a methoxy group, thereby improving emulsifiability of a resin binder, which in turn makes the particle size of the toner more even.

The aromatic compound represented by the formula (Ia) is the same one as that in Embodiment A.

As the carboxylic acid component other than the aromatic compound represented by the formula (Ia), a dicarboxylic acid compound or a tricarboxylic or higher polycarboxylic acid compound can be used.

The dicarboxylic acid compound includes aliphatic dicarboxylic acids such as oxalic acid, malonic acid, maleic acid, fumaric acid, citraconic acid, itaconic acid, glutaconic acid, succinic acid, adipic acid, sebacic acid, and azelaic acid; aromatic dicarboxylic acids such as phthalic acid, isophthalic acid, and terephthalic acid; and alicyclic dicarboxylic acids such as cyclohexanedicarboxylic acid. In the present invention, the acids, anhydrides of these acids, and alkyl(1 to 3 carbon atoms) esters of the acids as mentioned above are collectively referred to herein as the carboxylic acid compound.

It is preferable that the carboxylic acid component contains an aromatic dicarboxylic acid compound, from the viewpoint of storage property. The aromatic dicarboxylic acid compound is contained in an amount of preferably from 10 to 80% by mol, more preferably from 20 to 80% by mol, and even more preferably from 20 to 70% by mol, of the carboxylic acid component, from the viewpoint of low-temperature fixing ability and storage property of the toner.

The tricarboxylic or higher polycarboxylic acid compound includes aromatic carboxylic acids, such as 1,2,4-benzenetricarboxylic acid (trimellitic acid), 2,5,7-naphthalenetricarboxylic acid, and pyromellitic acid; and derivatives such as acid anhydrides and alkyl(1 to 3 carbon atoms) esters thereof.

In the present invention, it is desirable that the carboxylic acid component contains a tricarboxylic or higher polycarboxylic acid compound, preferably a trimellitic acid compound, and more preferably trimellitic anhydride, from the viewpoint of elevating molecular weight of the resin and increasing low-temperature fixing ability and storage property of the toner. The tricarboxylic or higher polycarboxylic acid compound is contained in an amount of preferably from 0.1 to 30% by mol, more preferably from 1 to 25% by mol, and even more preferably from 5 to 25% by mol, of the carboxylic acid component.

Other carboxylic acid compounds include rosins; rosins modified with fumaric acid, maleic acid, or acrylic acid; and the like.

As the alcohol component other than the aromatic compound represented by the formula (Ia), preferred is an alkylene oxide adduct of bisphenol A represented by the formula (II):

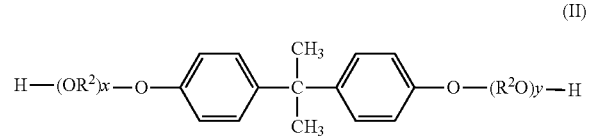

(II)

wherein $R^2O$ and $OR^2$ are an oxyalkylene group, wherein $R^2$ is an ethylene group and/or a propylene group; and each of x and y is a positive number showing an average number of moles of alkylene oxide added, wherein an average number of the sum of x and y is preferably from 1 to 16, more preferably from 1 to 8, and even more preferably from 1.5 to 4, or an aliphatic diol.

The alkylene oxide adduct of bisphenol A is preferred from the viewpoint of the storage property of the toner.

Specific examples of the alkylene oxide adduct of bisphenol A represented by the formula (II) include an alkylene oxide adduct of bisphenol A, such as a polyoxypropylene adduct of 2,2-bis(4-hydroxyphenyl)propane and a polyoxyethylene adduct of 2,2-bis(4-hydroxyphenyl)propane; and the like.

The above-mentioned alkylene oxide adduct of bisphenol A is contained in an amount of preferably from 20 to 100% by mol, more preferably from 30 to 100% by mol, and even more preferably from 50 to 100% by mol, of the alcohol component, from the viewpoint of storage property of the toner.

In a case where the above-mentioned aromatic compound is used as a carboxylic acid component, i.e. in a case where the aromatic compound represented by the formula (Ia) is a hydroxycarboxylic acid having a carboxyl group, hereinafter referred to the same, the above-mentioned alkylene oxide adduct of bisphenol A is contained in an amount of preferably from 30 to 100% by mol, more preferably from 50 to 100% by mol, and even more preferably from 80 to 100% by mol, of the alcohol component, from the viewpoint of storage property of the toner.

In a case where the above-mentioned aromatic compound is used as an alcohol component, i.e. in a case where the aromatic compound represented by the formula (Ia) is an alcohol having no carboxyl groups, hereinafter referred to the same, or in a case where the above-mentioned aromatic compound is used in both of an alcohol component and a carboxylic acid component, the above-mentioned alkylene oxide adduct of bisphenol A is contained in an amount of preferably from 0 to 90% by mol, more preferably from 20 to 80% by mol, and even more preferably from 30 to 80% by mol, of the alcohol component, from the viewpoint of storage property of the toner.

It is preferable that the aliphatic diol is an aliphatic diol having preferably 2 to 8 carbons atoms, and more preferably 2 to 6 carbons atom, from the viewpoint of low-temperature fixing ability of the toner.

The aliphatic diol includes ethylene glycol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 1,4-butenediol, neopentyl glycol, 2,3-butanediol, 2,3-pentanediol, 2,4-pentanediol, 2,3-hexanediol, 3,4-hexanediol, 2,4-hexanediol, 2,5-hexanediol, and the like.

Among them, aliphatic diols having a hydroxyl group bound to a secondary carbon atom are preferred, from the viewpoint of being excellent in low-temperature fixing ability and storage stability of the toner. The aliphatic diols have preferably 3 to 8 carbon atoms, and more preferably 3 to 6 carbon atoms, from the viewpoint of low-temperature fixing ability and storage property. Specific preferred examples include 1,2-propanediol, 1,2-butanediol, 1,3-butanediol, 2,3-butanediol, 1,2-pentanediol, 1,3-pentanediol, 2,3-pentanediol, 2,4-pentanediol, and the like.

Therefore, in a case where the above-mentioned aromatic compound is used as a carboxylic acid component, the carboxylic acid component containing at least one hydroxycarboxylic acid selected from the group consisting of ferulic acid ($X^a$: —CH=CH—COOH, $R^{1a}$: hydrogen atom), 5-hydroxyferulic acid ($X^a$: —CH=CH—COOH, $R^{1a}$: hydroxyl group), vanillic acid ($X^a$: —COOH, $R^{1a}$: H), sinapic acid ($X^a$: —CH=CH—COOH, $R^{1a}$: methoxy group), and syringic acid ($X^a$: —COOH, $R^{1a}$: methoxy group), a polyester resin obtainable therefrom with the above-mentioned aliphatic diol is preferred, from the viewpoint of increased reactivity and a balance among low-temperature fixing ability, storage property, initial rise in triboelectric charging, triboelectric stability, and resistance to background fogging.

The aliphatic diol is contained in an amount of preferably from 20 to 100% by mol, more preferably from 30 to 100% by mol, and even more preferably from 50 to 100% by mol, of the alcohol component, from the viewpoint of low-temperature fixing ability of the toner.

In a case where the above-mentioned aromatic compound is used as a carboxylic acid component, the aliphatic diol is contained in an amount of preferably from 30 to 100% by mol, more preferably from 50 to 90% by mol, and even more preferably from 80 to 100% by mol, of the alcohol component, from the viewpoint of low-temperature fixing ability of the toner.

In a case where the above-mentioned aromatic compound is used as an alcohol component, or in a case where the above-mentioned aromatic compound is used in both of an alcohol component and a carboxylic acid component, the aliphatic diol is contained in an amount of preferably from 0 to 90% by mol, more preferably from 20 to 80% by mol, and even more preferably from 30 to 80% by mol, of the alcohol component, from the viewpoint of low-temperature fixing ability of the toner.

As other alcohols, a trihydric or higher polyhydric alcohol such as glycerol, pentaerythritol, or trimethylolpropane may be used.

Here, the alcohol component may properly contain a monohydric alcohol, and the carboxylic acid component may properly contain a monocarboxylic acid compound, from the viewpoint of adjusting molecular weight of the resin and improving offset resistance of the toner.

The molar ratio of the carboxylic acid component to the alcohol component, i.e. the carboxylic acid component/the alcohol component, is preferably from 0.75 to 1.3, and more preferably from 0.8 to 1.3.

It is preferable that the polycondensation of the alcohol component and the carboxylic acid component is carried out at a temperature of from 160° to 250° C. in an inert gas atmosphere in the presence of an esterification catalyst such as a tin compound or a titanium compound, and it is more preferable that the polycondensation reaction after the addition of the above-mentioned aromatic compound is carried out at preferably from 160° to 210° C., and more preferably from 170° to 200° C., from the viewpoint of reactivity and pyrolysis. More preferably, it is preferable that a dihydric alcohol component other than the above-mentioned aromatic compound and the carboxylic acid component are subjected to a polycondensation reaction, the above-mentioned aromatic compound is then added thereto, and the polycondensation reaction is carried out at a temperature mentioned above, from the viewpoint of reactivity and pyrolysis.

The esterification catalyst is the same as those in Embodiment A.

It is preferable to that a pyrogallol compound having a benzene ring of which three hydrogen atoms bound to carbon atoms adjacent to each other are substituted by hydroxyl groups is used together with an esterification catalyst, from the viewpoint of increasing reactivity of the aromatic compound used in the present invention and improving storage property of the toner.

The pyrogallol compound is the same as those in Embodiment A.

It is considered that the pyrogallol compound acts as a promoter for the esterification catalyst. The esterification catalyst used together with the pyrogallol compound is preferably at least one metal catalyst selected from the group consisting of tin compounds, titanium compounds, antimony trioxide, zinc acetate, and germanium dioxide.

The weight ratio of the pyrogallol compound to the esterification catalyst, i.e. the pyrogallol compound/the esterification catalyst, is preferably from 0.01 to 0.5, more preferably from 0.03 to 0.3, and even more preferably from 0.05 to 0.2, from the viewpoint of storage property of the toner.

The polyester resin of the present invention refers to a resin containing a polyester unit formed by polycondensation of an alcohol component and a carboxylic acid component, which includes not only polyesters but also polyester-polyamides. Among them, the polyesters are preferred from the viewpoint of durability and initial rise in triboelectric charging.

Here, the polyester may contain a polyester modified to an extent that the properties are not substantially impaired.

The modified resins of polyesters are the same as those in Embodiment A.

The softening point, the glass transition temperature, the acid value, and the hydroxyl value of the polyester resin are the same as those in Embodiment A.

In the resin binder, a known resin binder, for example, other resin including a vinyl resin such as styrene-acrylic resin, an epoxy resin, a polycarbonate, or a polyurethane may be used together within the range that would not impair the effects of the present invention. The polyester resin of the present invention is contained in an amount of preferably 70% by weight or more, more preferably 80% by weight or more, even more preferably 90% by weight or more, and even more preferably essentially 100% by weight, of the resin binder.

The toner may further properly contain an additive such as a colorant, a releasing agent, a charge control agent, a charge control resin, a magnetic powder, a fluidity improver, an electric conductivity modifier, an extender pigment, a reinforcing filler such as a fibrous material, an antioxidant, an anti-aging agent, or a cleanability improver.

The releasing agent, the charge control agent, the charge control resin, and the colorant are the same as those mentioned above.

The toner for electrophotography of the present invention is not particularly limited in its production method, so long as the toner is obtained by a method including the step of forming raw materials containing a resin binder according to the present invention into fine particles in an aqueous medium, and the method includes, for example, (A) a method including the steps of previously forming primary particles containing a resin binder in an aqueous medium, and aggregating/unifying the primary particles;

(B) a method including the steps of previously forming primary particles containing a resin binder in an aqueous medium, and fusing the primary particles;

(C) a method including the steps of dispersing raw materials containing a resin binder in an aqueous medium, and forming the dispersion into fine particles, and the like.

In the present invention, the method (A) is preferred, and a method including the steps of (1) introducing an aqueous medium to a mixed solution prepared by dissolving or dispersing raw materials containing a resin binder in an organic solvent, and thereafter removing the organic solvent from the mixture, to provide an aqueous dispersion of primary particles containing a resin binder; and (2) aggregating or unifying the primary particles is preferred. Here, another specific example of the method (A) is a method including the steps of (1') forming primary particles containing a resin binder in an aqueous medium in the presence of a nonionic surfactant, and (2) aggregating or unifying the primary particles.

A specific method of the method (B) includes a method including the steps of subjecting a radical-polymerizable monomer solution in which a resin binder is dissolved to an emulsion polymerization to give fine resin particles, and fusing the resulting fine resin particles in an aqueous medium (see JP-A-2001-42568). A specific example of the method (C) includes a method including the steps of thermally melting raw materials containing a resin binder, dispersing the raw materials in an aqueous medium without containing an organic solvent, while maintaining a molten state of the resin binder, and thereafter drying the dispersion (see JP-A-2001-235904), and the like.

The step (1) is a step of introducing an aqueous medium to a mixed solution prepared by dissolving or dispersing raw materials containing a resin binder in an organic solvent, and thereafter removing the organic solvent from the mixture, to provide an aqueous dispersion of primary particles containing a resin binder.

The organic solvent includes alcoholic solvents such as ethanol, isopropanol, and isobutanol; ketone-based solvents such as acetone, 2-butanone, methyl ethyl ketone, methyl isobutyl ketone, and diethyl ketone; ether-based solvents such as dibutyl ether, tetrahydrofuran, and dioxane; ethyl acetate.

It is preferable that the organic solvent is used in an amount of from 100 to 1,000 parts by weight, based on 100 parts by weight of the resin binder. Water and further a neutralizing agent, as occasion demands, are mixed with the mixed solution while stirring, and thereafter the organic solvent is removed from the resulting dispersion, whereby an aqueous dispersion of primary particles of a self-dispersible resin can be obtained.

The aqueous medium is used in an amount of preferably from 100 to 1,000 parts by weight, based on 100 parts by weight of the organic solvent. Here, the aqueous medium usable in the process (1) and a step (1') described later may contain a solvent such as an organic solvent, and contains water in an amount of preferably 50% by weight or more, preferably 70% by weight or more, more preferably from 90% by weight or more, and even more preferably 99% by weight or more.

Upon stirring the mixture, a generally employed mixing agitator such as an anchor blade can be used.

The neutralizing agent includes an alkali metal of lithium hydroxide, sodium hydroxide, potassium hydroxide, or the like; and organic bases such as ammonia, trimethylamine, ethylamine, diethylamine, triethylamine, triethanolamine, and tributylamine.

In addition, the dispersion of primary particles containing a resin binder can be made into a dispersion, without using an organic solvent, as in the step (1').

The step (1') is a step of forming primary particles containing a resin binder in an aqueous medium in the presence of a nonionic surfactant.

According to the process of the step (1'), a resin binder can be formed into fine particles even when water is used alone without using substantially any organic solvents.

In the step (1'), a resin binder containing a polycondensation resin and a nonionic surfactant are mixed, whereby a dispersion can also be prepared without using an organic solvent. In this step, a viscosity of the mixture is lowered, so that a resin binder can be formed into fine particles. This is due to the fact that a nonionic surfactant is compatible to a resin binder and a viscosity of the mixture is lowered, which results in an apparent lowering of a softening point of the resin. Utilizing this phenomenon, an apparent softening point of a resin binder that is compatible with a nonionic surfactant can be lowered to a temperature of a boiling point of water or lower, so that a dispersion prepared by dispersing a resin binder can be obtained by adding water dropwise under a normal pressure, even with a resin binder having a melting point or softening point of 100° C. or more for the resin alone. In this method, at least water and a nonionic surfactant would be needed, so that the method can be applied to a resin insoluble to an organic solvent, and that loads on the facilities for collecting an organic solvent and maintaining operating environments are unnecessary, and a specialized apparatus that is to be needed when utilizing a mechanical means is also unnecessary, thereby having an advantage that a resin dispersion can be produced economically.

The nonionic surfactant usable in the step (1') includes, for example, polyoxyethylene alkylaryl ethers or polyoxyethylene alkyl ethers such as polyoxyethylene nonylphenyl ether, polyoxyethylene oleyl ether, and polyoxyethylene lauryl ether; polyoxyethylene sorbitan esters such as polyoxyethylene sorbitan monolaurate and polyoxyethylene sorbitan monostearate; polyoxyethylene fatty esters such as polyethylene glycol monolaurate, polyethylene glycol monostearate, polyethylene glycol monooleate; oxyethylene/oxypropylene block copolymers, and the like. In addition, the nonionic surfactant may be used together with an anionic surfactant or a cationic surfactant.

It is preferable to select a nonionic surfactant which has excellent compatibility with a resin binder. In order to obtain a stable dispersion of a resin binder, the nonionic surfactant has an HLB of preferably from 12 to 20, and it is more preferable to use two or more members of nonionic surfactants having different HLB, depending on the members of the resin binders. For example, in a case where a resin has a high hydrophilicity, at least one member of a nonionic surfactant having an HLB of from 12 to 18 may be used. In a case of a resin having high hydrophobicity, it is preferable that a nonionic surfactant having a low HLB, for example, one having an HLB of 7 to 10 or so and a nonionic surfactant having a high HLB, for example, one having an HLB of 14 to 20, are used together, thereby adjusting a weighted average of HLB of both the nonionic surfactants to 12 to 20. In this case, it is presumed that primarily a nonionic surfactant having an HLB of 7 to 10 or so can be made compatible with the resin, and that a nonionic surfactant having a high HLB can serve to stabilize the dispersion of the resin in water.

In addition, in a case where a colorant is used, it is preferable that a nonionic surfactant is adsorbed to the colorant. By adjusting the HLB of the nonionic surfactant to the range mentioned above, the nonionic surfactant is likely to adsorb to the surface of the colorant, whereby the nonionic surfactant can be stably present in the resin binder.

When a resin binder is formed into fine particles in water under a normal pressure, the nonionic surfactant has a cloud point of preferably from 70° to 105° C., and more preferably from 80° to 105° C.

The nonionic surfactant is used in an amount of preferably 5 parts by weight or more, based on 100 parts by weight of the resin binder from the viewpoint of lowering a melting point of the resin binder, and the nonionic surfactant is used in an amount of preferably 80 parts by weight or less, from the viewpoint of controlling the nonionic surfactant remaining in the toner. Therefore, the nonionic surfactant is used in an amount of preferably from 5 to 80 parts by weight, more preferably from 10 to 70 parts by weight, and even more preferably from 20 to 60 parts by weight, based on 100 parts by weight of the resin binder, from the viewpoint of satisfying both of these.

In the step (1'), upon the formation of primary particles containing a resin binder in an aqueous medium in the presence of a nonionic surfactant, it is desirable that the temperature inside the system is kept within a temperature calculated from a cloud point of the nonionic surfactant plus or minus 10° C., preferably plus or minus 8° C., more preferably plus or minus 5° C., from the viewpoint of dispersibility of the nonionic surfactant and prevention of the lowering of dispersion efficiency.

In the step (1'), for example, it is preferable that an aqueous medium (preferably deionized water or distilled water) is added dropwise to a system in a state where a mixture of a resin binder and a nonionic surfactant is stirred and homogeneously mixed. In a case where a colorant is used, it is preferable that a resin binder containing a colorant being made compatible with a nonionic surfactant does not separate from water.

The aqueous medium in the step (1') is used in an amount of preferably from 100 to 3,000 parts by weight, more preferably from 400 to 3,000 parts by weight, and even more preferably from 800 to 3,000 parts by weight, based on 100 parts by weight of the resin binder, from the viewpoint of obtaining homogeneous aggregated particles in the subsequent steps.

The particle size of the primary particles containing a resin binder containing a polycondensation resin can be controlled by an amount of the nonionic surfactant, an extent of stirring, a rate of adding water, or the like. In the step (1'), the rate of adding an aqueous medium to a mixture containing at least a resin binder and a nonionic surfactant is preferably from 0.1 to 50 g/min, more preferably from 0.5 to 40 g/min, and even more preferably from 1 to 30 g/min, per 100 g of the mixture, from the viewpoint of obtaining homogenous primary particles.

In a case where a resin binder has an acidic group such as a carboxyl group or a sulfonate group, water may be added after a part or all of the resin binder is neutralized, or while neutralizing. In a case where a resin binder having an acidic group is used, in addition to the factors of the nonionic surfactant, self-emulsifiability would be a controlling factor for the particle size of the primary particles.

A dispersant can be used for the purposes of lowering a melt viscosity and a melting point of the resin binder, and improving dispersibility of the formed primary particles. The dispersant includes, for example, water-soluble polymers such as polyvinyl alcohol, methyl cellulose, ethyl cellulose, hydroxyethyl cellulose, carboxymethyl cellulose, sodium polyacrylate, and sodium polymethacrylate; anionic surfactants such as sodium dodecylbenzenesulfonate, sodium octadecyl sulfate, sodium oleate, sodium laurate, and potassium stearate; cationic surfactants such as laurylamine acetate, stearylamine acetate, and lauryl trimethylammonium chloride; amphoteric surfactants such as lauryl dimethylamine oxide; and inorganic salts such as tricalcium phosphate, aluminum hydroxide, calcium sulfate, calcium carbonate, and barium carbonate. The dispersant is used in an amount of preferably 20 parts by weight or less, more preferably 15 parts by weight or less, and even more preferably 10 parts by weight or less, based on 100 parts by weight of the resin binder, from the viewpoint of emulsion stability and detergency.

The solid content of the dispersion of the primary particles containing a resin binder obtained in the step (1) or the step (1') (hereinafter also simply referred to as primary particles) is preferably from 7 to 50% by weight, and more preferably from 7 to 40% by weight, from the viewpoint of stability of the dispersion and handling property of the dispersion in the aggregating step. The solid content includes non-volatile components such as a resin and a nonionic surfactant.

The primary particles have an average particle size of preferably from 0.05 to 3 μm, more preferably from 0.05 to 1 and even more preferably from 0.05 to 0.8 μm, from the viewpoint of homogeneously aggregating the primary particles in the subsequent steps. In the present invention, the average particle size of the primary particles refers to a volume-median particle size ($D_{50}$), which can be measured with a laser diffraction particle size analyzer or the like.

Subsequently, the step of aggregating and unifying the primary particles obtained in the step (1) or the step (1') (step (2)) will be explained.

In the step (2), the solid content of the system in the aggregating step of aggregating the primary particles obtained in the step (1) or the step (1') can be adjusted by adding water to a dispersion of a resin binder, and the solid content is preferably from 5 to 50% by weight, more preferably from 5 to 30% by weight, and even more preferably from 5 to 20% by weight, in order to cause homogeneous aggregation.

The pH inside the system in the aggregating step is preferably from 2 to 10, more preferably from 2 to 9, and even more preferably from 3 to 8, from the viewpoint of satisfying both dispersion stability of a mixed solution and aggregating property of the fine particles made of a resin binder or the like.

It is preferable that the temperature inside the system in the aggregating step is a temperature equal to or higher than a temperature calculated from a softening point of a resin binder minus 70° C. or more and equal to or lower than a softening point, from the same viewpoint.

In addition, an additive such as a colorant or a charge control agent may be previously mixed with a resin binder upon the preparation of primary particles, or each additive may be separately dispersed in a dispersion medium such as water to prepare a dispersion, and the dispersion is mixed with primary particles, and subjected to the aggregating step. In a case where an additive is previously mixed with a resin binder upon the preparation of primary particles, it is preferable that the resin binder and the additive are previously melt-kneaded. In the melt-kneading, it is preferable to use an open rollertype twin-screw kneader. The open-roller twin-screw kneader is a kneader containing two rollers arranged in parallel closely to each other, wherein a heating function or a cooling function can be provided by passing a heating medium through each roller. Therefore, the open-roller type twin-screw kneader contains a melt-kneading part that is open, and also is equipped with a heat roller and a cooling roller, so that the open-roller type twin-screw kneader can easily dissipate the kneading heat generated during the melt-kneading, which is different from twin-screw extruders conventionally used.

In the aggregating step, in order to effectively carry out the aggregation, an aggregating agent can be added. As the aggregating agent, a cationic surfactant in the form of a quaternary salt, polyethyleneimine, or the like may be used as an organic aggregating agent, and an inorganic metal salt, a divalent or higher polyvalent metal complex or the like may be used as an inorganic aggregating agent. The inorganic metal salt includes, for example, metal salts such as sodium sulfate, sodium chloride, calcium chloride, calcium nitrate, barium chloride, magnesium chloride, zinc chloride, aluminum chloride, and aluminum sulfate; and inorganic metal salt polymers such as poly(aluminum chloride), poly(aluminum hydroxide), and poly(calcium sulfide).

The amount of the aggregating agent used is preferably 30 parts by weight or less, more preferably 20 parts by weight or less, and even more preferably 10 parts by weight or less, based on 100 parts by weight of the resin binder, from the viewpoint of the environmental resistance of the toner.

Subsequently, the aggregated particles containing at least a resin binder obtained in the above-mentioned aggregating step are heated to unify (unifying step).

The temperature inside the system in the unifying step is preferably equal to or higher than a temperature calculated from the softening point of the resin binder –(minus) 50° C. and equal to or lower than a temperature calculated from the softening point of the resin binder +(plus) 10° C., more preferably equal to or higher than the softening point of the resin binder minus 45° C. and equal to or lower than a temperature calculated from the softening point plus 10° C., and even more preferably equal to or higher than the softening point of the resin binder minus 40° C. and equal to or lower than a temperature calculated from the softening point of the resin binder plus 10° C., from the viewpoint of controlling particle sizes, particle size distribution, and shapes of the intended toner, and fusibility of the aggregate particles. In addition, it is preferable that the stirring rate is a rate at which the aggregate particles are not precipitated. In the present invention, in a case where two or more kinds of resins are mixed and used as a resin binder, a weighted average of softening points of mixed resins is regarded as a softening point of the resin binder.

The unified particles obtained in the step (2) are subjected through the steps such as liquid-solid separation step such as filtration, washing step, and drying step, whereby a toner can be obtained.

In the washing step, it is preferable that an acid is used for removing metal ions on the toner surface, in order to secure satisfactory triboelectric charging properties and reliability as a toner. Also, it is preferable that the added nonionic surfactant is completely removed by washing, and it is preferable that the washing is carried out with an aqueous solution at a temperature equal to or lower than the cloud point of the nonionic surfactant. The washing is carried out preferably plural times.

In addition, in the drying step, any methods such as vibration-type fluidizing drying method, spray-drying method, freeze-drying method, or flash jet method can be employed.

The toner of the present invention has a volume-median particle size ($D_{50}$) preferably from 3 to 15 μm, and more preferably from 3 to 10 μm, irrespective of the production methods. Here, the volume-median particle size ($D_{50}$) as used herein means a particle size at 50% counting from smaller particle sizes in a cumulative volume frequency calculated in volume percentage.

In the toner of the present invention, it is preferable that fine inorganic particles are used as an external additive for improving transferablility. Specific examples preferably include one or more members selected from the group consisting of silica, alumina, titania, zirconia, tin oxide, and zinc oxide. Among them, silica is preferred, and it is more preferable to contain a silica having a small specific gravity, from the viewpoint of preventing embedment.

The silica is preferably a hydrophobic silica that is hydrophobically treated, from the viewpoint of transferability of the toner.

It is preferable that the method of subjecting silica to a hydrophobic treatment includes the step of modifying of a silanol group on the surface of the silica particles with a hydrophobic group such as an alkylsilyl group having 1 to 12 carbon atoms, for example, a methylsilyl group, a hexylsilyl group, or the like, or coating the surface with a hydrophobic resin.

The hydrophobically treating agent for hydrophobically treating the surface of silica particles is exemplified by organochlorosilane, organoalkoxysilane, organodisilazane, cyclic organopolysilazane, linear organopolysiloxane and the like, and specifically include hexamethyldisilazane (HMDS), dimethyldichlorosilane (DMDS), a silicone oil, octyltriethoxysilane (OTES), methyltriethoxysilane, and the like. Among them, hexamethyldisilazane is preferred.

A method of substituting a silanol group on the surface of silica particles with a hydrophobic group such as an alkylsilyl group includes, for example, a method of reacting a water-dispersed silica colloid with an alkali metal salt of an alkylsilanol (see, JP-B-Hei-7-33250 or the like); a method of adding an organic solvent, a cationic surfactant and an alkyltrialkoxysilane to a water-dispersed silica colloid, thereafter subjecting the mixture to an azeotropic dehydration, and then further heating the residue under reflux (see, JP-A-Hei-6-73389); a method of treating a wet silica or dry silica with an alkyltrialkoxysilane, an organohalogenated silicon compound, or the like (see, JP-A-Hei-6-206720, JP-A-Hei-7-187647, or the like), and the like.

In the silica that is hydrophobically treated, at least a part of silanol groups on the surface of silica particles of which is substituted with a hydrophobic group, it is desirable that the silanol groups on the surface of silica particles are substituted with hydrophobic groups in a ratio of preferably 5% by mol or more, more preferably 10% by mol or more, and even more preferably 20% by mol or more.

Here, since the silanol group on the surface of silica particles is capable of ionically adsorbing an amino group or imino group, the percentage of the silanol groups modified by the above-mentioned hydrophobic groups can be known by, for example, measuring amounts of di-n-butylamine adsorbed to the silica before and after the modification reaction, respectively. It is preferable that the treatment amount of the hydrophobically treating agent is from 1 to 7 mg/m$^2$ per surface area of the silica.

The external additive has an average particle size of preferably from 10 to 250 nm, more preferably from 10 to 200 nm, and even more preferably from 15 to 90 nm, from the viewpoint of triboelectric chargeability, flowability, and transferability of the toner.

The external additive is contained in an amount of preferably from 0.05 to 5 parts by weight, more preferably from 0.1 to 3 parts by weight, and even more preferably from 0.3 to 3 parts by weight, based on 100 parts by weight of the toner particles before the treatment with the external additive.

The toner of the present invention can be used as a toner for monocomponent development, or a two-component developer prepared by mixing the toner with a carrier.

EXAMPLES

The present invention will be specifically described hereinbelow by the Examples, without intending to limit the scope of the present invention thereto.

[Softening Point of Resins]

The softening point refers to a temperature at which a half of the sample flows out, when plotting a downward movement of a plunger of a flow tester (Shimadzu Corporation, "CFT-500D"), against temperature, in which a sample is prepared by applying a load of 1.96 MPa thereto with the plunger using the flow tester and extruding a 1 g sample through a nozzle having a die pore size of 1 mm and a length of 1 mm, while heating the sample so as to raise the temperature at a rate of 6° C./min.

[Glass Transition Temperature of Resins]

The glass transition temperature refers to a temperature of an intersection of the extension of the baseline of equal to or lower than the temperature of the maximum endothermic peak and the tangential line showing the maximum inclination between the kick-off of the peak and the top of the peak, which is determined using a differential scanning calorimeter (manufactured by Seiko Instruments, Inc., "DSC 210") of a sample of which temperature is heated at a rate of 10° C./min., the sample prepared by measuring out a sample in an amount of from 0.01 to 0.02 g on an aluminum pan, raising its temperature to 200° C., and cooling the sample from that temperature to 0° C. at a cooling rate of 10° C./min.

[Temperature of Maximum Endothermic Peak of Resins]

A temperature of maximum endothermic peak is obtained by raising the temperature of a sample at a rate of 10° C./min., the sample prepared by raising the temperature of a sample to 200° C. using a differential scanning calorimeter (manufactured by TA Instruments, Japan, "DSC Q20"), and cooling the heated sample from that temperature to 0° C. at a cooling rate of 10° C./min.

[Acid Value of Resins]

The acid value is measured based on a method of JIS K0070, provided that only a measurement solvent is changed from a mixed solvent of ethanol and ether as prescribed in JIS K0070 to a mixed solvent of acetone and toluene (acetone:toluene=1:1 (volume ratio)).

[Hydroxyl Value of Resins]

The hydroxyl value is measured as prescribed by a method of JIS K0070.

[Melting Point of Releasing Agent]

A temperature of maximum endothermic peak obtained by raising the temperature of a sample at a rate of 10° C./min., the sample prepared by raising the temperature of a sample to 200° C. using a differential scanning calorimeter (manufactured by Seiko Instruments, Inc., "DSC 210"), and cooling the heated sample from that temperature to 0° C. at a cooling rate of 10° C./min., is referred to as a melting point.

[Average Particle Size of External Additive]

The average particle size refers to a number-average particle size, which is an average of particle sizes of 500 particles of the external additive, measured from a photograph taken with a scanning electron microscope (SEM). In a case where the particles have length and breath, it refers to the length.

[Volume-Median Particle Size ($D_{50}$) of Toner]
Measuring Apparatus: Coulter Multisizer II (manufactured by Beckman Coulter)
Aperture Diameter: 50 μm
Analyzing Software: Coulter Multisizer AccuComp Ver. 1.19 (manufactured by Beckman Coulter)
Electrolytic Solution: Isotone II (manufactured by Beckman Coulter)
Dispersion: A 5% electrolytic solution of EMULGEN 109P (manufactured by Kao Corporation, polyoxyethylene lauryl ether, HLB: 13.6).
Dispersion Conditions: Ten milligrams of a measurement sample is added to 5 ml of the above-mentioned dispersion, the mixture is dispersed for 1 minute with an ultrasonic disperser, and 25 ml of an electrolytic solution is added to the dispersion, and further dispersed with an ultrasonic disperser for 1 minute.
Measurement Conditions: The above-mentioned sample dispersion is added to 100 ml of the above-mentioned electrolytic solution in a beaker to adjust to a concentration at which particle sizes of 30,000 particles can be measured in 20 seconds, and thereafter the 30,000 particles are measured, and a volume-median particle size ($D_{50}$) is obtained from the particle size distribution.

Example 1

1.1 Production Example 1 of Resins

Resins A1, and A3 to A9

A 5-liter four-neck flask equipped with a dehydration tube equipped with a nitrogen inlet tube, a stirrer, and a thermocouple was charged with raw material monomers other than trimellitic anhydride and an aromatic compound represented by the formula (Ia), and an esterification catalyst, as listed in Table 1-1 or 1-2, and the mixture was subjected to a polycondensation reaction at 230° C. for 10 hours in a nitrogen atmosphere, and further subjected to a reaction at 230° C. and 8.0 kPa for 1 hour. Further, the above aromatic compound as listed in Table 1-1 or 1-2 was added to the reaction mixture, and the mixture was subjected to a reaction at 180° C. for 5 hours. Thereafter, trimellitic anhydride as listed in Table 1-1 or 1-2 was added thereto, and the mixture was subjected to a reaction at 200° C., and subjected to a reaction at 10 kPa until a desired softening point was reached, to provide each of polyesters.

1.2 Production Example 2 for Resin

Resin A2

A 5-liter four-neck flask equipped with a dehydration tube equipped with a nitrogen inlet tube, a stirrer, and a thermocouple was charged with raw material monomers other than an aromatic compound represented by the formula (Ia), and an esterification catalyst, as listed in Table 1-1, and the mixture was subjected to a polycondensation reaction at 230° C. for 10 hours in a nitrogen atmosphere, and further subjected to a reaction at 230° C. and 8.0 kPa for 1 hour. Further, the above aromatic compound as listed in Table 1-1 was added to the reaction mixture, and the mixture was subjected to a reaction at 180° C. for 5 hours, to provide a polyester.

1.3 Production Example 3 for Resin

Resin A10

A 5-liter four-neck flask equipped with a dehydration tube equipped with a nitrogen inlet tube, a stirrer, and a thermocouple was charged with raw material monomers other than trimellitic anhydride and an aromatic compound represented by the formula (Ia), an esterification catalyst, and a polymerization inhibitor, as listed in Table 1-2, and the mixture was subjected to a polycondensation reaction at 200° C. for 8 hours in a nitrogen atmosphere, and further subjected to a reaction at 200° C. and 8.0 kPa for 1 hour. Further, the above aromatic compound as listed in Table 1-2 was added to the reaction mixture, and the mixture was subjected to a reaction at 180° C. for 5 hour. Thereafter, trimellitic anhydride as listed in Table 1-2 was added thereto, and the mixture was subjected to a reaction at 200° C., and subjected to a reaction at 10 kPa until a desired softening point was reached, to provide a polyester.

1.4 Production Example 4 for Resins

Resins A11, A13, A14, and A16 to A22

A 5-liter four-neck flask equipped with a nitrogen inlet tube, dehydration tube equipped with a fractional distillation tube through which hot water at 100° C. was allowed to flow, a stirrer, and a thermocouple was charged with raw material monomers other than trimellitic anhydride and an aromatic compound represented by the formula (Ia), and an esterification catalyst, as listed in Table 1-2 or 1-3, and the mixture was kept at 180° C. for 1 hour in a nitrogen atmosphere, heated from 180° to 230° C. at a rate of 10° C./hr, and then subjected to a polycondensation reaction at 230° C. for 10 hours. Further, the above aromatic compound as listed in Table 1-2 or 1-3 was added to the reaction mixture, and the mixture was subjected to a reaction at 180° C. for 5 hour. Thereafter, trimellitic anhydride as listed in Table 1-2 or 1-3 was added thereto, and the mixture was subjected to a reaction at 200° C., and subjected to a reaction at 10 kPa until a desired softening point was reached, to provide each of polyesters.

1.5 Production Example 5 for Resins

Resins A12 and A15

A 5-liter four-neck flask equipped with a nitrogen inlet tube, a dehydration tube equipped with a fractional distillation tube through which hot water at 100° C. was allowed to flow, a stirrer, and a thermocouple was charged with raw material monomers other than an aromatic compound represented by the formula (Ia), and an esterification catalyst, as listed in Table 1-2, and the mixture was kept at 180° C. for 1 hour in a nitrogen atmosphere, heated from 180° to 230° C. at a rate of 10° C./hr, and then subjected to a polycondensation reaction at 230° C. for 10 hours. Further, the above aromatic compound as listed in Table 1-2 was added to the reaction mixture, and the mixture was subjected to a reaction at 180° C. for 5 hours, to provide each of polyesters.

1.6 Production Example 6 for Resin

Resin B1

A 5-liter four-neck flask equipped with a dehydration tube equipped with a nitrogen inlet tube, a stirrer, and a thermocouple was charged with raw material monomers other than trimellitic anhydride, and an esterification catalyst, as listed in Table 1-4, and the mixture was subjected to a polycondensation reaction at 230° C. for 10 hours in a nitrogen atmosphere, and further subjected to a reaction at 230° C. and 8.0 kPa for 1 hour. Further, trimellitic anhydride as listed in Table 1-4 was added to the reaction mixture, and the mixture was subjected to a reaction at 200° C., and subjected to a reaction at 10 kPa until a desired softening point was reached, to provide a polyester.

1.7 Production Example 7 for Resin

Resin B2

A 5-liter four-neck flask equipped with a dehydration tube equipped with a nitrogen inlet tube, a stirrer, and a thermocouple was charged with raw material monomers, and an esterification catalyst, as listed in Table 1-4, and the mixture was subjected to a polycondensation reaction at 230° C. for 10 hours in a nitrogen atmosphere, and further subjected to a reaction at 230° C. and 8.0 kPa for 1 hour, to provide a polyester.

1.8 Production Example 8 for Resin

Resin B3

A 5-liter four-neck flask equipped with a nitrogen inlet tube, a dehydration tube equipped with a fractional distillation tube through which hot water at 100° C. was allowed to flow, a stirrer, and a thermocouple was charged with raw material monomers other than trimellitic anhydride, and an esterification catalyst, as listed in Table 1-4. The mixture was kept at 180° C. for 1 hour in a nitrogen atmosphere, heated from 180° to 230° C. at a rate of 10° C./hr, and then subjected to a polycondensation reaction at 230° C. for 10 hours. Further, trimellitic anhydride as listed in Table 1-4 was added to the reaction mixture, and the mixture was subjected to a reaction at 200° C., and subjected to a reaction at 10 kPa until a desired softening point was reached, to provide a polyester.

1.9 Production Example 9 for Resin

Resin H1

A 5-liter four-neck flask equipped with a dehydration tube equipped with a nitrogen inlet tube, a stirrer, and a thermocouple was charged with raw material monomers of polyester other than trirnellitic anhydride and an aromatic compound represented by the formula (Ia), and an esterification catalyst, as listed in Table 1-5, and the mixture was heated to 160° C. Thereafter, a mixture of a dually reactive monomer (acrylic acid), raw material monomers of a styrenic resin and a polymerization initiator as listed in Table 1-5 was added dropwise thereto with a dropping funnel over 1 hour. After the dropwise addition, the addition polymerization reaction was matured for 1 hour, while keeping the mixture at 160° C. Thereafter, the mixture was subjected to a polycondensation reaction at 230° C. for 10 hours, and further subjected to a reaction at 230° C. and 8.0 kPa for 1 hour. Further, the above aromatic compound as listed in Table 1-5 was added thereto, and the mixture was subjected to a reaction at 180° C. for 5 hours. Trimellitic anhydride as listed in Table 1-5 was added thereto, and the mixture was subjected to a reaction at 200° C., and subjected to a reaction at 10 kPa until a desired softening point was reached, to provide a hybrid resin.

1.10 Production Example 10 for Resin

Resin H2

A 5-liter four-neck flask equipped with a dehydration tube equipped with a nitrogen inlet tube, a stirrer, and a thermocouple was charged with raw material monomers of polyester other than an aromatic compound represented by the formula (Ia), and an esterification catalyst, as listed in Table 1-5, and the mixture was heated to 160° C. in a nitrogen atmosphere. Thereafter, a mixture of a dually reactive monomer (acrylic acid), raw material monomers of a styrenic resin and a polymerization initiator as listed in Table 1-5 was added dropwise thereto with a dropping funnel over 1 hour. After the dropwise addition, the addition polymerization reaction was matured for 1 hour, while keeping the mixture at 160° C. Thereafter, the mixture was subjected to a polycondensation reaction at 230° C. for 10 hours, and further subjected to a reaction at 230° C. and 8.0 kPa for 1 hour. Further, the above aromatic compound as listed in Table 1-5 was added thereto, and the mixture was subjected to a reaction at 180° C. for 5 hours, to provide a hybrid resin.

1.11 Production Example 11 for Resin

Resin H3

A 5-liter four-neck flask equipped with a dehydration tube equipped with a nitrogen inlet tube, a stirrer, and a thermocouple was charged with raw material monomers of polyester other than trimellitic anhydride, and an esterification catalyst, as listed in Table 1-5, and the mixture was heated to 160° C. in a nitrogen atmosphere. Thereafter, a mixture of a dually reactive monomer (acrylic acid), raw material monomers of a styrenic resin and a polymerization initiator as listed in Table 1-5 was added dropwise thereto with a dropping funnel over 1 hour. After the dropwise addition, the addition polymerization reaction was matured for 1 hour, while keeping the mixture at 160° C., and then the mixture was subjected to a polycondensation reaction at 230° C. for 10 hours, and further subjected to a reaction at 230° C. and 8.0 kPa for 1 hour. Further, trimellitic anhydride as listed in Table 1-5 was added thereto, and the mixture was subjected to a reaction at 200° C., and subjected to a reaction at 10 kPa until a desired softening point was reached, to provide a hybrid resin.

1.12 Production Example 12 for Resin

Resin H4

A 5-liter four-neck flask equipped with a nitrogen inlet tube, a dehydration tube equipped with a fractional distillation tube through which hot water at 100° C. was allowed to flow, a stirrer, and a thermocouple was charged with raw material monomers of polyester other than trimellitic anhydride and an aromatic compound represented by the formula (Ia), and an esterification catalyst, as listed in Table 1-5, and the mixture was heated to 160° C. in a nitrogen atmosphere. Thereafter, a mixture of a dually reactive monomer (acrylic acid), raw material monomers of a styrenic resin and a polymerization initiator as listed in Table 1-5 was added dropwise thereto with a dropping funnel over 1 hour. After the dropwise addition, the addition polymerization reaction was matured for 1 hour, while keeping the mixture at 160° C. Thereafter, the mixture was subjected to a polycondensation reaction at 230° C. for 10 hours, and further subjected to a reaction at 230° C. and 8.0 kPa for 1 hour. After cooling the mixture to 180° C., the above aromatic compound as listed in Table 1-5 was added thereto, and the mixture was subjected to a reaction at 180° C. for 5 hours. Trimellitic anhydride as listed in Table 1-5 was then added thereto, and the mixture was subjected to a reaction at 200° C. and 10 kPa until a desired softening point was reached, to provide a hybrid resin.

TABLE 1-1

| | Resin A1 Amount Used | | Resin A2 Amount Used | | Resin A3 Amount Used | | Resin A4 Amount Used | |
|---|---|---|---|---|---|---|---|---|
| | g | mol | g | mol | g | mol | g | mol |
| Raw Material Monomers | | | | | | | | |
| Alcohol Component | | | | | | | | |
| BPA-PO[1] | 2450 | 7 | 2450 | 7 | 2450 | 7 | 2450 | 7 |
| BPA-EO[2] | 975 | 3 | 975 | 3 | 975 | 3 | 975 | 3 |
| Coniferyl Alcohol[3] | — | — | — | — | — | — | — | — |
| Sinapyl Alcohol[3] | — | — | — | — | — | — | — | — |
| Carboxylic Acid Component | | | | | | | | |
| Ferulic Acid[3] | 388 | 2 | 388 | 2 | 388 | 2 | 388 | 2 |
| Syringic Acid[3] | — | — | — | — | — | — | — | — |
| Terephthalic Acid | 996 | 6 | 996 | 6 | 996 | 6 | 996 | 6 |
| Trimellitic Anhydride | 384 | 2 | — | — | 384 | 2 | 384 | 2 |
| Esterification Catalyst | | | | | | | | |
| Tin(II) 2-Ethylhexanoate | 26.0 | — | 24.0 | — | 26.0 | — | 26.0 | — |
| Pyrogallic Acid | 2.6 | — | 2.4 | — | 2.6 | — | — | — |
| Titanium Catalyst[4] | — | — | — | — | — | — | — | — |
| Softening Point (° C.) | 139.5 | | 100.3 | | 118.6 | | 136.8 | |
| Glass Transition Temp. (° C.) | 68.2 | | 61.3 | | 65.2 | | 66.5 | |
| Acid Value (mgKOH/g) | 25.0 | | 10.2 | | 30.2 | | 26.5 | |
| Hydroxyl Value (mgKOH/g) | 20.6 | | 40.6 | | 38.4 | | 21.5 | |

| | Resin A5 Amount Used | | Resin A6 Amount Used | | Resin A7 Amount Used | | Resin A8 Amount Used | |
|---|---|---|---|---|---|---|---|---|
| | g | mol | g | mol | g | mol | g | mol |
| Raw Material Monomers | | | | | | | | |
| Alcohol Component | | | | | | | | |
| BPA-PO[1] | 2450 | 7 | 1750 | 5 | 2450 | 7 | 1750 | 5 |
| BPA-EO[2] | 975 | 3 | 975 | 3 | 975 | 3 | 975 | 3 |
| Coniferyl Alcohol[3] | — | — | 360 | 2 | — | — | — | — |
| Sinapyl Alcohol[3] | — | — | — | — | — | — | 420 | 2 |
| Carboxylic Acid Component | | | | | | | | |
| Ferulic Acid[3] | 388 | 2 | — | — | — | — | — | — |
| Syringic Acid[3] | — | — | — | — | 396 | 2 | — | — |
| Terephthalic Acid | 996 | 6 | 1162 | 7 | 996 | 6 | 1162 | 7 |
| Trimellitic Anhydride | 384 | 2 | 384 | 2 | 384 | 2 | 384 | 2 |
| Esterification Catalyst | | | | | | | | |
| Tin(II) 2-Ethylhexanoate | — | — | 23.2 | — | 26.0 | — | 23.5 | — |
| Pyrogallic Acid | 2.6 | — | 2.3 | — | 2.6 | — | 2.3 | — |
| Titanium Catalyst[4] | 26.0 | — | — | — | — | — | — | — |
| Softening Point (° C.) | 137.3 | | 138.5 | | 137.2 | | 135.9 | |
| Glass Transition Temp. (° C.) | 65.9 | | 65.2 | | 65.8 | | 65.1 | |
| Acid Value (mgKOH/g) | 25.6 | | 23.4 | | 22.1 | | 23.6 | |
| Hydroxyl Value (mgKOH/g) | 23.5 | | 24.1 | | 24.6 | | 25.7 | |

[1] Polyoxypropylene(2.2)-2,2-bis(4-hydroxyphenyl)propane
[2] Polyoxyethylene(2.2)-2,2-bis(4-hydroxyphenyl)propane
[3] Aromatic compound represented by the formula (Ia)
[4] Titanium diisopropylate bis(triethanolaminate)

TABLE 1-2

| | Resin A9 Amount Used | | Resin A10 Amount Used | | Resin A11 Amount Used | | Resin A12 Amount Used | | Resin A13 Amount Used | | Resin A14 Amount Used | | Resin A15 Amount Used | |
|---|---|---|---|---|---|---|---|---|---|---|---|---|---|---|
| | g | mol | g | mol | g | mol | g | mol | g | mol | g | mol | g | mol |
| Raw Material Monomers | | | | | | | | | | | | | | |
| Alcohol Component | | | | | | | | | | | | | | |
| BPA-PO[1] | 2450 | 7 | 2450 | 7 | — | — | — | — | — | — | — | — | — | — |
| BPA-EO[2] | 975 | 3 | 975 | 3 | — | — | — | — | — | — | — | — | — | — |
| 1,2-Propanediol | — | — | — | — | 1520 | 20 | 1520 | 20 | 1520 | 20 | — | — | — | — |
| 2,3-Butanediol | — | — | — | — | — | — | — | — | — | — | 1350 | 15 | 1350 | 15 |

TABLE 1-2-continued

| | Resin A9 Amount Used | | Resin A10 Amount Used | | Resin A11 Amount Used | | Resin A12 Amount Used | | Resin A13 Amount Used | | Resin A14 Amount Used | | Resin A15 Amount Used | |
|---|---|---|---|---|---|---|---|---|---|---|---|---|---|---|
| | g | mol | g | mol | g | mol | g | mol | g | mol | g | mol | g | mol |
| Carboxylic Acid Component | | | | | | | | | | | | | | |
| Ferulic Acid[3] | 194 | 1 | 388 | 2 | 776 | 4 | 776 | 4 | 776 | 4 | 582 | 3 | 582 | 3 |
| Syringic Acid[3] | 198 | 1 | — | — | — | — | — | — | — | — | — | — | — | — |
| Terephthalic Acid | 996 | 6 | — | — | 1992 | 12 | 2656 | 16 | 1992 | 12 | 1494 | 9 | 1992 | 12 |
| Trimellitic Anhydride | 384 | 2 | 384 | 2 | 768 | 4 | — | — | 768 | 4 | 576 | 3 | — | — |
| Fumaric Acid | — | — | 696 | 6 | — | — | — | — | — | — | — | — | — | — |
| Esterification Catalyst | | | | | | | | | | | | | | |
| Tin(II) 2-Ethylhexanoate | 26.0 | — | 24.5 | — | 25.3 | — | 24.8 | — | 25.3 | — | 20.0 | — | 19.6 | — |
| Pyrogallic acid | 2.6 | — | — | — | 2.5 | — | 2.5 | — | 2.5 | — | 2.0 | — | 2.0 | — |
| Polymerization Inhibitor | | | | | | | | | | | | | | |
| tert-Butyl Catechol | — | — | 2.0 | — | — | — | — | — | — | — | — | — | — | — |
| Softening Point (° C.) | 137.8 | | 142.0 | | 140.1 | | 100.3 | | 115.9 | | 142.5 | | 101.1 | |
| Glass Transition Temp. (° C.) | 68.4 | | 63.5 | | 67.9 | | 58.7 | | 62.5 | | 74.2 | | 59.8 | |
| Acid Value (mgKOH/g) | 23.6 | | 25.4 | | 28.6 | | 41.3 | | 34.9 | | 29.4 | | 36.9 | |
| Hydroxyl Value (mgKOH/g) | 25.4 | | 30.6 | | 31.2 | | 50.6 | | 43.6 | | 30.2 | | 50.4 | |

[1]Polyoxypropylene(2.2)-2,2-bis(4-hydroxyphenyl)propane
[2]Polyoxyethylene(2.2)-2,2-bis(4-hydroxyphenyl)propane
[3]Aromatic compound represented by the formula (Ia)

TABLE 1-3

| | Resin A16 Amount Used | | Resin A17 Amount Used | | Resin A18 Amount Used | | Resin A19 Amount Used | | Resin A20 Amount Used | | Resin A21 Amount Used | | Resin A22 Amount Used | |
|---|---|---|---|---|---|---|---|---|---|---|---|---|---|---|
| | g | mol | g | mol | g | mol | g | mol | g | mol | g | mol | g | mol |
| Alcohol Component | | | | | | | | | | | | | | |
| Ethylene Glycol | — | — | — | — | — | — | — | — | — | — | — | — | 279 | 4.5 |
| 1,2-Propanediol | 1216 | 16 | 1520 | 20 | 1216 | 16 | 1140 | 15 | 1140 | 15 | 1140 | 15 | 798 | 10.5 |
| Coniferyl Alcohol[1] | 720 | 4 | — | — | — | — | — | — | — | — | — | — | — | — |
| Sinapyl Alcohol[1] | — | — | — | — | 840 | 4 | — | — | — | — | — | — | — | — |
| Carboxylic Acid Component | | | | | | | | | | | | | | |
| Ferulic Acid[1] | — | — | — | — | — | — | 1746 | 9 | 291 | 1.5 | 1164 | 6 | 582 | 3 |
| Syringic Acid[1] | — | — | 792 | 4 | — | — | — | — | 297 | 1.5 | — | — | — | — |
| Terephthalic Acid | 2324 | 14 | 1992 | 12 | 2324 | 14 | 1245 | 7.5 | 1494 | 9 | 1494 | 9 | 1494 | 9 |
| Trimellitic Anhydride | 768 | 4 | 768 | 4 | 768 | 4 | 576 | 3 | 576 | 3 | 576 | 3 | 576 | 3 |
| Esterification Catalyst | | | | | | | | | | | | | | |
| Tin(II) 2-Ethylhexanoate | 25.1 | — | 25.4 | — | 25.7 | — | 23.5 | — | 19.0 | — | 21.9 | — | 18.6 | — |
| Pyrogallic Acid | 2.5 | — | 2.5 | — | 2.6 | — | 2.4 | — | 1.9 | — | 2.2 | — | 1.9 | — |
| Softening Point (° C.) | 137.5 | | 140.1 | | 138.4 | | 140.6 | | 138.4 | | 134.1 | | 136.5 | |
| Glass Transition Temp. (° C.) | 64.5 | | 64.3 | | 64.8 | | 67.4 | | 63.1 | | 60.6 | | 58.4 | |
| Acid Value (mgKOH/g) | 31.6 | | 27.8 | | 32.5 | | 29.6 | | 42.1 | | 47.2 | | 28.4 | |
| Hydroxyl Value (mgKOH/g) | 32.5 | | 35.4 | | 31.9 | | 31.2 | | 31.2 | | 31.2 | | 32.4 | |

[1]Aromatic compound represented by the formula (Ia)

TABLE 1-4

| | Resin B1 Amount Used | | Resin B2 Amount Used | | Resin B3 Amount Used | |
|---|---|---|---|---|---|---|
| | g | mol | g | mol | g | mol |
| Raw Material Monomers | | | | | | |
| Alcohol Component | | | | | | |
| BPA-PO[1] | 2450 | 7 | 2450 | 7 | — | — |
| BPA-EO[2] | 975 | 3 | 975 | 3 | — | — |
| 1,2-Propanediol | — | — | — | — | 1520 | 20 |
| Carboxylic Acid Component | | | | | | |
| Terephthalic Acid | 1162 | 7 | 1328 | 8 | 1992 | 12 |
| Trimellitic Anhydride | 384 | 2 | — | — | 768 | 4 |
| Esterification Catalyst | | | | | | |
| Tin(II) 2-Ethylhexanoate | 24.9 | — | 23.8 | — | 21.4 | — |
| Pyrogallic Acid | 2.5 | — | 2.4 | — | 2.1 | — |
| Softening Point (° C.) | 138.6 | | 98.6 | | 118.9 | |
| Glass Transition Temp. (° C.) | 70.5 | | 61.0 | | 63.5 | |
| Acid Value (mgKOH/g) | 20.3 | | 10.2 | | 40.2 | |

TABLE 1-4-continued

|  | Resin B1 Amount Used | | Resin B2 Amount Used | | Resin B3 Amount Used | |
| --- | --- | --- | --- | --- | --- | --- |
|  | g | mol | g | mol | g | mol |
| Hydroxyl Value (mgKOH/g) | 21.4 | | 15.2 | | 51.2 | |

[1] Polyoxypropylene(2.2)-2,2-bis(4-hydroxyphenyl)propane
[2] Polyoxyethylene(2.2)-2,2-bis(4-hydroxyphenyl)propane

TABLE 1-5

|  | Resin H1 Amount Used | | Resin H2 Amount Used | | Resin H3 Amount Used | | Resin H4 Amount Used | |
| --- | --- | --- | --- | --- | --- | --- | --- | --- |
|  | g | mol | g | mol | g | mol | g | mol |
| Raw Material Monomers for Polyester (PES) | | | | | | | | |
| Alcohol Component | | | | | | | | |
| BPA-PO[1] | 1470 | 4.2 | 1470 | 4.2 | 1470 | 4.2 | — | — |
| BPA-EO[2] | 585 | 1.8 | 585 | 1.8 | 585 | 1.8 | — | — |
| 1,2-Propanediol | — | — | — | — | — | — | 1140 | 15 |
| Carboxylic Acid Component | | | | | | | | |
| Ferulic Acid[3] | 232.8 | 1.2 | 232.8 | 1.2 | — | — | 582 | 3 |
| Terephthalic Acid | 597.6 | 3.6 | 597.6 | 3.6 | 697.2 | 4.2 | 1494 | 9 |
| Trimellitic Anhydride | 230.4 | 1.2 | — | — | 230.4 | 1.2 | 576 | 3 |
| Esterification Catalyst | | | | | | | | |
| Tin(II) 2-Ethylhexanoate | 15.7 | — | 14.5 | — | 15.0 | — | 19.0 | — |
| Pyrogallic Acid | 1.6 | — | 1.5 | — | 1.5 | — | 1.9 | — |
| Dually Reactive Monomer | | | | | | | | |
| Acrylic Acid | 22.32 | 0.36 | 22.32 | 0.36 | 22.32 | 0.36 | 55.8 | 0.9 |
| Raw Material Monomers for Styrenic Resin (St) | | | | | | | | |
| Styrene | 659.0 | — | 610.6 | — | 631.0 | — | 796.3 | — |
| 2-Ethylhexyl Acrylate | 125.5 | — | 116.3 | — | 120.2 | — | 151.7 | — |
| Polymerization Initiator | | | | | | | | |
| Dibutyl Peroxide | 47.1 | — | 43.6 | — | 45.1 | — | 56.9 | — |
| Total Amount of PES/Total Amount of St (weight ratio) | 4 | | 4 | | 4 | | 4 | |
| Softening Point (° C.) | 140.3 | | 99.4 | | 118.6 | | 120.3 | |
| Glass Transition Temp. (° C.) | 63.9 | | 59.7 | | 65.3 | | 62.5 | |
| Acid Value (mgKOH/g) | 24.1 | | 17.5 | | 32.4 | | 36.9 | |
| Hydroxyl Value (mgKOH/g) | 22.1 | | 35.2 | | 35.2 | | 50.4 | |

[1] Polyoxypropylene(2.2)-2,2-bis(4-hydroxyphenyl)propane
[2] Polyoxyethylene(2.2)-2,2-bis(4-hydroxyphenyl)propane
[3] Aromatic compound represented by the formula (Ia)

1.13 Examples 1, 5 to 15, 19 to 31 and Comparative Examples 1 to 3

One hundred parts by weight of a resin binder as listed in Table 1-6, 1 part by weight of a negatively chargeable charge control agent "BONTRON S-34" (manufactured by Orient Chemical Co., Ltd.), 4 parts by weight of a colorant "Regal 330R" (manufactured by Cabot Corporation, carbon black), and 2 parts by weight of a polypropylene wax "NP-105" (manufactured by MITSUI CHEMICALS, INC.: melting point 140° C.) were mixed with a Henschel mixer, and the mixture obtained was melt-kneaded with a twin-screw extruder. After cooling, the resulting melt-kneaded product was roughly pulverized. The resulting roughly pulverized product was finely pulverized with an air jet-type pulverizer (IDS-2 Model, manufactured by Nippon Pneumatic Mfg. Co., Ltd.), and classified, to provide toner particles having a volume-median particle size ($D_{50}$) of 7.5 μm.

To 100 parts by weight of the resulting toner particles was added 1.0 part by weight of an external additive hydrophobic silica "Aerosil R-972" (manufactured by Nippon Aerosil Co., Ltd., average particle size: 16 nm, hydrophobic treatment agent: dimethyldichlorosilane), and the mixture was blended with a Henschel mixer, to provide each of the toners.

1.14 Examples 2 to 4

The same procedures as in Example 1 were carried out except that 6 parts by weight of a cyan pigment "Toner Cyan BG" (manufactured by Clariant GmbH, C.I. Pigment Blue 15:3) was used in Example 2, 6 parts by weight of a magenta pigment "Super Magenta R" (manufactured by DIC Corporation, P.R. 122) in Example 3, or 6 parts by weight of a yellow pigment "Paliotol Yellow D1155" (manufactured by BASF, P.Y. 185), in place of the carbon black "Regal 330R" as a colorant, to provide each of toners.

1.15 Example 16

The same procedures as in Example 1 were carried out except that 7 parts by weight of a charge control agent "FCA-701PT" (manufactured by FUJIKURA KASEI CO., LTD.) was used together with a resin binder, a colorant and the like, to provide a toner.

1.16 Example 17

The same procedures as in Example 1 were carried out except that 1.0 part by weight of a hydrophobic silica "TG-C243" (manufactured by Cabot Corporation, average particle size: 100 nm, hydrophobic treatment agents: hexamethyldisilazane and (+) octyltriethoxysilane) was used in place of "Aerosil R-972" as an external additive, to provide a toner.

1.17 Example 18

The same procedures as in Example 1 were carried out except that 1 part by weight of "LR-147" (manufactured by Nippon Carlit, Ltd., boron complex of benzilic acid compound) was used in place of "BONTRON S-34" (manufactured by Orient Chemical Co., Ltd.) as a negatively chargeable charge control agent, to provide a toner.

1.18 Test Example 1

Low-Temperature Fixing Ability

The resulting toner was loaded on a copy machine "AR-505" (manufactured by Sharp Corporation), of which fixing device was modified so that fixing could be carried out outside the machine, provided that the evaluation of Example 16 was made using a modified apparatus of nonmagnetic monocomponent development method printer "HL-2040" (manufactured by Brother Industries Ltd.), to provide unfixed images. While sequentially raising the temperature of a fixing roller from 100° to 240° C. in an increment of 10° C., the unfixed images were subjected to a fixing test at each temperature with a fixing device (fixing speed: 390 mm/sec) adjusted so that a total fixing pressure was 40 kgf. "UNICEF Cellophane" tape (MITSUBISHI PENCIL CO., LTD., width: 18 mm, JIS Z-1522) was adhered to the fixed images, and the resulting fixed images were allowed to pass through a fixing roller set at 30° C., and the tape was then removed. The optical reflective densities of the image before adhesion of the tape and after removal of the tape were measured with a reflective densitometer "RD-915" (manufactured by Macbeth Process Measurements Co.). The temperature of a fixing roller at which the ratio of the optical reflective densities (after removal of the tape/before adhesion of the tape) initially exceeds 90% is defined as the lowest fixing temperature. The low-temperature fixing ability was evaluated according to the following evaluation criteria. The results are shown in Table 1-6. Here, the paper used in the fixing test was CopyBond SF-70NA (75 g/m$^2$), manufactured by Sharp Corporation.

[Evaluation Criteria]
A: Lowest fixing temperature being lower than 150° C.;
B: Lowest fixing temperature being 150° C. or higher and lower than 170° C.; and
C: Lowest fixing temperature being 170° C. or higher.

1.19 Test Example 2

Storage Ability

Four grams of a toner was allowed to stand for 72 hours under environmental conditions of a temperature of 55° C. and relative humidity of 60%. After allowing the toner to stand, the extent of generation of toner aggregation was visually observed, and the storage ability was evaluated in accordance with the following evaluation criteria. The results are shown in Table 1-6.

[Evaluation Criteria]
A: The aggregation is not found at all even after 72 hours.
B: Although the aggregation is not found after 48 hours, the aggregation is found after 72 hours.
C: The aggregation is found within 48 hours.

1.20 Test Example 3

Initial Rise in Triboelectric Charging

A 50 ml polyethylene bottle was charged with 0.6 g of a toner and 19.4 g of a silicone ferrite carrier (manufactured by Kanto Denka Kogyo, average particle size: 90 μm), provided that in Example 16 a carrier was changed to "P-01" (ferrite carrier: standard product of Image Society of Japan, average particle size: 70 μm), and the components were mixed with a ball-mill at a rate of 250 r/min for 10 minutes, and triboelectric charges at the time of 1 minute and 10 minutes were determined with a q/m meter (manufactured by EPPING). After a given period of mixing time, a developer in defined amounts was supplied into a cell provided in the q/m meter, and only the toner was aspirated for 90 seconds with the above-mentioned measurement apparatus through a sieve having a sieve opening of 32 μm (made of stainless steel, twilled, wire diameter: 0.0035 mm). The voltage change generated on the carrier at this time was monitored, and initial rise in triboelectric charging was evaluated in accordance with the following evaluation criteria. The results are shown in Table 1-6.

[Evaluation Criteria]
A value for (triboelectric charges at a mixing time of 1 minute)/(triboelectric charges at a mixing time of 10 minutes) is:
A: 0.95 or more
B: 0.9 or more and less than 0.95
C: less than 0.9

TABLE 1-6

| No. 1- | Resin Binder (Parts by Weight) | Resin (Content (% by mol) of Aromatic Compound) | | Colorant | CCA | CCR | External Additive | Low-Temp. Fixing Ability | Storage Ability | Initial Rise in Triboelectric Charging |
|---|---|---|---|---|---|---|---|---|---|---|
| Ex. 1  | Resin A1/Resin A2 = 50/50 | A1(10)   | A2(11.1) | Black   | S-34 | — | R-972 | B | A | A |
| Ex. 2  | Resin A1/Resin A2 = 50/50 | A1(10)   | A2(11.1) | Yellow  | S-34 | — | R-972 | B | A | A |
| Ex. 3  | Resin A1/Resin A2 = 50/50 | A1(10)   | A2(11.1) | Magenta | S-34 | — | R-972 | B | A | A |
| Ex. 4  | Resin A1/Resin A2 = 50/50 | A1(10)   | A2(11.1) | Cyan    | S-34 | — | R-972 | B | A | A |
| Ex. 5  | Resin A1/Resin B2 = 50/50 | A1(10)   | B2(0)    | Black   | S-34 | — | R-972 | B | A | B |
| Ex. 6  | Resin B1/Resin A2 = 50/50 | B1(0)    | A2(11.1) | Black   | S-34 | — | R-972 | B | A | B |
| Ex. 7  | Resin A3 = 100            | A3(10)   |          | Black   | S-34 | — | R-972 | B | B | A |
| Ex. 8  | Resin A4/Resin A2 = 50/50 | A4(10)   | A2(11.1) | Black   | S-34 | — | R-972 | B | B | A |
| Ex. 9  | Resin A5/Resin A2 = 50/50 | A5(10)   | A2(11.1) | Black   | S-34 | — | R-972 | B | B | A |
| Ex. 10 | Resin A6/Resin A2 = 50/50 | A6(10.5) | A2(11.1) | Black   | S-34 | — | R-972 | B | B | A |
| Ex. 11 | Resin A7/Resin A2 = 50/50 | A7(10)   | A2(11.1) | Black   | S-34 | — | R-972 | B | B | A |
| Ex. 12 | Resin A8/Resin A2 = 50/50 | A8(10.5) | A2(11.1) | Black   | S-34 | — | R-972 | B | B | A |
| Ex. 13 | Resin A9/Resin A2 = 50/50 | A9(10)   | A2(11.1) | Black   | S-34 | — | R-972 | A | A | A |
| Ex. 14 | Resin H1/Resin H2 = 50/50 | H1(10)   | H2(11.1) | Black   | S-34 | — | R-972 | B | B | A |

TABLE 1-6-continued

| No. 1- | Resin Binder (Parts by Weight) | Resin (Content (% by mol) of Aromatic Compound) | | Colorant | CCA | CCR | External Additive | Low-Temp. Fixing Ability | Storage Ability | Initial Rise in Triboelectric Charging |
|---|---|---|---|---|---|---|---|---|---|---|
| Ex. 15 | Resin H1/Resin A2 = 50/50 | H1(10) | A2(11.1) | Black | S-34 | — | R-972 | B | B | A |
| Ex. 16 | Resin A1/Resin A2 = 50/50 | A1(10) | A2(11.1) | Black | S-34 | FCA-701PT | R-972 | B | A | B |
| Ex. 17 | Resin A1/Resin A2 = 50/50 | A1(10) | A2(11.1) | Black | S-34 | — | TG-C243 | B | A | A |
| Ex. 18 | Resin A1/Resin A2 = 50/50 | A1(10) | A2(11.1) | Black | LR-147 | — | R-972 | B | A | A |
| Ex. 19 | Resin A11/Resin A12 = 50/50 | A11(10) | A12(10) | Black | S-34 | — | R-972 | A | A | A |
| Ex. 20 | Resin A11/Resin A2 = 50/50 | A11(10) | A2(11.1) | Black | S-34 | — | R-972 | B | A | A |
| Ex. 21 | Resin A13 = 100 | | A13(10) | Black | S-34 | — | R-972 | A | B | A |
| Ex. 22 | Resin A14/Resin A15 = 50/50 | A14(10) | A15(10) | Black | S-34 | — | R-972 | A | A | A |
| Ex. 23 | Resin H4 = 100 | | H4(10) | Black | S-34 | — | R-972 | B | B | A |
| Ex. 24 | Resin A10/Resin A2 = 50/50 | A10(10) | A2(11.1) | Black | S-34 | — | R-972 | B | B | A |
| Ex. 25 | Resin A16/Resin A12 = 50/50 | A16(10.5) | A12(10) | Black | S-34 | — | R-972 | A | B | A |
| Ex. 26 | Resin A17/Resin A12 = 50/50 | A17(10) | A12(10) | Black | S-34 | — | R-972 | A | B | A |
| Ex. 27 | Resin A18/Resin A12 = 50/50 | A18(10.5) | A12(10) | Black | S-34 | — | R-972 | A | B | A |
| Ex. 28 | Resin A19/Resin A12 = 50/50 | A19(10) | A12(10) | Black | S-34 | — | R-972 | A | A | A |
| Ex. 29 | Resin A20/Resin A12 = 50/50 | A20(18.2) | A12(10) | Black | S-34 | — | R-972 | A | B | A |
| Ex. 30 | Resin A21/Resin A12 = 50/50 | A21(26) | A12(10) | Black | S-34 | — | R-972 | A | B | A |
| Ex. 31 | Resin A22/Resin A13 = 50/50 | A23(10) | A13(10) | Black | S-34 | — | R-972 | A | B | A |
| Comp. Ex. 1 | Resin B1/Resin B2 = 100 | B1(0) | B2(0) | Black | S-34 | — | R-972 | B | A | C |
| Comp. Ex. 2 | Resin H3 = 100 | | H3(0) | Black | S-34 | — | R-972 | C | B | C |
| Comp. Ex. 3 | Resin B3 = 100 | | B3(0) | Black | S-34 | — | R-972 | A | B | C |

It can be seen from the above results that the toners of Examples 1-1 to 1-31 containing as a resin binder a polyester resin obtained using a specific aromatic compound as a carboxylic acid component and/or alcohol component are favorable in both low-temperature fixing ability and storage ability of the toner, and excellent in initial rise in triboelectric charging of the toner, as compared to the toners of Comparative Examples 1-1 to 1-3.

Example 2

Analysis by Mass Spectroscopy-Gas Chromatography of Alkylene Compounds

CI ion source and the following analytical column were attached to a mass spectroscopy-gas chromatograph (GC/MS), and the gas chromatograph is started up. Here, a CI reactive gas (methane) is allowed to pass through the gas chromatograph, and tuning is carried out after 24 hours passed from the operation of vacuum-gas discharging of the MS section.

(1) GC
Gas chromatograph: Agilent, HP6890N
Analyzing column: manufactured by HP, Ultra 1 (column length: 50 m, inner diameter: 0.2 mm, film thickness: 0.33 μm)
Heating Conditions for GC Oven: Initial Temperature 100° C. (0 min)
    First-Stage Heating Rate: 1° C./min (up to 150° C.)
    Second-Stage Heating Rate: 10° C./min (up to 300° C.)
    Final Temperature: 300° C. (10 min)
Amount of Sample Injected: 1 μL
Injection Inlet Conditions: Injection Mode split method
    Split Ratio: 50:1
    Injection Inlet Temperature: 300° C.
Carrier Gas: Gas: Helium
    Flow Rate: 1 ml/min (Constant flow rate mode)
(2) Detector
Mass Spectrometer: manufactured by Agilent, 5973N MSD
Ionization Method Chemical ionization method
Reactive Gas: Isobutane
Temperature setting: Quadripole 150° C.
    Ion Source 250° C.
Detection Conditions: Scan
Scanning Range: m/z 75-300
Detector ON-Time: 5 min
Calibration (Mass Calibration and Sensitivity Adjustment):

| ReactiveGas | methane |
|---|---|
| Calibrant | PFDTD (Perfluoro-5,8-dimethyl-3,6,9-trioxydodecane) |
| Tuning method | auto-tuning |

(3) Preparation of Sample
Propylene tetramer is dissolved in isopropyl alcohol at a concentration of 5% by weight.
(Data Processing Method)
Mass chromatograph that corresponds to each of the molecular ions is extracted for a certain alkene component having each of the carbon atoms of which number of carbon atoms is within the range of from 9 to 14, and integration is executed in accordance with the integration condition for each component under the conditions of S/N (signal/noise ratio)>3. From the detection results as listed in each of Tables 2-1 to 2-5, a proportion of a particular alkyl chain component is calculated in accordance with the following formula.

Proportion of Particular Alkyl Chain Component = [Math. 1]

$$\frac{\text{Total Sum of Integral of Particular Alkyl Chain}}{\text{Total Sum of Integral of All the C9-C14}} \times 100 (\%)$$

TABLE 2-1

| | Molecular Weight Mw | Molecular Ion M/Z | Monitored Mass Range M/Z-M/Z |
|---|---|---|---|
| C9H18 | 126 | 127 | 126.70-127.70 |
| C10H20 | 140 | 141 | 140.70-141.70 |
| C11H22 | 154 | 155 | 154.70-155.70 |
| C12H24 | 168 | 169 | 168.70-169.70 |

TABLE 2-1-continued

| | Molecular Weight Mw | Molecular Ion M/Z | Monitored Mass Range M/Z-M/Z |
|---|---|---|---|
| C13H26 | 182 | 183 | 182.70-183.70 |
| C14H28 | 196 | 197 | 196.70-197.70 |

(4) Integration Conditions $C_9H_{18}$

TABLE 2-2

| Integration Conditions | Value (V) | Time (T) |
|---|---|---|
| Initial Area Reject | 0 | Initial |
| Initial Peak Width | 0.200 | Initial |
| Shoulder Detection | OFF | Initial |
| Initial Threshold | 5.0 | Initial |
| Peak Width | 2.000 | 5.000 |

$C_{10}H_{20}$

TABLE 2-3

| Integration Conditions | Value (V) | Time (T) |
|---|---|---|
| Initial Area Reject | 0 | Initial |
| Initial Peak Width | 0.200 | Initial |
| Shoulder Detection | OFF | Initial |
| Initial Threshold | 7.0 | Initial |
| Peak Width | 2.000 | 5.000 |

$C_{11}H_{22}$, $C_{12}H_{24}$ and $C_{13}H_{26}$

TABLE 2-4

| Integration Conditions | Value (V) | Time (T) |
|---|---|---|
| Initial Area Reject | 0 | Initial |
| Initial Peak Width | 0.200 | Initial |
| Shoulder Detection | OFF | Initial |
| Initial Threshold | 7.0 | Initial |
| Peak Width | 2.000 | 5.000 |

$C_{24}H_{28}$

TABLE 2-5

| Integration Conditions | Value (V) | Time (T) |
|---|---|---|
| Initial Area Reject | 0 | Initial |
| Initial Peak Width | 0.200 | Initial |
| Shoulder Detection | OFF | Initial |
| Initial Threshold | 5.0 | Initial |
| Peak Width | 2.000 | 11.000 |

In the present invention, the alkylene compound corresponding to 9 to 14 carbon atoms refers to peaks corresponding to the molecular ions according to gas chromatography mass spectroscopy.

2.1 Production Example of Alkylene Compound A

Using a propylene tetramer manufactured by Nippon Oil Corporation (trade name: Light Tetramer), fractional distillation was carried out under the heating conditions of from 183° to 208° C., to provide an alkylene compound A. The resulting alkylene compound A had 40 peaks in gas chromatography mass spectroscopy. The distribution of the alkylene compound was as follows: C9: 0.5% by weight, C10: 4% by weight, C11: 20% by weight, C12: 66% by weight, C13: 9% by weight, and C14: 0.5% by weight.

2.2 Production Example of Alkylene Compound B

The same procedures were carried out except that the fractional distillation conditions were changed to from 171° to 175° C. in Production Example of the alkylene compound A, to provide an alkylene compound B. The resulting alkylene compound B had 25 peaks in gas chromatography mass spectroscopy. The distribution of the alkylene compound was similar to the distribution of the alkylene compound A.

2.3 Production Example of Alkenylsuccinic Anhydride A

A 1 L-autoclave manufactured by Nitto Kouatsu Co., Ltd. was charged with 542.4 g of the alkylene compound A, 157.2 g of maleic anhydride, 0.4 g of Chelex-O (manufactured by Sakai Chemical Co., Ltd.), 0.1 g of butylhydroquinone, and pressurized nitrogen replacements (0.2 MPaG) were repeated 3 times. After starting to stir the contents at 60° C., the contents were heated over 1 hour up to 230° C., and subjected to a reaction for 6 hours. The pressure at the time of reaching the reaction temperature was 0.3 MPaG. After the termination of the reaction, the reaction mixture was cooled to 80° C., and allowed its pressure to return to a normal pressure (101.3 kPa), and transferred to a 1 L four-neck flask. The contents were heated to 180° C. while stirring, and the residual alkylene compound was distilled off at 1.3 kPa in 1 hour. Subsequently, the distillate was cooled to room temperature (25° C.), and allowed to return to a normal pressure (101.3 kPa), to provide 406.1 g of an intended product alkenylsuccinic anhydride A. The average molecular weight (Mw) of the alkenylsuccinic anhydride A obtained from the acid value was 268.

2.4 Production Example of Alkenylsuccinic Anhydride B

The same procedures as in Production Example of the alkenylsuccinic anhydride A were carried out except that the alkylene compound B was used in place of the alkylene compound A as a raw material, to provide an alkenylsuccinic anhydride B (average molecular weight: 268).

2.5 Production Example 1 of Resins

Resins 1 to 3, 5 to 8, 10, and 13 to 15

A 5-liter four-neck flask equipped with a nitrogen inlet tube, a dehydration tube equipped with a fractional distillation tube through which hot water at 100° C. was allowed to flow, a stirrer, and a thermocouple was charged with raw material monomers (an alcohol component and a carboxylic acid component) other than trimellitic anhydride and an aromatic compound represented by the formula (Ia), and an esterification catalyst, as listed in Tables 2-6 to 2-8, and the mixture was subjected to a reaction at 180° C. in a nitrogen atmosphere, heated from 180° to 230° C. at a rate of 5° C./hr, and then subjected to a polycondensation reaction at 230° C. until a conversion rate reached 90%. Further, the reaction mixture was cooled to a temperature of 180° C., the above aromatic compound as listed in Tables 2-6 to 2-8 was added thereto, and the mixture was subjected to a reaction at 180° C. for 5 hours. Thereafter, trimellitic anhydride as listed in Table 2-6 to 2-8 was added thereto, and the mixture was subjected to a reaction at 210° C., and a normal pressure for 1 hour, and then subjected to a reaction at 10 kPa until a desired softening point was reached, to provide polyesters.

2.6 Production Example 2 of Resin

Resin 4

A 5-liter four-neck flask equipped with a dehydration tube equipped with a nitrogen inlet tube, a stirrer, and a thermocouple was charged with raw material monomers (an alcohol component and a carboxylic acid component) other than trimellitic anhydride and an aromatic compound represented by the formula (Ia), and an esterification catalyst, as listed in Table 2-6, and the mixture was subjected to a polycondensation reaction at 235° C. in a nitrogen atmosphere until a conversion rate reached 90%, and further subjected to a reaction at 235° C. and 8.0 kPa for 1 hour. Further, the reaction mixture was cooled to a temperature of 180° C., the above aromatic compound as listed in Table 2-6 was added thereto, and the mixture was subjected to a reaction at 180° C. for 5 hours. Thereafter, the trimellitic anhydride as listed in Table 2-6 was added thereto, and the mixture was subjected to a reaction at 200° C., and then subjected to a reaction at 10 kPa until a desired softening point was reached, to provide a polyester.

2.7 Production Example 3 of Resin

Resin 9

A 5-liter four-neck flask equipped with a nitrogen inlet tube, a dehydration tube equipped with a fractional distillation tube through which hot water at 100° C. was allowed to flow, a stirrer, and a thermocouple was charged with raw material monomers (an alcohol component and a carboxylic acid component) other than trimellitic anhydride and an aromatic compound represented by the formula (Ia), and an esterification catalyst, as listed in Table 2-7, and the mixture was subjected to a reaction at 180° C. for 2 hours in a nitrogen atmosphere, heated from 180° to 230° C. at a rate of 5° C./hr, and thereafter subjected to a polycondensation reaction at 230° C. until a conversion rate reached 90%. Further, the reaction mixture was cooled to 180° C., the above aromatic compound as listed in Table 2-7 was added thereto, and the mixture was subjected to a reaction at 180° C. for 5 hours. Thereafter, fumaric acid, trimellitic anhydride, and 0.5 g of a polymerization inhibitor (tert-butyl catechol) as listed in Table 2-7 were added thereto, and the mixture was subjected to a reaction at from 180° to 210° C. and a normal pressure for 5 hours, and then subjected to a reaction at 10 kPa until a desired softening point was reached, to provide a polyester.

2.8 Production Example 4 of Resin

Resin 11

A 5-liter four-neck flask equipped with a dehydration tube equipped with a nitrogen inlet tube, a stirrer, and a thermocouple was charged with raw material monomers (an alcohol component and a carboxylic acid component) of polyester other than trimellitic anhydride and an aromatic compound represented by the formula (Ia), and an esterification catalyst, as listed in Table 2-9, and the mixture was heated to 160° C. in a nitrogen atmosphere. Thereafter, a mixture of a dually reactive monomer (acrylic acid), raw material monomers of a styrenic resin and a polymerization initiator, as listed in Table 2-9 was added dropwise thereto with a dropping funnel over 1 hour. After the dropwise addition, the addition polymerization reaction was matured for 1 hour, while keeping the mixture at 160° C. Thereafter, the reaction mixture was heated to 180° C., and subjected to a reaction for 2 hours, then heated to 210° C. at a rate of 5° C./hr, and subjected to a reaction at 210° C. until a conversion rate reached 90%. Thereafter, the reaction mixture was cooled to 180° C., the above aromatic compound as listed in Table 2-9 was added thereto, and the mixture was subjected to a reaction at 180° C. for 5 hours. Thereafter, trimellitic anhydride as listed in Table 2-9 was added thereto, and the mixture was subjected to a reaction at 200° C., and then subjected to a reaction at 10 kPa until a desired softening point was reached, to provide a hybrid resin.

2.9 Production Example 5 of Resin

Resin 12

A 5-liter four-neck flask equipped with a nitrogen inlet tube, a dehydration tube equipped with a fractional distillation tube through which hot water at 100° C. was allowed to flow, a stirrer, and a thermocouple was charged with raw material monomers (an alcohol component and a carboxylic acid component) and an esterification catalyst, as listed in Table 2-7, and the mixture was subjected to a reaction at 180° C. in a nitrogen atmosphere, heated from 180° to 210° C. at a rate of 5° C./hr, and then subjected to a reaction at 10 kPa until a desired softening point was reached, to provide a polyester.

2.10 Production Example 6 of Resins

Resins 16, 17, and 19

A 5-liter four-neck flask equipped with a nitrogen inlet tube, a dehydration tube equipped with a fractional distillation tube through which hot water at 100° C. was allowed to flow, a stirrer, and a thermocouple was charged with raw material monomers (an alcohol component and a carboxylic acid component) other than trimellitic anhydride, and an esterification catalyst, as listed in Table 2-8, and the mixture was subjected to a reaction at 180° C. for 2 hours in a nitrogen atmosphere, heated from 180° to 230° C. at a rate of 5° C./hr, and thereafter subjected to a polycondensation reaction at 230° C. until a conversion rate reached 90%. Further, the above aromatic compound as listed in Table 2-8 was added thereto, and the mixture was subjected to a reaction at 180° C. for 5 hours. Thereafter, trimellitic anhydride as listed in Table 2-8 was added thereto, and the mixture was subjected to a reaction at 210° C. and a normal pressure for 1 hour, and then subjected to a reaction at 10 kPa until a desired softening point was reached, to provide polyesters.

2.11 Production Example 7 of Resin

Resin 18

A 5-liter four-neck flask equipped with a dehydration tube equipped with a nitrogen inlet tube, a stirrer, and a thermocouple was charged with raw material monomers other than trimellitic anhydride, and an esterification catalyst, as listed in Table 2-8, and the mixture was subjected to a polycondensation reaction at 235° C. in a nitrogen atmosphere until a conversion rate reached 90%, and further subjected to a reaction at 235° C. in 8.0 kPa for 1 hour. Thereafter, the reaction mixture was cooled to 210° C., trimellitic anhydride as listed in Table 2-8 was added thereto, and the mixture was subjected to a reaction at 210° C. and a normal pressure for 1 hour, and then subjected to a reaction at 10 kPa until a desired softening point was reached, to provide a polyester.

TABLE 2-6

| | Resin 1 Amount Used | | | Resin 2 Amount Used | | | Resin 3 Amount Used | | |
|---|---|---|---|---|---|---|---|---|---|
| | g | mol | molar ratio | g | mol | molar ratio | g | mol | molar ratio |
| Alcohol Component | | | | | | | | | |
| 1,2-Propanediol | 1216 | 16 | 80 | 1216 | 16 | 80 | 1216 | 16 | 80 |
| 2,3-Butanediol | 360 | 4 | 20 | 360 | 4 | 20 | 360 | 4.7 | 20 |
| BPA-PO[1] | — | — | — | — | — | — | — | — | — |
| BPA-EO[2] | — | — | — | — | — | — | — | — | — |
| Coniferyl Alcohol[3] | — | — | — | — | — | — | — | — | — |
| Carboxylic Acid Component | | | | | | | | | |
| Ferulic Acid[3] | 1164 | 5.9 | 30 | 1164 | 5.9 | 30 | 1164 | 6 | 30 |
| Syringic Acid[3] | — | — | — | — | — | — | — | — | — |
| Terephthalic Acid | 1660 | 10 | 50 | 664 | 4 | 20 | 2158 | 13 | 65 |
| Alkenylsuccinic Anhydride A | 1072 | 4 | 20 | 2680 | 10 | 50 | 268 | 1 | 5 |
| Trimellitic Anhydride | 384 | 2 | 10 | 384 | 2 | 10 | 384 | 2 | 10 |
| Esterification Catalyst (including promoter) | | | | | | | | | |
| Tin(II) 2-Ethylhexanoate | 29.3 | — | — | 32.3 | — | — | 27.8 | — | — |
| Pyrogallic Acid | 2.9 | — | — | 3.2 | — | — | 2.8 | — | — |
| Softening Point (° C.) | | 102.1 | | | 103.4 | | | 101.5 | |
| Glass Transition Temp. (° C.) | | 57.3 | | | 51.6 | | | 60.2 | |
| Acid Value (mgKOH/g) | | 25.4 | | | 20.7 | | | 30.4 | |
| Hydroxyl Value (mgKOH/g) | | 36.4 | | | 32.1 | | | 39.7 | |

| | Resin 4 Amount Used | | | Resin 5 Amount Used | | | Resin 6 Amount Used | | |
|---|---|---|---|---|---|---|---|---|---|
| | g | mol | molar ratio | g | mol | molar ratio | g | mol | molar ratio |
| Alcohol Component | | | | | | | | | |
| 1,2-Propanediol | — | — | — | 912 | 12 | 80 | 798 | 10.5 | 70 |
| 2,3-Butanediol | — | — | — | 270 | 3.6 | 20 | 270 | 3.6 | 20 |
| BPA-PO[1] | 3675 | 48.4 | 70 | — | — | — | — | — | — |
| BPA-EO[2] | 1462.5 | 19.2 | 30 | — | — | — | — | — | — |
| Coniferyl Alcohol[3] | — | — | — | — | — | — | 540 | 7.1 | 20 |
| Carboxylic Acid Component | | | | | | | | | |
| Ferulic Acid[3] | 1164 | 5.9 | 30 | — | — | — | 1164 | 5.9 | 30 |
| Syringic Acid[3] | — | — | — | 891 | 4.5 | 30 | — | — | — |
| Terephthalic Acid | 1660 | 10 | 50 | 1245 | 7.5 | 50 | 1660 | 10 | 50 |
| Alkenylsuccinic Anhydride A | 1072 | 4 | 20 | 804 | 3 | 20 | 1072 | 4 | 20 |
| Trimellitic Anhydride | 384 | 2 | 10 | 288 | 1.7 | 10 | 384 | 2 | 10 |
| Esterification Catalyst (including promoter) | | | | | | | | | |
| Tin(II) 2-Ethylhexanoate | 47.1 | — | — | 22.1 | — | — | 29.4 | — | — |
| Pyrogallic Acid | 4.7 | — | — | 2.2 | — | — | 2.9 | — | — |
| Softening Point (° C.) | | 102.2 | | | 105.9 | | | 104.4 | |
| Glass Transition Temp. (° C.) | | 56.7 | | | 56.6 | | | 55.8 | |
| Acid Value (mgKOH/g) | | 19.4 | | | 24.7 | | | 28.7 | |
| Hydroxyl Value (mgKOH/g) | | 27.4 | | | 39.6 | | | 40.5 | |

[1] Polyoxypropylene(2.2)-2,2-bis(4-hydroxyphenyl)propane
[2] Polyoxyethylene(2.0)-2,2-bis(4-hydroxyphenyl)propane
[3] Aromatic compound represented by the formula (Ia)

TABLE 2-7

| | Resin 7 Amount Used | | | Resin 8 Amount Used | | | Resin 9 Usable Amount | | |
|---|---|---|---|---|---|---|---|---|---|
| | g | mol | molar ratio | g | mol | molar ratio | g | mol | molar ratio |
| Alcohol Component | | | | | | | | | |
| 1,2-Propanediol | 1064 | 14 | 70 | 1216 | 16 | 80 | 1216 | 16 | 80 |
| 2,3-Butanediol | 360 | 4 | 20 | 360 | 4 | 20 | 360 | 4.7 | 20 |
| Sinapyl Alcohol | 840 | 4.7 | 20 | — | — | — | 840 | 4 | 20 |

TABLE 2-7-continued

| Carboxylic Acid Component | | | | | | | | | |
|---|---|---|---|---|---|---|---|---|---|
| Ferulic Acid | 1164 | 5.9 | 30 | 873 | 4.5 | 30 | 873 | 4.5 | 30 |
| Syringic Acid | — | — | — | — | — | — | — | — | — |
| Terephthalic Acid | 1660 | 10 | 50 | 1245 | 7.5 | 50 | 747 | 4.5 | 30 |
| Alkenylsuccinic Anhydride A | 1072 | 4 | 20 | — | — | — | 804 | 3 | 20 |
| Alkenylsuccinic Anhydride B | — | — | — | 804 | 3 | 20 | — | — | — |
| Trimellitic Anhydride | 384 | 2 | 10 | 288 | 1.7 | 10 | 288 | 1.7 | 10 |
| Fumaric Acid | — | — | — | — | — | — | 348 | 2.1 | 20 |
| Esterification Catalyst (including promoter) | | | | | | | | | |
| Tin(II) 2-Ethylhexanoate | 32.7 | — | — | 23.9 | — | — | 27.4 | — | — |
| Pyrogallic Acid | 3.3 | — | — | 2.4 | — | — | 2.7 | — | — |
| Softening Point (° C.) | | 104.3 | | | 99.8 | | | 101.8 | |
| Glass Transition Temp. (° C.) | | 56.1 | | | 55.8 | | | 55.4 | |
| Acid Value (mgKOH/g) | | 26.6 | | | 24.5 | | | 20.4 | |
| Hydroxyl Value (mgKOH/g) | | 34.5 | | | 36.3 | | | 32.2 | |

|  | Resin 10 Usable Amount | | | Resin 12 Amount Used | | | Resin 13 Amount Used | | |
|---|---|---|---|---|---|---|---|---|---|
|  | g | mol | molar ratio | g | mol | molar ratio | g | mol | molar ratio |
| Alcohol Component | | | | | | | | | |
| 1,2-Propanediol | 1140 | 15 | 100 | 912 | 12 | 80 | 912 | 12 | 80 |
| 2,3-Butanediol | — | — | — | 270 | 3.6 | 20 | 270 | 3.6 | 20 |
| Sinapyl Alcohol | — | — | — | — | — | — | — | — | — |
| Carboxylic Acid Component | | | | | | | | | |
| Ferulic Acid | 582 | 3 | 20 | 5820 | 29.4 | 150 | 436.5 | 2.25 | 15 |
| Syringic Acid | — | — | — | — | — | — | 445.5 | 2.25 | 15 |
| Terephthalic Acid | 1245 | 7.5 | 50 | — | — | — | 1245 | 7.5 | 50 |
| Alkenylsuccinic Anhydride A | 804 | 3 | 20 | 1072 | 4 | 20 | 804 | 3 | 20 |
| Alkenylsuccinic Anhydride B | — | — | — | — | — | — | — | — | — |
| Trimellitic Anhydride | 576 | 3 | 20 | — | — | — | 288 | 1.5 | 10 |
| Fumaric Acid | — | — | — | — | — | — | — | — | — |
| Esterification Catalyst (including promoter) | | | | | | | | | |
| Tin(II) 2-Ethylhexanoate | 17.7 | — | — | 40.4 | — | — | 18 | — | — |
| Pyrogallic Acid | 1.8 | — | — | 4.0 | — | — | 1.8 | — | — |
| Softening Point (° C.) | | 142.2 | | | 96.2 | | | 103.7 | |
| Glass Transition Temp. (° C.) | | 65.4 | | | 51.3 | | | 58.4 | |
| Acid Value (mgKOH/g) | | 25.6 | | | 11.2 | | | 24.9 | |
| Hydroxyl Value (mgKOH/g) | | 37.8 | | | 68.4 | | | 33.3 | |

TABLE 2-8

|  | Resin 14 Amount Used | | | Resin 15 Amount Used | | | Resin 16 Amount Used | | |
|---|---|---|---|---|---|---|---|---|---|
|  | g | mol | molar ratio | g | mol | molar ratio | g | mol | molar ratio |
| Alcohol Component | | | | | | | | | |
| 1,2-Propanediol | 798 | 10.5 | 70 | 798 | 10.5 | 70 | 912 | 12 | 80 |
| 2,3-Butanediol | 270 | 3.6 | 20 | 270 | 3.6 | 20 | 270 | 3.6 | 20 |
| BPA-PO[1)] | — | — | — | — | — | — | — | — | — |
| BPA-EO[2)] | — | — | — | — | — | — | — | — | — |
| Coniferyl Alcohol[3)] | 540 | 7.1 | 20 | — | — | — | — | — | — |
| Sinapyl Alcohol[3)] | — | — | — | 630 | 8.3 | 20 | — | — | — |
| Carboxylic Acid Component | | | | | | | | | |
| Ferulic Acid[3)] | 1164 | 5.9 | 30 | 1164 | 5.9 | 30 | — | — | — |
| Terephthalic Acid | 1660 | 10 | 50 | 1660 | 10 | 50 | 2656 | 16 | 80 |
| Alkenylsuccinic Anhydride A | 1072 | 4 | 20 | 1072 | 4 | 20 | — | — | — |
| Trimellitic Anhydride | 384 | 2 | 10 | 384 | 2 | 10 | 384 | 2 | 10 |
| Esterification Catalyst (including promoter) | | | | | | | | | |
| Tin(II) 2-Ethylhexanoate | 29.4 | — | — | 29.9 | — | — | 21.1 | — | — |
| Pyrogallic Acid | 2.9 | — | — | 3.0 | — | — | 2.1 | — | — |

TABLE 2-8-continued

| | | | | | | | | |
|---|---|---|---|---|---|---|---|---|
| Softening Point (° C.) | | 102.3 | | | 98.3 | | | 102.5 |
| Glass Transition Temp. (° C.) | | 56.6 | | | 55.4 | | | 59.3 |
| Acid Value (mgKOH/g) | | 21.3 | | | 23.7 | | | 36.9 |
| Hydroxyl Value (mgKOH/g) | | 42.1 | | | 44.5 | | | 40.1 |

| | Resin 17 Amount Used | | | Resin 18 Amount Used | | | Resin 19 Amount Used | | |
|---|---|---|---|---|---|---|---|---|---|
| | g | mol | molar ratio | g | mol | molar ratio | g | mol | molar ratio |
| Alcohol Component | | | | | | | | | |
| 1,2-Propanediol | 912 | 12 | 80 | — | — | — | 912 | 12 | 80 |
| 2,3-Butanediol | 270 | 3.6 | 20 | — | — | — | 270 | 3.6 | 20 |
| BPA-PO[1] | — | — | — | 3675 | 48.4 | 70 | — | — | — |
| BPA-EO[2] | — | — | — | 1462.5 | 19.2 | 30 | — | — | — |
| Coniferyl Alcohol[3] | — | — | — | — | — | — | — | — | — |
| Sinapyl Alcohol[3] | — | — | — | — | — | — | — | — | — |
| Carboxylic Acid Component | | | | | | | | | |
| Ferulic Acid[3] | — | — | — | — | — | — | — | — | — |
| Terephthalic Acid | 2324 | 14 | 70 | 2656 | 16 | 80 | 1660 | 10 | 50 |
| Alkenylsuccinic Anhydride A | — | — | — | — | — | — | 1072 | 4 | 20 |
| Trimellitic Anhydride | 768 | 4 | 20 | 384 | 2 | 10 | 768 | 4 | 20 |
| Esterification Catalyst (including promoter) | | | | | | | | | |
| Tin(II) 2-Ethylhexanoate | 21.4 | — | — | 40.9 | — | — | 23.4 | — | — |
| Pyrogallic Acid | 2.1 | — | — | 4.1 | — | — | 2.3 | — | — |
| Softening Point (° C.) | | 144.5 | | | 102.2 | | | 101.1 | |
| Glass Transition Temp. (° C.) | | 65.7 | | | 60.6 | | | 55.3 | |
| Acid Value (mgKOH/g) | | 41.2 | | | 25.8 | | | 30.2 | |
| Hydroxyl Value (mgKOH/g) | | 45.8 | | | 31.2 | | | 35.9 | |

[1] Polyoxypropylene(2.2)-2,2-bis(4-hydroxyphenyl)propane
[2] Polyoxyethylene(2.0)-2,2-bis(4-hydroxyphenyl)propane
[3] Aromatic compound represented by the formula (Ia)

TABLE 2-9

| | Resin 11 Amount Used | | |
|---|---|---|---|
| | g | mol | ratio |
| Raw Material Monomers of Polyester (P) | | | molar ratio |
| Alcohol Component | | | |
| 1,2-Propanediol | 912 | 12 | 80 |
| 2,3-Butanediol | 270 | 3.6 | 20 |
| Carboxylic Acid Component | | | |
| Ferulic Acid[1] | 873 | 5.9 | 30 |
| Terephthalic Acid | 1245 | 7.5 | 50 |
| Alkenylsuccinic Anhydride A | 804 | 3 | 20 |
| Trimellitic Anhydride | 384 | 2 | 10 |
| Esterification Catalyst (including promoter) | | | |
| Tin(II) 2-Ethylhexanoate | 22.0 | — | — |
| Pyrogallic Acid | 2.2 | — | — |
| Dually Reactive Monomer | | | |
| Acrylic Acid | 67 | 0.9 | 6 |
| Raw Material Monomers of Vinyl Resin (V) | | | weight ratio |
| Styrene | 922 | — | 84 |
| 2-Ethylhexyl Acrylate | 176 | — | 16 |
| Polymerization Initiator | | | |
| Dibutyl Peroxide | 44 | — | 4 |
| Total Weight of P/Total Weight of V | | 4 | |
| Softening Point (° C.) | | 103.4 | |
| Glass Transition Temp. (° C.) | | 55.2 | |
| Acid Value (mgKOH/g) | | 16.7 | |
| Hydroxyl Value (mgKOH/g) | | 26.6 | |

[1] Aromatic compound represented by formula (Ia)

2.12 Examples 1 to 23 and Comparative Examples 1 to 3

One hundred parts by weight of a resin binder, 5 parts by weight of a colorant, 1 part by weight of a charge control agent, and 2 parts by weight of a releasing agent, as listed in Table 2-10, and additionally 5 parts by weight of a charge control resin in Example 18 were sufficiently mixed with a Henschel mixer, and thereafter the mixture was melt-kneaded with a unidirectional rotary twin-screw extruder at a roller rotational speed of 200 r/min and a heating temperature inside the roller of 80° C. The roughly pulverized product obtained was finely pulverized with an air jet-type pulverizer (IDS-2 Model, manufactured by Nippon Pneumatic Mfg. Co., Ltd.), and classified, to provide toner particles having a volume-median particle size ($D_{50}$) of 7.5 μM.

To 100 parts by weight of the resulting toner particles was added 1.0 part by weight of an external additive as listed in Table 2-10, and the mixture was blended with a Henschel mixer, to provide each of the toners.

The colorant, the charge control agent, the releasing agent, and the charge control resin used in each of Examples and Comparative Examples are as follows.

[Colorant]

Black pigment: "Mougl-L" (manufactured by Cabot Corporation), carbon black

Cyan pigment: "ECB-301" (manufactured by DAINICHISEIKA COLOR & CHEMICALS MFG. CO.), Pigment Blue 15:3

Magenta pigment: "Super Magenta R" (manufactured by DIC Corporation), Pigment Red 122

Yellow pigment: "Paliotol Yellow D1155" (manufactured by BASF), Pigment Yellow 185

[Charge Control Agent]

CCA-A: "BONTRON S-34" (manufactured by Orient Chemical Co. Ltd.), negatively chargeable charge control agent CCA-B: "BONTRON N-04" (manufactured by Orient Chemical Co. Ltd.), positively chargeable charge control agent CCA-C: "LR-147" (manufactured by Nippon Carlit, Ltd.), negatively chargeable charge control agent CCA-D: "BONTRON E-84" (manufactured by Orient Chemical Co. Ltd.), negatively chargeable charge control agent

[Releasing Agent]

Wax-A: "Hiwax NP-056" (manufactured by MITSUI CHEMICALS, INC.), polypropylene wax, melting point: 125° C.

Wax-B: "HNP-9" (manufactured by Nippon Seiro), paraffin wax, melting point: 75° C.

Wax-C: "Carnauba Wax Cl" (manufactured by S. Kato & CO.), melting point: 80° C.

[Charge Control Resin]

CCR-A: "FCA-701PT" (manufactured by FUJIKURA KASEI CO., LTD.), positively chargeable charge control resin, quaternary ammonium salt group-containing styrene-acrylic copolymer, softening point: 123° C.

[External Additive]

Silica-A: "R-972" (manufactured by Nippon Aerosil Co., Ltd.), negatively chargeable hydrophobic silica, average particle size: 16 nm, hydrophobic treatment agent: DMDS (dimethyldichlorosilane)

Silica-B: "HDK H3050VP" (manufactured by Clariant GmbH), positively chargeable hydrophobic silica, average particle size: 8 nm, hydrophobic treatment agent: aminosilane Silica-C: "SI-Y" (manufactured by Nippon Aerosil Co., Ltd.), negatively chargeable hydrophobic silica, average particle size: 40 nm, hydrophobic treatment agent: dimethylsilicone oil

2.13 Test Example 1A

[Low-Temperature Fixing Ability] (Except for Example 18)

A toner was loaded on a copy machine "AR-505" (manufactured by Sharp Corporation), of which fixing device was modified so that fixing could be carried out outside the machine to provide unfixed images. While sequentially raising the temperature of a fixing roller from 100° to 240° C. in an increment of 10° C., the unfixed images were subjected to a fixing test at each temperature with a fixing device (fixing speed: 390 mm/sec) adjusted so that a total fixing pressure was 40 kgf. "UNICEF Cellophane" tape (MITSUBISHI PENCIL CO., LTD., width: 18 mm, JIS Z-1522) was adhered to the fixed images, and the resulting fixed images were allowed to pass through a fixing roller set at 30° C., and the tape was then removed. The optical reflective densities of the image before adhesion of the tape and after removal of the tape were measured with a reflective densitometer "RD-915" (manufactured by Macbeth Process Measurements Co.). The temperature of a fixing roller at which the ratio of the optical reflective densities (after removal of the tape/before adhesion of the tape) initially exceeds 90% is defined as the lowest fixing temperature. The low-temperature fixing ability was evaluated according to the following evaluation criteria. The results are shown in Table 2-10. Here, the paper used in the fixing test was CopyBond SF-70NA (75 g/m$^2$), manufactured by Sharp Corporation.

2.14 Test Example 1B

[Low-Temperature Fixing Ability] (Example 18)

A toner was loaded on a modified apparatus of nonmagnetic monocomponent development method printer "HL-2040" (manufactured by Brother Industries Ltd.) to provide unfixed images. While sequentially raising the temperature of a fixing roller from 100° to 240° C. in an increment of 10° C., the unfixed images were subjected to a fixing test at each temperature with a fixing device (fixing speed: 390 mm/sec) adjusted so that a total fixing pressure was 40 kgf. Thereafter, the low-temperature fixing ability was evaluated in the same manner as in Test Example 1A.

[Evaluation Criteria]

A: Lowest fixing temperature being lower than 150° C.;
B: Lowest fixing temperature being 150° C. or higher and lower than 170° C.; and
C: Lowest fixing temperature being 170° C. or higher.

2.15 Test Example 2

Storage Ability

Four grams of a toner was allowed to stand for 72 hours under environmental conditions of a temperature of 55° C. and relative humidity of 60%. After allowing the toner to stand, the extent of generation of toner aggregation was visually observed, and the storage ability was evaluated in accordance with the following evaluation criteria. The results are shown in Table 2-10.

[Evaluation Criteria]

A: The aggregation is not found at all even after 72 hours.
B: Although the aggregation is not found after 48 hours, the aggregation is found after 72 hours.
C: The aggregation is found within 48 hours.

2.16 Test Example 3A

[Initial Rise in Triboelectric Charging] (Except for Example 18)

A 50 ml polyethylene bottle was charged with 0.6 g of a toner and 19.4 g of a silicone ferrite carrier (manufactured by Kanto Denka Kogyo, average particle size: 90 μm), and the components were mixed with a ball-mill at a rate of 250 r/min for 10 minutes, and triboelectric charges at the time of 1 minute and 10 minutes were determined with a q/m meter (manufactured by EPPING). After a given period of mixing time, a developer in defined amounts was supplied into a cell provided in the q/m meter, and only the toner was aspirated for 90 seconds with the above-mentioned measurement apparatus through a sieve having a sieve opening of 32 μm (made of stainless steel, twilled, wire diameter: 0.0035 mm). The voltage change generated on the carrier at this time was monitored, and initial rise in triboelectric charging was evaluated in accordance with the following evaluation criteria. The results are shown in Table 2-10.

2.17 Test Example 3B

[Initial Rise in Triboelectric Charging] (Example 18)

The initial rise in triboelectric charging was evaluated in accordance with the same present invention method as in Test Example 3A except that the carrier was changed to "P-01" (ferrite carrier: Image Society of Japan standard product, average particle size: 70 μm)).

[Evaluation Criteria]

A value for (triboelectric charges at a mixing time of 1 minute)/(triboelectric charges at a mixing time of 10 minutes) is:

A: 0.95 or more
B: 0.9 or more and less than 0.95
C: less than 0.9

2.18 Test Example 4A

[Triboelectric Stability under High-Temperature, High-Humidity Conditions (HH)] (Except for Example 18)

A 50 ml polyethylene bottle was charged with 0.6 g of a toner and 19.4 g of a silicone ferrite carrier (manufactured by Kanto Denka Kogyo, average particle size: 90 μm) at a temperature of 32° C. and relative humidity of 85%, and the contents were mixed with a ball-mill at a rate of 250 r/min, and triboelectric charges of the toner were determined with a Q/M meter (manufactured by EPPING) in according with the following method.

After a given period of mixing time, a mixture of a toner and a carrier in defined amounts was supplied into a cell provided in the Q/M meter, and only the toner was aspirated for 90 seconds through a sieve having a sieve opening of 32 μm (made of stainless steel, twilled, wire diameter: 0.0035 mm). The voltage change generated on the carrier at this time was monitored, and the value of [Total Electric Charges (μC) After 90 Seconds/Weight (g) of Toner Aspirated] was obtained as triboelectric charges (μC/g). A ratio of triboelectric charges after a 60-second mixing time to triboelectric charges after a 600-second mixing time, i.e. triboelectric charges after 60-second mixing time/triboelectric charges after 600-second mixing time, were calculated, and triboelectric stability was evaluated in accordance with the following criteria. The results are shown in Table 2-10.

2.19 Test Example 4B

[Triboelectric Stability under High-Temperature, High-Humidity Conditions (HH)] (Example 18)

The triboelectric stability was evaluated in accordance with the same present invention method as in Test Example 4A except that the carrier was changed to "P-01" (ferrite carrier: standard product of Image Society of Japan, average particle size: 70 μm)).

[Evaluation Criteria]

A: 0.8 or more
B: 0.6 or more and less than 0.8
C: less than 0.6

TABLE 2-10

| No. 2- | Resin Binder | | | | | | Mixing Weight Ratio | | Colorant | Charge Control Agent |
|---|---|---|---|---|---|---|---|---|---|---|
| | Resin L | (1) | (2) | Resin H | (1) | (2) | Resin L | Resin H | | |
| Ex. 1 | Resin 1 | 14 | 18 | Resin 10 | 10 | 18 | 70 | 30 | Black# | CCA-A |
| Ex. 2 | Resin 2 | 14 | 45 | Resin 10 | 10 | 18 | 70 | 30 | Black# | CCA-A |
| Ex. 3 | Resin 3 | 14 | 5 | Resin 10 | 10 | 18 | 70 | 30 | Black# | CCA-A |
| Ex. 4 | Resin 4 | 14 | 18 | Resin 10 | 10 | 18 | 70 | 30 | Black# | CCA-A |
| Ex. 5 | Resin 5 | 14 | 18 | Resin 10 | 10 | 18 | 70 | 30 | Black# | CCA-A |
| Ex. 6 | Resin 6 | 23 | 18 | Resin 10 | 10 | 18 | 70 | 30 | Black# | CCA-A |
| Ex. 7 | Resin 7 | 23 | 18 | Resin 10 | 10 | 18 | 70 | 30 | Black# | CCA-A |
| Ex. 8 | Resin 8 | 14 | 18 | Resin 10 | 10 | 18 | 70 | 30 | Black# | CCA-A |
| Ex. 9 | Resin 9 | 22 | 18 | Resin 10 | 10 | 18 | 70 | 30 | Black# | CCA-A |
| Ex. 10 | Resin 1 | 14 | 18 | — | | | 100 | — | Black# | CCA-A |
| Ex. 11 | — | | | Resin 10 | 10 | 18 | — | 100 | Black# | CCA-A |
| Ex. 12 | Resin 11 | 14 | 9.5 | Resin 10 | 10 | 18 | 70 | 30 | Black# | CCA-A |
| Ex. 13 | Resin 12 | 56 | 12 | Resin 10 | 10 | 18 | 70 | 30 | Black# | CCA-A |
| Ex. 14 | Resin 13 | 14 | 18 | Resin 10 | 10 | 18 | 70 | 30 | Black# | CCA-A |
| Ex. 15 | Resin 14 | 23 | 18 | Resin 10 | 10 | 18 | 70 | 30 | Black# | CCA-A |
| Ex. 16 | Resin 15 | 23 | 18 | Resin 10 | 10 | 18 | 70 | 30 | Black# | CCA-A |
| Ex. 17 | Resin 1 | 14 | 18 | Resin 10 | 10 | 18 | 30 | 70 | Black# | CCA-A |
| Ex. 18 | Resin 1 | 14 | 18 | Resin 10 | 10 | 18 | 70 | 30 | Black# | CCA-B |
| Ex. 19 | Resin 1 | 14 | 18 | Resin 10 | 10 | 18 | 70 | 30 | Cyan# | CCA-C |
| Ex. 20 | Resin 1 | 14 | 18 | Resin 10 | 10 | 18 | 70 | 30 | Magenta# | CCA-D |
| Ex. 21 | Resin 1 | 14 | 18 | Resin 10 | 10 | 18 | 70 | 30 | Yellow# | CCA-C |
| Ex. 22 | Resin 1 | 14 | 18 | Resin 17 | 0 | 0 | 70 | 30 | Black# | CCA-A |
| Ex. 23 | Resin 16 | 0 | 0 | Resin 10 | 10 | 18 | 70 | 30 | Black# | CCA-A |
| Comp. Ex. 1 | Resin 19 | 0 | 22 | Resin 17 | 0 | 0 | 70 | 30 | Black# | CCA-A |
| Comp. Ex. 2 | Resin 16 | 0 | 0 | Resin 17 | 0 | 0 | 70 | 30 | Black# | CCA-A |
| Comp. Ex. 3 | Resin 18 | 0 | 0 | Resin 17 | 0 | 0 | 70 | 30 | Black# | CCA-A |

| No. 2- | Releasing Agent | Charge Control Resin | External Additive | Low-Temp. Fixing Ability | Storage Ability | Initial Rise in Triboelectric Charging | Triboelectric Stability under HH |
|---|---|---|---|---|---|---|---|
| Ex. 1 | Wax-A | None | Silica-A | A | A | A | A |
| Ex. 2 | Wax-A | None | Silica-A | A | B | A | A |
| Ex. 3 | Wax-A | None | Silica-A | A | A | A | B |
| Ex. 4 | Wax-A | None | Silica-A | B | A | A | A |
| Ex. 5 | Wax-A | None | Silica-A | A | A | A | A |
| Ex. 6 | Wax-A | None | Silica-A | A | A | A | A |
| Ex. 7 | Wax-A | None | Silica-A | A | A | A | A |
| Ex. 8 | Wax-A | None | Silica-A | A | A | A | B |
| Ex. 9 | Wax-A | None | Silica-A | A | A | A | B |
| Ex. 10 | Wax-A | None | Silica-A | A | B | A | A |

TABLE 2-10-continued

| | | | | | | | | |
|---|---|---|---|---|---|---|---|---|
| Ex. 11 | Wax-A | None | Silica-A | B | A | A | A | |
| Ex. 12 | Wax-A | None | Silica-A | B | A | A | A | |
| Ex. 13 | Wax-A | None | Silica-A | A | B | A | A | |
| Ex. 14 | Wax-A | None | Silica-A | A | A | A | A | |
| Ex. 15 | Wax-A | None | Silica-A | A | A | A | A | |
| Ex. 16 | Wax-A | None | Silica-A | A | A | A | A | |
| Ex. 17 | Wax-A | None | Silica-A | B | A | A | A | |
| Ex. 18 | Wax-A | CCR-A | Silica-B | A | A | A | A | |
| Ex. 19 | Wax-B | None | Silica-C | A | A | A | A | |
| Ex. 20 | Wax-B | None | Silica-C | A | A | A | A | |
| Ex. 21 | Wax-B | None | Silica-C | A | A | A | A | |
| Ex. 22 | Wax-A | None | Silica-A | A | B | B | B | |
| Ex. 23 | Wax-A | None | Silica-A | B | A | B | B | |
| Comp. Ex. 1 | Wax-A | None | Silica-A | A | B | C | B | |
| Comp. Ex. 2 | Wax-A | None | Silica-A | A | B | C | C | |
| Comp. Ex. 3 | Wax-A | None | Silica-A | B | B | C | C | |

Remarks 1) In the resin binder, Resin L is a resin having a softening point of 125° C. or less, and Resin H is a resin having a softening point exceeding 125° C.
Remarks 2) (1) Amount of the aromatic compound represented by the formula (Ia) (% by mol) contained in a total amount of the carboxylic acid component and the alcohol component.
Remarks 3) (2) Amount of a succinic acid derivative (% by mol) contained in the carboxylic acid component.
Added Remarks: Black#: black pigment, Cyan# cyan pigment, Magenta#: magenta pigment, Yellow#: yellow pigment.

It can be seen from the above results that the toners of Examples 2-1 to 2-23 containing as a resin binder a polyester obtained using together a specific aromatic compound and a succinic acid derivative are excellent in both of low-temperature fixing ability and storage ability of the toner, and further excellent in triboelectric stability under high-temperature, high humidity conditions and initial rise in triboelectric charging of the toner, as compared to the toners of Comparative Examples 2-1 to 2-3.

Example 3

3.1 Production Example of Reaction Products
[Reaction Products A to H]

A 5-liter four neck flask equipped with a dehydration tube equipped with a nitrogen inlet tube, a stirrer, and a thermocouple was charged with an aromatic compound as listed in Table 3-1, and the mixture was melted at 180° C. in a nitrogen atmosphere, and thereafter subjected to a reaction at 180° C. for 8 hours. Thereafter, a weight-average molecular weight of the resulting reaction product was confirmed to be 350 or more.

mellitic anhydride, a reaction product, and an esterification catalyst, as listed in Table 3-2 to 3-4, and the mixture was heated from 180° to 210° C. at a rate of 10° C./hr in a nitrogen atmosphere, and thereafter the mixture was subjected to a polycondensation reaction at 210° C. until a conversion rate reached 90%. Thereafter, trimellitic anhydride was added thereto, and the mixture was subjected to a reaction at 210° C. and a normal pressure for 1 hour, and then subjected to a reaction at 20 kPa until a softening point given in Tables 3-2 to 3-4 was reached, to provide polyesters. Here, the conversion rate refers to a value calculated from carboxy groups and hydroxyl groups of the alcohol component, the carboxylic acid component and the reaction product, supposing that the conversion rate upon the completion of discharge of theoretical reaction water is 100%.

3.3 Production Example 2 of Resin

Resin 4

A 5-liter four neck flask equipped with a nitrogen inlet tube, a dehydration tube, a stirrer, and a thermocouple was charged with an alcohol component, a carboxylic acid component and an esterification catalyst, as listed in Table 3-2,

TABLE 3-1

| | Reaction Product A Amount Charged | | Reaction Product B Amount Charged | | Reaction Product C Amount Charged | | Reaction Product D Amount Charged | | Reaction Product E Amount Charged | | Reaction Product F Amount Charged | | Reaction Product G Amount Charged | | Reaction Product H Amount Charged | |
|---|---|---|---|---|---|---|---|---|---|---|---|---|---|---|---|---|
| Aromatic Compound | g | mol | g | mol | g | mol | g | mol | g | mol | g | mol | g | mol | g | mol |
| Coniferyl Alcohol | — | — | — | — | — | — | 3600 | 20 | — | — | 1800 | 10 | 1800 | 10 | 900 | 5 |
| Sinapyl Alcohol | — | — | — | — | — | — | — | — | 4200 | 20 | 2100 | 10 | — | — | 1050 | 5 |
| Ferulic Acid | 3880 | 20 | — | — | 1940 | 10 | — | — | — | — | — | — | 1940 | 10 | 970 | 5 |
| Syringic Acid | — | — | 3960 | 20 | 1980 | 10 | — | — | — | — | — | — | — | — | 990 | 5 |
| Weight-Average Molecular Weight | 550 | | 730 | | 650 | | 420 | | 480 | | 510 | | 560 | | 590 | |

3.2 Production Example 1 of Resins

Resins 1 to 3, 5 to 11, and 13

A 5-liter four neck flask equipped with a nitrogen inlet tube, a dehydration tube equipped with a fractional distillation tube through which hot water at 98° C. was allowed to flow, a stirrer, and a thermocouple was charged with an alcohol component, a carboxylic acid component other than triand the mixture was subjected to a polycondensation reaction at 235° C. until a conversion rate reached 90% in a nitrogen atmosphere. Thereafter, the mixture was cooled to 200° C., a reaction product was added thereto, and the mixture was subjected to a reaction at a normal pressure for 3 hours. Thereafter, trimellitic anhydride was added thereto, and the mixture was subjected to a reaction at 210° C. and a normal pressure for 1 hour, and then subjected to a reaction at 20 kPa until a softening point given in Table 3-2 was reached, to provide a polyester.

3.4 Production Example 3 of Resin

Resin 12

A 5-liter four-neck flask equipped with a dehydration tube equipped with a nitrogen inlet tube, a stirrer, and a thermocouple was charged with an alcohol component, a carboxylic acid component other than trimellitic anhydride, and an esterification catalyst, as listed in Table 3-5, and the mixture was heated to 160° C. in a nitrogen atmosphere. Thereafter, a mixture of a dually reactive monomer (acrylic acid), raw material monomers of a vinyl resin and a polymerization initiator as listed in Table 3-5 was added dropwise thereto with a dropping funnel over 1 hour. After the dropwise addition, the addition polymerization reaction was matured for 1 hour, while keeping the mixture at 160° C. Thereafter, a reaction product as listed in Table 3-5 was added thereto, and the mixture was heated to 180° C., subjected to a reaction for 2 hours, thereafter heated to 210° C. at a rate of 5° C./h, and subjected to a reaction at 210° C. until a conversion rate reached 90%. Thereafter, trimellitic anhydride was added thereto, and the mixture was subjected to a reaction at 200° C. and a normal pressure for 1 hour, and then subjected to a reaction at 10 kPa until a softening point given in Table 3-5 was reached, to provide a hybrid resin.

3.5 Production Example 4 of Resins

Resins 14 and 15

A 5-liter four neck flask equipped with a nitrogen inlet tube, a dehydration tube equipped with a fractional distillation tube through which hot water at 98° C. was allowed to flow, a stirrer, and a thermocouple was charged with an alcohol component, a carboxylic acid component other than trimellitic anhydride, and an esterification catalyst, as listed in Table 3-2 to 3-4, and the mixture was heated at from 180° to 210° C. at a rate of 10° C./hr in a nitrogen atmosphere, and thereafter the mixture was subjected to a polycondensation reaction at 210° C. until a conversion rate reached 90%. Thereafter, trimellitic anhydride was added thereto, and the mixture was subjected to a reaction at 210° C. and a normal pressure for 1 hour, and then subjected to a reaction at 20 kPa until a softening point given in Tables 3-2 to 3-4 was reached, to provide polyesters.

3.6 Production Example 5 of Resin

Resin 16

A 5-liter four neck flask equipped with a nitrogen inlet tube, a dehydration tube, a stirrer, and a thermocouple was charged with an alcohol component, a carboxylic acid component other than trimellitic anhydride, and an esterification catalyst, as listed in Table 3-4, and the mixture was subjected to a polycondensation reaction at 235° C. in a nitrogen atmosphere until a conversion rate reached 90%. Thereafter, trimellitic anhydride was added thereto, and the mixture was subjected to a reaction at 210° C. and a normal pressure for 1 hour, and then subjected to a reaction at 20 kPa until a softening point given in Table 3-4 was reached, to provide a polyester.

TABLE 3-2

| | Resin 1 Amount Used | | | Resin 2 Amount Used | | | Resin 3 Amount Used | | | Resin 4 Amount Used | | | Resin 5 Amount Used | | |
|---|---|---|---|---|---|---|---|---|---|---|---|---|---|---|---|
| | g | mol | molar ratio | g | mol | molar ratio | g | mol | molar ratio | g | mol | molar ratio | g | mol | molar ratio |
| Alcohol Component | | | | | | | | | | | | | | | |
| 1,2-Propanediol | 570 | 7.5 | 50 | 798 | 10.5 | 70 | 1216 | 16 | 80 | — | — | — | 570 | 7.5 | 50 |
| 2,3-Butanediol | 675 | 7.5 | 50 | 405 | 4.5 | 30 | — | — | — | — | — | — | 675 | 7.5 | 50 |
| Glycerol | — | — | — | — | — | — | 368 | 4 | 20 | — | — | — | — | — | — |
| BPA-PO[1] | — | — | — | — | — | — | — | — | — | 1960 | 5.6 | 70 | — | — | — |
| BPA-EO[2] | — | — | — | — | — | — | — | — | — | 780 | 2.4 | 30 | — | — | — |
| Carboxylic Acid Component | | | | | | | | | | | | | | | |
| Terephthalic Acid | 1494 | 9.0 | 60 | 996 | 6.0 | 40 | — | — | — | 664 | 4.0 | 50 | 1494 | 9 | 60 |
| Trimellitic Anhydride | 288 | 1.5 | 14 | 864 | 4.5 | 30 | — | — | — | — | — | — | 288 | 1.5 | 10 |
| Reaction Product | A: 1650 | — | — | A: 1000 | — | — | A: 2500 | — | — | A: 1700 | — | — | B: 1550 | — | — |
| Esterification Catalyst (including promoter) | | | | | | | | | | | | | | | |
| Tin(II) 2-Ethylhexanoate | 15.1 | — | — | 15.3 | — | — | 7.9 | — | — | 17.0 | — | — | 15.7 | — | — |
| Pyrogallic Acid | 1.5 | — | — | 1.5 | — | — | — | — | — | 1.7 | — | — | 1.6 | — | — |
| Reaction Product/(Carboxylic Acid Component + Alcohol Component) × 100 | | 55 | | | 33 | | | 158 | | | 50 | | | 51 | |
| Softening Point (° C.) | | 100.3 | | | 143.8 | | | 106.7 | | | 104.4 | | | 105.9 | |
| Glass Transition Temp. (° C.) | | 63.1 | | | 68.3 | | | 58.7 | | | 58.2 | | | 60.2 | |
| Acid Value (mgKOH/g) | | 18.4 | | | 15.4 | | | 15.1 | | | 10.2 | | | 24.7 | |
| Hydroxyl Value (mgKOH/g) | | 33.6 | | | 36.9 | | | 45.1 | | | 38.8 | | | 39.6 | |

[1]Polyoxypropylene(2.2)-2,2-bis(4-hydroxyphenyl)propane
[2]Polyoxyethylene(2.0)-2,2-bis(4-hydroxyphenyl)propane

TABLE 3-3

| | Resin 6 Amount Used | | | Resin 7 Amount Used | | | Resin 8 Amount Used | | | Resin 9 Amount Used | | | Resin 10 Amount Used | | |
|---|---|---|---|---|---|---|---|---|---|---|---|---|---|---|---|
| | g | mol | molar ratio | g | mol | molar ratio | g | mol | molar ratio | g | mol | molar ratio | g | mol | molar ratio |
| Alcohol Component | | | | | | | | | | | | | | | |
| 1,2-Propanediol | 494 | 6.5 | 50 | 570 | 7.5 | 50 | 570 | 7.5 | 50 | 570 | 7.5 | 50 | 570 | 7.5 | 50 |
| 2,3-Butanediol | 585 | 6.5 | 50 | 405 | 4.5 | 30 | 405 | 4.5 | 30 | 405 | 4.5 | 30 | 540 | 6.0 | 40 |
| Glycerol | — | — | — | — | — | — | — | — | — | — | — | — | — | — | — |
| BPA-PO[1] | — | — | — | — | — | — | — | — | — | — | — | — | — | — | — |
| BPA-EO[2] | — | — | — | — | — | — | — | — | — | — | — | — | — | — | — |
| Carboxylic Acid Component | | | | | | | | | | | | | | | |
| Terephthalic Acid | 1295 | 7.8 | 60 | 1494 | 9 | 60 | 1494 | 9 | 60 | 1494 | 9 | 60 | 1494 | 9 | 60 |
| Trimellitic Anhydride | 250 | 1.3 | 10 | 576 | 3.0 | 20 | 576 | 3.0 | 20 | 576 | 3.0 | 20 | 288 | 1.5 | 10 |
| Reaction Product | C: 1350 | — | — | C: 1600 | — | — | E: 1600 | — | — | F: 1400 | — | — | G: 1500 | — | — |
| Esterification Catalyst (including promoter) | | | | | | | | | | | | | | | |
| Tin(II) 2-Ethylhexanoate | 13.1 | — | — | 15.2 | — | — | 15.2 | — | — | 15.2 | — | — | 14.5 | — | — |
| Pyrogallic Acid | 1.3 | — | — | 1.5 | — | — | 1.5 | — | — | 1.5 | — | — | 1.4 | — | — |
| Reaction Product/(Carboxylic Acid Component + Alcohol Component) × 100 | | 51 | | | 53 | | | 53 | | | 46 | | | 52 | |
| Softening Point (° C.) | | 103.9 | | | 100.1 | | | 102.7 | | | 103.3 | | | 104.7 | |
| Glass Transition Temp. (° C.) | | 61.8 | | | 54.8 | | | 62.2 | | | 59.6 | | | 60 | |
| Acid Value (mgKOH/g) | | 22.3 | | | 27.5 | | | 26.7 | | | 15.7 | | | 20.8 | |
| Hydroxyl Value (mgKOH/g) | | 41.5 | | | 33.3 | | | 31 | | | 37.1 | | | 36.9 | |

[1] Polyoxypropylene(2.2)-2,2-bis(4-hydroxyphenyl)propane
[2] Polyoxyethylene(2.0)-2,2-bis(4-hydroxyphenyl)propane

TABLE 3-4

| | Resin 11 Amount Used | | | Resin 13 Amount Used | | | Resin 14 Amount Used | | | Resin 15 Amount Used | | | Resin 16 Amount Used | | |
|---|---|---|---|---|---|---|---|---|---|---|---|---|---|---|---|
| | g | mol | molar ratio | g | mol | molar ratio | g | mol | molar ratio | g | mol | molar ratio | g | mol | molar ratio |
| Alcohol Component | | | | | | | | | | | | | | | |
| 1,2-Propanediol | 570 | 7.5 | 50 | 570 | 7.5 | 50 | 912 | 12 | 80 | 912 | 12 | 80 | — | — | — |
| 2,3-Butanediol | 540 | 6 | 40 | 675 | 7.5 | 50 | 270 | 3 | 20 | 270 | 3 | 20 | — | — | — |
| Glycerol | — | — | — | — | — | — | — | — | — | — | — | — | — | — | — |
| BPA-PO[1] | — | — | — | — | — | — | — | — | — | — | — | — | 1715 | 4.9 | 70 |
| BPA-EO[2] | — | — | — | — | — | — | — | — | — | — | — | — | 683 | 2.1 | 30 |
| Carboxylic Acid Component | | | | | | | | | | | | | | | |
| Terephthalic Acid | 1494 | 9 | 60 | 1494 | 9 | 60 | 1743 | 10.5 | 70 | 1743 | 10.5 | 70 | 813 | 4.9 | 70 |
| Trimellitic Anhydride | 288 | 1.5 | 10 | 288 | 1.5 | 10 | 288 | 1.5 | 10 | 586 | 3 | 20 | 269 | 1.4 | 20 |
| Reaction Product | H: 1800 | — | — | A: 400 | — | — | | | | | | | | | |
| Esterification Catalyst (including promoter) | | | | | | | | | | | | | | | |
| Tin(II) 2-Ethylhexanoate | 14.5 | — | — | 15.1 | — | — | 16.1 | — | — | 17.5 | — | — | 17.4 | — | — |
| Pyrogallic Acid | 1.4 | — | — | 1.5 | — | — | 1.6 | — | — | 1.8 | — | — | 1.7 | — | — |
| Reaction Product/(Carboxylic Acid Component + Alcohol Component) × 100 | | 62 | | | 13 | | | 0 | | | 0 | | | 0 | |
| Softening Point (° C.) | | 107.3 | | | 98.6 | | | 101.1 | | | 146.7 | | | 102.2 | |
| Glass Transition Temp. (° C.) | | 62.5 | | | 60.5 | | | 60.4 | | | 66 | | | 60.6 | |
| Acid Value (mgKOH/g) | | 26.4 | | | 14.5 | | | 28.6 | | | 22.5 | | | 25.8 | |
| Hydroxyl Value (mgKOH/g) | | 44.3 | | | 30.2 | | | 40.1 | | | 35.6 | | | 31.2 | |

[1] Polyoxypropylene(2.2)-2,2-bis(4-hydroxyphenyl)propane
[2] Polyoxyethylene(2.0)-2,2-bis(4-hydroxyphenyl)propane

TABLE 3-5

| | Resin 12 Amount Used | | |
|---|---|---|---|
| | g | mol | ratio |
| Raw Material Monomers of Polyester (P) | | | molar ratio |
| Alcohol Component | | | |
| 1,2-Propanediol | 380 | 5 | 50 |
| 2,3-Butanediol | 450 | 5 | 50 |
| Carboxylic Acid Component | | | |
| Terephthalic Acid | 996 | 6 | 60 |
| Trimellitic Anhydride | 192 | 1 | 10 |
| Reaction Product | A: 1000 | — | — |
| Esterification Catalyst (including promoter) | | | |
| Tin(II) 2-Ethylhexanoate | 15.2 | — | — |
| Pyrogallic Acid | 1.5 | — | — |
| Dually Reactive Monomer | | | |
| Acrylic Acid | 28.8 | 0.4 | 0.4 |
| Raw Material Monomers of Vinyl Resin (V) | | | weight ratio |
| Styrene | 640 | — | 84 |
| 2-Ethylhexyl Acrylate | 122 | — | 16 |
| Polymerization Initiator | | | |
| Dibutyl Peroxide | 35 | — | — |
| Total Weight of P/Total Weight of V | | 4 | |
| Reaction Product/(Carboxylic Acid Component + Alcohol Component) × 100 | | 33 | |
| Softening Point (° C.) | | 103.5 | |
| Glass Transition Temp. (° C.) | | 57.3 | |
| Acid Value (mgKOH/g) | | 16.3 | |
| Hydroxyl Value (mgKOH/g) | | 33.9 | |

3.7 Examples 1 to 21 and Comparative Examples 1 and 2

One hundred parts by weight of a resin binder listed in Table 3-6, 1.0 part by weight of a negatively chargeable charge control agent, 5.0 parts by weight of a colorant, and 2.0 parts by weight of a polypropylene wax were mixed with a Henschel mixer. The mixture obtained was melt-kneaded with a twin-screw extruder, cooled, and then roughly pulverized to a size of 1 mm or so with a hammer mill. The resulting roughly pulverized product was finely pulverized with an air jet-type pulverizer (IDS-2 Model, manufactured by Nippon Pneumatic Mfg. Co., Ltd.), and classified, to provide toner particles having a volume-median particle size ($D_{50}$) of 7.5 μm.

To 100 parts by weight of the toner particles obtained was added 1.0 part by weight of an external additive, and the mixture was blended with a Henschel mixer, to provide each of the toners.

The colorant, the charge control agent, the releasing agent, and the charge control resin used in each of Examples and Comparative Examples are as follows.

[Colorant]

Black pigment: "Mougl-L" (manufactured by Cabot Corporation), carbon black

Cyan pigment: "ECB-301" (manufactured by DAINICHISEIKA COLOR & CHEMICALS MFG. CO.), Pigment Blue 15:3

Magenta pigment: "Super Magenta R" (manufactured by DIC Corporation), Pigment Red 122

Yellow pigment: "Paliotol Yellow D1155" (manufactured by BASF), Pigment Yellow 185

[Charge Control Agent]

CCA-A: "BONTRON S-34" (manufactured by Orient Chemical Co. Ltd.), negatively chargeable charge control agent CCA-B: "BONTRON N-04" (manufactured by Orient Chemical Co. Ltd.), positively chargeable charge control agent CCA-C: "LR-147" (manufactured by Nippon Carlit, Ltd.), negatively chargeable charge control agent CCA-D: "BONTRON E-84" (manufactured by Orient Chemical Co. Ltd.), negatively chargeable charge control agent

[Releasing Agent]

Wax-A: "Hiwax NP-056" (manufactured by MITSUI CHEMICALS, INC.), polypropylene wax, melting point: 125° C.

Wax-B: "HNP-9" (manufactured by Nippon Seiro), paraffin wax, melting point: 75° C.

Wax-C: "Carnauba Wax C1" (manufactured by S. Kato & CO.), melting point: 80° C.

[Charge Control Resin]

CCR-A: "FCA-701PT" (manufactured by FUJIKURA KASEI CO., LTD.), positively chargeable charge control resin, quaternary ammonium salt group-containing styrene-acrylic copolymer, softening point: 123° C.

[External Additive]

Silica-A: "R-972" (manufactured by Nippon Aerosil Co., Ltd.), negatively chargeable hydrophobic silica, average particle size: 16 nm, hydrophobic treatment agent: DMDS (dimethyldichlorosilane)

Silica-B: "HDK H3050VP" (manufactured by Clariant GmbH), positively chargeable hydrophobic silica, average particle size: 8 nm, hydrophobic treatment agent: aminosilane Silica-C: "SI-Y" (manufactured by Nippon Aerosil Co., Ltd.), negatively chargeable hydrophobic silica, average particle size: 40 nm, hydrophobic treatment agent: dimethylsilicone oil

3.8 Test Example 1

Low-Temperature Fixing Ability

A toner was loaded on a copy machine "AR-505" (manufactured by Sharp Corporation), of which fixing device was modified so that fixing could be carried out outside the machine, provided that the evaluation of Example 15 was made using a modified apparatus of nonmagnetic monocomponent development method printer "HL-2040" (manufactured by Brother Industries Ltd.), to provide unfixed images. While sequentially raising the temperature of a fixing roller from 100° to 240° C. in an increment of 10° C., the unfixed images were subjected to a fixing test at each temperature with a fixing device (fixing speed: 390 mm/sec) adjusted so that a total fixing pressure was 40 kgf. "UNICEF Cellophane" tape (MITSUBISHI PENCIL CO., LTD., width: 18 mm, JIS Z-1522) was adhered to the fixed images, and the resulting fixed images were allowed to pass through a fixing roller set at 30° C., and the tape was then removed. The optical reflective densities of the image before adhesion of the tape and after removal of the tape were measured with a reflective densitometer "RD-915" (manufactured by Macbeth Process Measurements Co.). The temperature of a fixing roller at which the ratio of the optical reflective densities (after removal of the tape/before adhesion of the tape) initially exceeds 90% is defined as the lowest fixing temperature. The low-temperature fixing ability was evaluated according to the following evaluation criteria. The results are shown in Table 3-6. Here, the paper used in the fixing test was CopyBond SF-70NA (75 g/m²), manufactured by Sharp Corporation.

[Evaluation Criteria]

A: Lowest fixing temperature being lower than 150° C.;
B: Lowest fixing temperature being 150° C. or higher and lower than 170° C.; and
C: Lowest fixing temperature being 170° C. or higher.

3.9 Test Example 2

[Storage Ability] (Common for All)

A 20-ml cylindrical vessel (diameter: about 3 cm) was charged with 4 g of a toner, and allowed to stand for 72 hours under environmental conditions of a temperature of 55° C. and relative humidity of 60%. After allowing the toner to stand, the extent of generation of toner aggregation was visually observed, and the storage ability was evaluated in accordance with the following evaluation criteria. The results are shown in Table 3-6.

[Evaluation Criteria]

A: The aggregation is not found at all even after 72 hours.
B: Although the aggregation is not found after 48 hours, the aggregation is found after 72 hours.
C: The aggregation is found within 48 hours.

3.10 Test Example 3

Initial Rise in Triboelectric Charging

A 50 ml polyethylene bottle was charged with 0.6 g of a toner and 19.4 g of a silicone ferrite carrier (manufactured by Kanto Denka Kogyo, average particle size: 90 μm), provided that in Example 15 a carrier was changed to "P-01" (ferrite carrier: standard product of Image Society of Japan, average particle size: 70 μm), and the components were mixed with a ball-mill at a rate of 250 r/min for 10 minutes, and triboelectric charges at the time of 1 minute and 10 minutes were determined with a q/m meter (manufactured by EPPING).

After a given period of mixing time, a developer in defined amounts was supplied into a cell provided in the q/m meter, and only the toner was aspirated for 90 seconds with the above-mentioned measurement apparatus through a sieve having a sieve opening of 32 μm (made of stainless steel, twilled, wire diameter: 0.0035 mm). The voltage change generated on the carrier at this time was monitored, and initial rise in triboelectric charging was evaluated in accordance with the following evaluation criteria. The results are shown in Table 3-6.

[Evaluation Criteria]

A value for (triboelectric charges at a mixing time of 1 minute)/(triboelectric charges at a mixing time of 10 minutes) is:

A: 0.95 or more
B: 0.9 or more and less than 0.95
C: less than 0.9

3.11 Test Example 4

Hot Offset Resistance

In Test Example 1, a temperature at which offset was initially confirmed was visually judged, upon sequentially raising a temperature of a fixing roller from 100° to 240° C., and hot offset resistance was evaluated in accordance with the following evaluation criteria. The results are shown in Table 3-6.

[Evaluation Criteria]

A: The hot offset generation temperature is 210° C. or more.
B: The hot offset generation temperature is 180° C. or more and less than 210° C.
C: The hot offset generation temperature is less than 180° C.

TABLE 3-6

| No. 3- | Kinds of Resins* | | | | Mixing Weight Ratio | | Colorant | Charge Control Agent |
| --- | --- | --- | --- | --- | --- | --- | --- | --- |
| | Resin L | Amount of Reaction Product | Resin H | Amount of Reaction Product | Resin L | Resin H | | |
| Ex. 1 | 1 | 55 | 2 | 33 | 70 | 30 | Black# | CCA-A |
| Ex. 2 | 3 | 158 | 2 | 33 | 70 | 30 | Black# | CCA-A |
| Ex. 3 | 4 | 50 | 2 | 33 | 70 | 30 | Black# | CCA-A |
| Ex. 4 | 5 | 51 | 2 | 33 | 70 | 30 | Black# | CCA-A |
| Ex. 5 | 6 | 51 | 2 | 33 | 70 | 30 | Black# | CCA-A |
| Ex. 6 | 7 | 53 | 2 | 33 | 70 | 30 | Black# | CCA-A |
| Ex. 7 | 8 | 53 | 2 | 33 | 70 | 30 | Black# | CCA-A |
| Ex. 8 | 9 | 46 | 2 | 33 | 70 | 30 | Black# | CCA-A |
| Ex. 9 | 10 | 52 | 2 | 33 | 70 | 30 | Black# | CCA-A |
| Ex. 10 | 11 | 62 | 2 | 33 | 70 | 30 | Black# | CCA-A |
| Ex. 11 | 12 | 33 | 2 | 33 | 70 | 30 | Black# | CCA-A |
| Ex. 12 | 1 | 55 | — | — | 100 | — | Black# | CCA-A |
| Ex. 13 | — | — | 2 | 33 | — | 100 | Black# | CCA-A |
| Ex. 14 | 1 | 55 | 2 | 33 | 30 | 70 | Black# | CCA-A |
| Ex. 15 | 1 | 55 | 2 | 33 | 70 | 30 | Black# | CCA-B |
| Ex. 16 | 1 | 55 | 2 | 33 | 70 | 30 | Cyan# | CCA-C |
| Ex. 17 | 1 | 55 | 2 | 33 | 70 | 30 | Magenta# | CCA-D |
| Ex. 18 | 1 | 55 | 2 | 33 | 70 | 30 | Yellow# | CCA-C |
| Ex. 19 | 1 | 55 | 15 | — | 70 | 30 | Black# | CCA-A |
| Ex. 20 | 14 | — | 2 | 33 | 70 | 30 | Black# | CCA-A |
| Ex. 21 | 13 | 13 | 2 | 33 | 70 | 30 | Black# | CCA-A |
| Comp. Ex. 1 | 16 | — | 15 | — | 70 | 30 | Black# | CCA-A |
| Comp. Ex. 2 | 14 | — | 15 | — | 70 | 30 | Black# | CCA-A |

TABLE 3-6-continued

| No. 3- | Wax | Charge Control Resin | External Additive | Low-Temp. Fixing Ability | Storage Ability | Initial Rise of Triboelectric Charging | Hot Offset Resistance |
|---|---|---|---|---|---|---|---|
| Ex. 1 | Wax-A | None | Silica-A | A | A | A | A |
| Ex. 2 | Wax-A | None | Silica-A | A | B | A | A |
| Ex. 3 | Wax-A | None | Silica-A | B | A | A | A |
| Ex. 4 | Wax-A | None | Silica-A | A | A | A | A |
| Ex. 5 | Wax-A | None | Silica-A | A | A | A | A |
| Ex. 6 | Wax-A | None | Silica-A | A | A | A | A |
| Ex. 7 | Wax-A | None | Silica-A | B | A | A | A |
| Ex. 8 | Wax-A | None | Silica-A | B | A | A | A |
| Ex. 9 | Wax-A | None | Silica-A | B | A | A | A |
| Ex. 10 | Wax-A | None | Silica-A | B | A | A | A |
| Ex. 11 | Wax-A | None | Silica-A | B | A | B | B |
| Ex. 12 | Wax-A | None | Silica-A | A | B | A | B |
| Ex. 13 | Wax-A | None | Silica-A | B | A | A | A |
| Ex. 14 | Wax-A | None | Silica-A | B | A | A | A |
| Ex. 15 | Wax-A | CCR-A | Silica-B | A | A | A | A |
| Ex. 16 | Wax-B | None | Silica-C | A | A | A | A |
| Ex. 17 | Wax-B | None | Silica-C | A | A | A | A |
| Ex. 18 | Wax-B | None | Silica-C | A | A | A | A |
| Ex. 19 | Wax-A | None | Silica-A | A | A | B | A |
| Ex. 20 | Wax-A | None | Silica-A | A | A | B | A |
| Ex. 21 | Wax-A | None | Silica-A | A | A | B | B |
| Comp. Ex. 1 | Wax-A | None | Silica-A | B | A | C | A |
| Comp. Ex. 2 | Wax-A | None | Silica-A | A | B | C | A |

*In the resin binder, Resin L is a resin having a softening point of 125° C. or less, and Resin H is a resin having a softening point exceeding 125° C.
The amount of reaction product is expressed as an amount of a reaction product contained (% by weight) of a total amount of the carboxylic acid component and the alcohol component.
Added Remarks: Black#: black pigment, Cyan#: cyan pigment, Magenta#: magenta pigment, Yellow#: yellow pigment.

It can be seen from the above results that the toners of Examples 3-1 to 3-21 containing as a resin binder a polyester resin obtained using a reaction product of the aromatic compounds represented by the formula (Ib) themselves are favorable in both low-temperature fixing ability and storage ability of toners, and further excellent in initial rise in triboelectric charging and hot offset resistance, as compared to the toners of Comparative Examples 3-1 and 3-2.

Example 4

Weight-Average Molecular Weight of Reaction Product

The weight-average molecular weight is obtained by measuring a molecular weight distribution in accordance with a gel permeation chromatography (GPC) method in the following manner.
(1) Preparation of Sample Solution A reaction product is dissolved in tetrahydrofuran so as to have a concentration of 0.5 g/100 ml. Next, the solution is filtered with a fluororesin filter (manufactured by Sumitomo Electric Industries, Ltd., FP-200) having a pore size of 2 μm, to remove an insoluble component, to provide a sample solution.
(2) Measurement of Molecular Weight The measurement is taken by allowing tetrahydrofuran to flow through a column as an eluent at a flow rate of 1 ml per minute, stabilizing the column in a thermostat at 40° C., and loading 100 μl of a sample solution. The molecular weight of the sample is calculated based on the previously drawn calibration curve. At this time, a calibration curve is drawn from several kinds of monodisperse polystyrenes (manufactured by Tosoh Corporation, A-500 ($5.0 \times 10^2$), A-1000 ($1.01 \times 10^3$), A-2500 ($2.63 \times 10^3$), A-5000 ($5.97 \times 10^3$), F-1 ($1.02 \times 10^4$), F-2 ($1.81 \times 10^4$), F-4 ($3.97 \times 10^4$), F-10 ($9.64 \times 10^4$), F-20 ($1.90 \times 10^5$), F-40 ($4.27 \times 10^5$), F-80 ($7.06 \times 10^5$), and F-128 ($1.09 \times 10^6$)) as standard samples.

Measurement Apparatus: HLC-8220GPC (manufactured by Tosoh Corporation)

Analyzing Column; GMHLX+G3000HXL (manufactured by Tosoh Corporation)

4.1 Production Example of Reaction Products

Reaction Products A to F

A 5-liter four neck flask equipped with a dehydration tube equipped with a nitrogen inlet tube, a stirrer, and a thermocouple was charged with an aromatic compound, a carboxylic acid and a polymerization inhibitor, as listed in Table 4-1, and the mixture was subjected to a reaction at 160° C. for 10 hours in a nitrogen atmosphere. Thereafter, a weight-average molecular weight of the resulting reaction product was confirmed to be 350 or more.

TABLE 4-1

|  | Reaction Product A Amount Used | | Reaction Product B Amount Used | | Reaction Product C Amount Used | | Reaction Product D Amount Used | | Reaction Product E Amount Used | | Reaction Product F Amount Used | |
|---|---|---|---|---|---|---|---|---|---|---|---|---|
|  | g | mol | g | mol | g | mol | g | mol | g | mol | g | mol |
| Aromatic Compound | | | | | | | | | | | | |
| Coniferyl Alcohol | — | — | — | — | — | — | — | — | 1800 | 10 | — | — |
| Sinapyl Alcohol | — | — | — | — | — | — | — | — | — | — | 2100 | 10 |
| Ferulic Acid | 1940 | 10 | 1940 | 10 | 1940 | 10 | — | — | — | — | — | — |
| Syringic Acid | — | — | — | — | — | — | 2080 | 10 | — | — | — | — |
| Carboxylic Acid | | | | | | | | | | | | |
| Acrylic Acid | 620 | 10 | — | — | — | — | 620 | 10 | 620 | 10 | 620 | 10 |
| Fumaric Acid | — | — | 580 | 5 | — | — | — | — | — | — | — | — |
| Maleic Anhydride | — | — | — | — | 580 | 5 | — | — | — | — | — | — |
| Polymerization Inhibitor | | | | | | | | | | | | |
| tert-Butyl Catechol | 1.28 | — | 1.26 | — | 1.26 | — | 1.35 | — | 1.21 | — | 1.55 | — |
| Weight-Average Molecular Weight | 530 | | 600 | | 610 | | 500 | | 470 | | 480 | |

4.2 Production Example 1 of Resins

Resins A1 to A12

A 5-liter four neck flask equipped with a nitrogen inlet tube, a dehydration tube equipped with a fractional distillation tube through which hot water at 100° C. was allowed to flow, a stirrer, and a thermocouple was charged with an alcohol component, terephthalic acid and an esterification catalyst, as listed in Table 4-2 or 4-3, and the mixture was heated at 180° C. for 1 hour in a nitrogen atmosphere, then heated from 180° to 230° C. at a rate of 10° C./hr, and thereafter subjected to a polycondensation reaction at 230° C. for 10 hours. Further, a reaction product as listed in Table 4-2 or 4-3 was added thereto at 180° C., and the mixture was subjected to a reaction for 5 hours. Thereafter, trimellitic anhydride as listed in Table 4-2 or 4-3 was added thereto, and the mixture was subjected to a reaction at 200° C., and then subjected to a reaction at 10 kPa until a desired softening point was reached, to provide each of polyesters.

4.3 Production Example 2 of Resin

Resin A13

A 5-liter four neck flask equipped with a dehydration tube equipped with a nitrogen inlet tube, a stirrer, and a thermocouple was charged with an alcohol component, terephthalic acid and an esterification catalyst, as listed in Table 4-3, and the mixture was subjected to a polycondensation reaction at 230° C. for 10 hours in a nitrogen atmosphere, and further subjected to a reaction at 230° C. and 8.0 kPa for 1 hour. Further, a reaction product as listed in Table 4-3 was added thereto at 180° C., and the mixture was subjected to a reaction for 5 hours. Thereafter, trimellitic anhydride as listed in Table 4-3 was added thereto, and the mixture was subjected to a reaction at 200° C., and then subjected to a reaction at 10 kPa until a desired softening point was reached, to provide a polyester.

4.4 Production Example 4 of Resin

Resin H1

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers of polyester other than trimellitic anhydride and a reaction product, and an esterification catalyst, as listed in Table 4-4, and the mixture was heated to 160° C. in a nitrogen atmosphere. Thereafter, a mixture of a dually reactive monomer (acrylic acid), raw material monomers of a styrenic resin and a polymerization initiator as listed in Table 4-4 was added dropwise thereto with a dropping funnel over 1 hour. After the dropwise addition, the addition polymerization reaction was matured for 1 hour, while keeping the mixture at 160° C., and the mixture was then subjected to a polycondensation reaction at 230° C. for 10 hours, and further subjected to a reaction at 230° C. and 8.0 kPa for 1 hour. After cooling the mixture to 180° C., a reaction product as listed in Table 4-4 was added thereto at 180° C., and the mixture was subjected to a reaction for 5 hours. Finally, trimellitic anhydride as listed in Table 4-4 was supplied thereto, and the mixture was subjected to a reaction at 200° C., and then subjected to a reaction at 10 kPa until a desired softening point was reached, to provide a hybrid resin.

4.5 Production Example 5 of Resin

Resin H2

A 5-liter four neck flask equipped with a dehydration tube equipped with a nitrogen inlet tube, a stirrer, and a thermocouple was charged with raw material monomers of polyester other than trimellitic anhydride and a reaction product, and an esterification catalyst, as listed in Table 4-4, and the mixture was heated to 160° C. in a nitrogen atmosphere. Thereafter, a mixture of a dually reactive monomer (acrylic acid), raw material monomers of a styrenic resin and a polymerization initiator as listed in Table 4-4 was added dropwise thereto with a dropping funnel over 1 hour. After the dropwise addition, the addition polymerization reaction was matured for 1 hour, while keeping the mixture at 160° C., and the mixture was then subjected to a polycondensation reaction at 230° C. for 10 hours, and further subjected to a reaction at 230° C. and 8.0 kPa for 1 hour. Further, the reaction product as listed in Table 4-4 was added thereto at 180° C., and the mixture was subjected to a reaction for 5 hours. Thereafter, trimellitic anhydride as listed in Table 4-4 was added thereto, and the mixture was subjected to a reaction at 200° C., and then subjected to a reaction at 10 kPa until a desired softening point was reached, to provide a hybrid resin.

4.6 Production Example 6 of Resin

Resin B1

A 5-liter four neck flask equipped with a nitrogen inlet tube, a dehydration tube equipped with a fractional distillation tube through which hot water at 100° C. was allowed to flow, a stirrer, and a thermocouple was charged with an alcohol component, terephthalic acid and an esterification catalyst, as listed in Table 4-5, and the mixture was heated at 180° C. for 1 hour in a nitrogen atmosphere, and then heated from 180° to 230° C. at a rate of 10° C./hr, and thereafter subjected to a polycondensation reaction at 230° C. for 10 hours. Further, trimellitic anhydride as listed in Table 4-5 was added thereto, and the mixture was subjected to a reaction at 200° C., and then subjected to a reaction at 10 kPa until a desired softening point was reached, to provide a polyester.

4.7 Production Example 7 of Resin

Resin B2

A 5-liter four neck flask equipped with a dehydration tube equipped with a nitrogen inlet tube, a stirrer, and a thermocouple was charged with an alcohol component, terephthalic acid and an esterification catalyst, as listed in Table 4-5, and the mixture was subjected to a polycondensation reaction at 230° C. for 10 hours in a nitrogen atmosphere, and further subjected to a reaction at 230° C. and 8.0 kPa for 1 hour. Further, trimellitic anhydride as listed in Table 4-5 was added thereto, and the mixture was subjected to a reaction at 200° C., and then subjected to a reaction at 10 kPa until a desired softening point was reached, to provide a polyester.

TABLE 4-2

| | Resin A1 Amount Used | | Resin A2 Amount Used | | Resin A3 Amount Used | | Resin A4 Amount Used | | Resin A5 Amount Used | | Resin A6 Amount Used | |
|---|---|---|---|---|---|---|---|---|---|---|---|---|
| | g | mol | g | mol | g | mol | g | mol | g | mol | g | mol |
| Alcohol Component | | | | | | | | | | | | |
| 1,2-Propanediol | 1140 | 15 | 1140 | 15 | 1140 | 15 | 1140 | 15 | 1140 | 15 | 1140 | 15 |
| 2,3-Butanediol | — | — | — | — | — | — | — | — | — | — | — | — |
| Carboxylic Acid Component | | | | | | | | | | | | |
| Terephthalic Acid | 1618.5 | 9.75 | 1618.5 | 9.75 | 1618.5 | 9.75 | 1618.5 | 9.75 | 1618.5 | 9.75 | 1618.5 | 9.75 |
| Trimellitic Anhydride | 374.4 | 1.95 | 374.4 | 1.95 | 374.4 | 1.95 | 374.4 | 1.95 | 374.4 | 1.95 | 374.4 | 1.95 |
| Reaction Product | A: 626.6 | — | B: 626.6 | — | C: 626.6 | — | D: 626.6 | — | E: 626.6 | — | F: 626.6 | — |
| Esterification Catalyst (including promoter) | | | | | | | | | | | | |
| Tin(II) 2-Ethylhexanoate | 15.7 | — | 15.7 | — | 15.7 | — | 15.7 | — | 15.7 | — | 15.7 | — |
| Pyrogallic acid | 1.6 | — | 1.6 | — | 1.6 | — | 1.6 | — | 1.6 | — | 1.6 | — |
| Reaction Product/(Carboxylic Acid Component + Alcohol Component) × 100 (Weight Ratio) | 20 | | 20 | | 20 | | 20 | | 20 | | 20 | |
| Softening Point (° C.) | 115.6 | | 116.7 | | 114.1 | | 116.5 | | 115.2 | | 116.2 | |
| Glass Transition Temp. (° C.) | 63.1 | | 62.3 | | 62.5 | | 60.3 | | 61 | | 61.3 | |
| Acid Value (mgKOH/g) | 25.4 | | 24.5 | | 26.7 | | 24.1 | | 26.8 | | 25.1 | |
| Hydroxyl Value (mgKOH/g) | 31.2 | | 34.1 | | 31.5 | | 29.8 | | 31.5 | | 30.2 | |

TABLE 4-3

| | Resin A7 Amount Used | | Resin A8 Amount Used | | Resin A9 Amount Used | | Resin A10 Amount Used | | Resin A11 Amount Used | | Resin A12 Amount Used | | Resin A13 Amount Used | |
|---|---|---|---|---|---|---|---|---|---|---|---|---|---|---|
| | g | mol | g | mol | g | mol | g | mol | g | mol | g | mol | g | mol |
| Alcohol Component | | | | | | | | | | | | | | |
| 1,2-Propanediol | — | — | 1140 | 15 | 570 | 7.5 | 1140 | 15 | 1140 | 15 | 1140 | 15 | — | — |
| 2,3-Butanediol | 1350 | 15 | — | — | 675 | 7.5 | — | — | — | — | — | — | — | — |
| BPA-PO[1)] | — | — | — | — | — | — | — | — | — | — | — | — | 1225 | 3.5 |
| BPA-EO[2)] | — | — | — | — | — | — | — | — | — | — | — | — | 487.5 | 1.5 |
| Carboxylic Acid Component | | | | | | | | | | | | | | |
| Terephthalic Acid | 1618.5 | 9.75 | 1618.5 | 9.75 | 1618.5 | 9.75 | 1618.5 | 9.75 | 1618.5 | 9.75 | 1618.5 | 9.75 | 539.5 | 3.25 |
| Trimellitic Anhydride | 374.4 | 1.95 | 374.4 | 1.95 | 374.4 | 1.95 | 374.4 | 1.95 | 374.4 | 1.95 | 374.4 | 1.95 | 124.8 | 0.65 |
| Reaction Product | A: 668.6 | — | A: 626.6 | — | A: 647.6 | — | A: 626.6 | — | A: 626.6 | — | A: 1253.2 | — | A: 475.4 | — |
| Ferulic Acid | — | — | — | — | — | — | — | — | — | — | — | — | — | — |
| Acrylic Acid | — | — | — | — | — | — | — | — | — | — | — | — | — | — |
| Esterification Catalyst (including promoter) | | | | | | | | | | | | | | |
| Tin(II) 2-Ethylhexanoate | 16.7 | — | — | — | 16.2 | — | 15.7 | — | 15.7 | — | 15.7 | — | 11.9 | — |
| Pyrogallic acid | 1.7 | — | 1.6 | — | 1.6 | — | 1.6 | — | 1.6 | — | 1.6 | — | 1.2 | — |

TABLE 4-3-continued

|  | Resin A7 Amount Used | Resin A8 Amount Used | | Resin A9 Amount Used | | Resin A10 Amount Used | | Resin A11 Amount Used | | Resin A12 Amount Used | | Resin A13 Amount Used | |
| --- | --- | --- | --- | --- | --- | --- | --- | --- | --- | --- | --- | --- | --- |
|  | Amount Used | g | mol | g | mol | g | mol | g | mol | g | mol | g | mol |
| Titanium Catalyst[3] | — | 15.7 | — | — | — | — | — | — | — | — | — | — | — |
| Reaction Product/(Carboxylic Acid Component + Alcohol Component) × 100 (Weight Ratio) | 20 | 20 | | 20 | | 20 | | 20 | | 40 | | 20 | |
| Softening Point (° C.) | 120.8 | 114.1 | | 115.4 | | 95.4 | | 135.4 | | 110.3 | | 113.9 | |
| Glass Transition Temp. (° C.) | 67.4 | 58.2 | | 66.2 | | 54.9 | | 68.7 | | 60.2 | | 65.6 | |
| Acid Value (mgKOH/g) | 26.5 | 24.5 | | 26.7 | | 40.2 | | 18.6 | | 30.1 | | 26.7 | |
| Hydroxyl Value (mgKOH/g) | 31.6 | 36.4 | | 34.2 | | 43.5 | | 21.6 | | 35.4 | | 34.2 | |

[1] Polyoxypropylene(2.2)-2,2-bis(4-hydroxyphenyl)propane
[2] Polyoxyethylene(2.2)-2,2-bis(4-hydroxyphenyl)propane
[3] Titanium diisopropylate bis(triethanolaminate)

TABLE 4-4

|  | Resin H1 Amount Used | | Resin H2 Amount Used | |
| --- | --- | --- | --- | --- |
|  | g | mol | g | mol |
| Raw Material Monomers for Polyester (PES) Alcohol Component | | | | |
| 1,2-Propanediol | 1140 | 15 | — | — |
| BPA-PO[1] | — | — | — | 3.5 |
| BPA-EO[2] | — | — | 487.5 | 1.5 |
| Carboxylic Acid Component | | | | |
| Terephthalic Acid | 1618.5 | 9.75 | 539.5 | 3.25 |
| Trimellitic Anhydride | 374.4 | 1.95 | 124.8 | 0.65 |
| Reaction Product | A: 626.6 | — | A: 475.4 | — |
| Esterification Catalyst (including promoter) | | | | |
| Pyrogallic Acid | 1.6 | — | 1.2 | — |
| Tin(II) 2-Ethylhexanoate | 15.7 | — | 11.9 | — |
| Dually Reactive Monomer | 5.8 | 0.9 | 18.6 | 0.3 |
| Acrylic Acid | | | | |
| Raw Material Monomers for Styrenic Resin (St) | | | | |
| Styrene | 657.9 | — | 499.1 | — |
| 2-Ethylhexyl Acrylate | 125.3 | — | 95.1 | — |
| Reaction Product/(Carboxylic Acid Component + Alcohol Component) × 100 (Weight Ratio) | 20 | | 20 | |
| Total Amount of PES/Total Amount of St (weight ratio) | 4.9 | | 4.8 | |
| Softening Point (° C.) | 114.6 | | 113.1 | |
| Glass Transition Temp. (° C.) | 61.2 | | 61.4 | |
| Acid Value (mgKOH/g) | 28.4 | | 26.4 | |
| Hydroxyl Value (mgKOH/g) | 30.4 | | 31.9 | |

[1] Polyoxypropylene(2.2)-2,2-bis(4-hydroxyphenyl)propane
[2] Polyoxyethylene(2.2)-2,2-bis(4-hydroxyphenyl)propane

TABLE 4-5

|  | Resin B1 Amount Used | | Resin B2 Amount Used | |
| --- | --- | --- | --- | --- |
|  | g | mol | g | mol |
| Alcohol Component | | | | |
| 1,2-Propanediol | 1140 | 15 | — | — |
| BPA-PO[1] | — | — | 2450 | 7 |
| BPA-EO[2] | — | — | 975 | 3 |
| Carboxylic Acid Component | | | | |
| Terephthalic Acid | 1618.5 | 9.75 | 1079 | 6.5 |
| Trimellitic Anhydride | 374.4 | 1.95 | 249.6 | 1.3 |
| Esterification Catalyst (including promoter) | | | | |
| Tin(II) 2-Ethylhexanoate | 15.7 | — | 23.8 | — |
| Pyrogallic Acid | 1.6 | — | 2.4 | — |
| Softening Point (° C.) | 114.6 | | 114.9 | |
| Glass Transition Temp. (° C.) | 60.1 | | 67.6 | |
| Acid Value (mgKOH/g) | 30.4 | | 21.4 | |
| HydroxylValue (mgKOH/g) | 35.6 | | 30.4 | |

[1] Polyoxypropylene(2.2)-2,2-bis(4-hydroxyphenyl)propane
[2] Polyoxyethylene(2.2)-2,2-bis(4-hydroxyphenyl)propane

4.8 Examples 1 to 6 and 10 to 17 and Comparative Examples 1 and 2

One hundred parts by weight of a resin binder as listed in Table 4-6, 1 part by weight of a negatively chargeable charge control agent "BONTRON S-34" (manufactured by Orient Chemical Co., Ltd., azo metallic compound), 4.0 parts by weight of a colorant "Regal 330R" (manufactured by Cabot Corporation, carbon black), and 2.0 parts by weight of a polypropylene wax "NP-105" (manufactured by MITSUI CHEMICALS, INC.: melting point 140° C.) were mixed with a Henschel mixer. The mixture obtained was melt-kneaded with a twin-screw extruder. After cooling, the resulting melt-kneaded product was roughly pulverized to a size of 1 mm or so with a hammer mill. The resulting roughly pulverized product was finely pulverized with an air jet-type pulverizer (IDS-2 Model, manufactured by Nippon Pneumatic Mfg. Co., Ltd.), and classified, to provide toner particles having a volume-median particle size ($D_{50}$) of 7.5 μm.

To 100 parts by weight of the resulting toner particles was added 1.0 part by weight of an external additive hydrophobic silica "Aerosil R-972" (manufactured by Nippon Aerosil Co., Ltd., average particle size: 16 nm, hydrophobic treatment agent: dimethyldichlorosilane), and the mixture was blended with a Henschel mixer, to provide each of the toners.

4.9 Examples 7 to 9

The same procedures as in Example 1 were carried out except that 6 parts by weight of a yellow pigment "Paliotol Yellow D1155" (manufactured by BASF, P.Y. 185) in Example 7, 6 parts by weight of a magenta pigment "Super Magenta R" (manufactured by DIC Corporation, P.R. 122) in Example 8, or 6 parts by weight of a cyan pigment "Toner Cyan BG" (manufactured by Clariant GmbH, C.I. Pigment Blue 15:3) in Example 9 was used in place of the carbon black "Regal 330R" as a colorant, to provide each of toners.

4.10 Example 18

The same procedures as in Example 1 were carried out except that 7 parts by weight of a charge control resin "FCA-701PT" (manufactured by FUJIKURA KASEI CO., LTD., quaternary ammonium salt group-containing styrene-acrylic copolymer, softening point: 123° C.) was used together with a resin binder, a colorant and the like, to provide a toner.

4.11 Example 19

The same procedures as in Example 1 were carried out except that 1.0 part by weight of a hydrophobic silica "TG-C243" (manufactured by Cabot Corporation, average particle size: 100 nm, hydrophobic treatment agents: hexamethyldisilazane and (+) octyltriethoxysilane) was used in place of "Aerosil R-972" as an external additive, to provide a toner.

4.12 Example 20

The same procedures as in Example 1 were carried out except that 1 part by weight of "LR-147" (manufactured by Nippon Carlit, Ltd., boron complex of benzilic acid compound) was used in place of "BONTRON S-34" (manufactured by Orient Chemical Co., Ltd.) as a negatively chargeable charge control agent, to provide a toner.

4.13 Test Example 1

Low-Temperature Fixing Ability

A toner was loaded on a copy machine "AR-505" (manufactured by Sharp Corporation), of which fixing device was modified so that fixing could be carried out outside the machine, provided that the evaluation of Example 18 was made using a modified apparatus of nonmagnetic monocomponent development method printer "HL-2040" (manufactured by Brother Industries Ltd.), to provide unfixed images. While sequentially raising the temperature of a fixing roller from 100° to 240° C. in an increment of 10° C., the unfixed images were subjected to a fixing test at each temperature with a fixing device (fixing speed: 390 mm/sec) adjusted so that a total fixing pressure was 40 kgf. "UNICEF Cellophane" tape (MITSUBISHI PENCIL CO., LTD., width: 18 mm, JIS Z-1522) was adhered to the fixed images, and the resulting fixed images were allowed to pass through a fixing roller set at 30° C., and the tape was then removed. The optical reflective densities of the image before adhesion of the tape and after removal of the tape were measured with a reflective densitometer "RD-915" (manufactured by Macbeth Process Measurements Co.). The temperature of a fixing roller at which the ratio of the optical reflective densities (after removal of the tape/before adhesion of the tape) initially exceeds 90% is defined as the lowest fixing temperature. The low-temperature fixing ability was evaluated according to the following evaluation criteria. The results are shown in Table 4-6. Here, the paper used in the fixing test was CopyBond SF-70NA (75 g/m$^2$), manufactured by Sharp Corporation.

[Evaluation Criteria]
A: Lowest fixing temperature being lower than 150° C.;
B: Lowest fixing temperature being 150° C. or higher and lower than 170° C.; and
C: Lowest fixing temperature being 170° C. or higher.

4.14 Test Example 2

Storage Ability

Four grams of a toner was allowed to stand for 72 hours under environmental conditions of a temperature of 55° C. and relative humidity of 60%. After allowing the toner to stand, the extent of generation of toner aggregation was visually observed, and the storage ability was evaluated in accordance with the following evaluation criteria. The results are shown in Table 4-6.

[Evaluation Criteria]
A: The aggregation is not found at all even after 72 hours.
B: Although the aggregation is not found after 48 hours, the aggregation is found after 72 hours.
C: The aggregation is found within 48 hours.

4.15 Test Example 3

Initial Rise in Triboelectric Charging

A 50 ml polyethylene bottle was charged with 0.6 g of a toner and 19.4 g of a silicone ferrite carrier (manufactured by Kanto Denka Kogyo, average particle size: 90 μm), provided that in Example 18 a carrier was changed to "P-01" (ferrite carrier: standard product of Image Society of Japan, average particle size: 70 μm), and the components were mixed with a ball-mill at a rate of 250 r/min for 10 minutes, and triboelectric charges at the time of 1 minute and 10 minutes were determined with a q/m meter (manufactured by EPPING). After a given period of mixing time, a developer in defined amounts was supplied into a cell provided in the q/m meter, and only the toner was aspirated for 90 seconds with the above-mentioned measurement apparatus through a sieve having a sieve opening of 32 μm (made of stainless steel, twilled, wire diameter: 0.0035 mm). The voltage change generated on the carrier at this time was monitored, and initial rise in triboelectric charging was evaluated in accordance with the following evaluation criteria. The results are shown in Table 4-6.

[Evaluation Criteria]

A value for (triboelectric charges at a mixing time of 1 minute)/(triboelectric charges at a mixing time of 10 minutes) is:

visually confirmed on the images as the number of sheets at which lines were generated by fusion or fixing of toner on a developer roller, in accordance with the following evaluation criteria. In other words, it can be judged that the larger the number of sheets without generation of lines, the higher the durability of toner. The results are shown in Table 4-6.

[Evaluation Criteria]

A: No lines are generated up until printing 5,000 sheets.
B: Lines are generated on printing 2,000 sheets or more and less than 5,000 sheets.
C: Lines are generated on printing less than 2,000 sheets.

TABLE 4-6

| | Composition of Toner | | | | | | Evaluation of Toner | | | |
|---|---|---|---|---|---|---|---|---|---|---|
| | Resin Binder (Parts by Weight) | | | Charge | Charge | | Low-Temp. | | Initial Rise in | |
| No. 4- | Reaction Product * | Colorant | Control Agent | Control Resin | External Additive | Fixing Ability | Storage Ability | Triboelectric Charging | Durability |
| Ex. 1 | Resin A1(100) | A(20) | Black | S-34 | — | R-972 | A | A | A | A |
| Ex. 2 | Resin A2(100) | B(20) | Black | S-34 | — | R-972 | A | A | A | A |
| Ex. 3 | Resin A3(100) | C(20) | Black | S-34 | — | R-972 | A | A | A | A |
| Ex. 4 | Resin A4(100) | D(20) | Black | S-34 | — | R-972 | A | B | A | B |
| Ex. 5 | Resin A5(100) | E(20) | Black | S-34 | — | R-972 | A | B | A | B |
| Ex. 6 | Resin A6(100) | F(20) | Black | S-34 | — | R-972 | A | B | A | B |
| Ex. 7 | Resin A1(100) | A(20) | Yellow | S-34 | — | R-972 | A | A | A | A |
| Ex. 8 | Resin A1(100) | A(20) | Magenta | S-34 | — | R-972 | A | A | A | A |
| Ex. 9 | Resin A1(100) | A(20) | Cyan | S-34 | — | R-972 | A | A | A | A |
| Ex. 10 | Resin A7(100) | A(20) | Black | S-34 | — | R-972 | B | A | A | A |
| Ex. 11 | Resin A8(100) | A(20) | Black | S-34 | — | R-972 | A | B | A | B |
| Ex. 12 | Resin A9(100) | A(20) | Black | S-34 | — | R-972 | A | A | A | A |
| Ex. 13 | Resin A10(50)/ Resin A11(50) | A(20)/A(20) | Black | S-34 | — | R-972 | A | A | A | A |
| Ex. 14 | Resin A12(100) | A(40) | Black | S-34 | — | R-972 | A | B | A | A |
| Ex. 15 | Resin A13(100) | A(20) | Black | S-34 | — | R-972 | B | A | A | A |
| Ex. 16 | Resin H1(100) | A(20) | Black | S-34 | — | R-972 | B | B | A | A |
| Ex. 17 | Resin H2(100) | A(20) | Black | S-34 | — | R-972 | B | B | A | A |
| Ex. 18 | Resin A1(100) | A(20) | Black | S-34 | FCA-701PT | R-972 | B | A | B | A |
| Ex. 19 | Resin A1(100) | A(20) | Black | S-34 | — | TG-C243 | B | A | A | A |
| Ex. 20 | Resin A1(100) | A(20) | Black | LR-147 | — | R-972 | B | A | A | A |
| Comp. Ex. 1 | Resin B1(100) | — | Black | S-34 | — | R-972 | A | B | C | B |
| Comp. Ex. 2 | Resin B2(100) | — | Black | S-34 | — | R-972 | B | A | C | A |

* The reaction product used in the production of resins, and the numerical figures inside parenthesis shows Reaction Product/(Alcohol Component + Carboxylic Acid Component) × 100 (weight ratio).

A: 0.95 or more
B: 0.9 or more and less than 0.95
C: less than 0.9

4.16 Test Example 4

Durability

A toner was loaded to a printer "PAGEPRESTO N-4" (manufactured by CASIO COMPUTER CO., LTD., fixing: contact-fixing method, development method: nonmagnetic monocomponent development method, diameter of developer roller: 2.3 cm), and printing was conducted continuously on obliquely striped patterns having a print coverage of 5.5% under the environmental conditions of 32° C. and humidity of 85%. During the course of printing, black solid images were printed for every 500 sheets, and the presence or absence of the lines on the formed images was confirmed. At the point where the generation of the lines was confirmed, printing was stopped. The test was conducted up to 5,000 sheets at the maximum. Durability was evaluated by defining the number of printed sheets at the point where the generation of lines was It can be seen from the above results that the toners of Examples 4-1 to 4-20 containing as a resin binder a polyester obtained using a reaction product formed between a specific aromatic compound and a carboxylic acid are favorable in all of low-temperature fixing ability, storage ability and durability of toners, and further excellent in initial rise in triboelectric charging of toners, as compared to the toners of Comparative Examples 4-1 and 4-2.

Example 5

5.1 Production Example 1 of Amorphous Polyesters

Resins A1, A3 and A6

A 5-liter four-neck flask equipped with a nitrogen inlet tube, a dehydration tube equipped with a fractional distillation tube through which hot water at 100° C. was allowed to flow, a stirrer, and a thermocouple was charged with raw material monomers other than trimellitic anhydride and an aromatic compound represented by the formula (Ia), and an esterification catalyst, as listed in Table 5-1, and the mixture was kept at 180° C. for 1 hour in a nitrogen atmosphere, heated at from 180° to 230° C. at a rate of 10° C./hr, and thereafter subjected to a polycondensation reaction at 230° C. for 10 hours (a conversion rate being 70 to 80% based on an amount of theoretical reaction water). Further, the above aromatic compound as listed in Table 5-1 was added thereto, and the mixture was subjected to a reaction at 180° C. for 5 hours. Thereafter, trimellitic anhydride as listed in Table 5-1 was added thereto, and the mixture was subjected to a reaction at 200° C., and then subjected to a reaction at 10 kPa until a desired softening point was reached, to provide each of amorphous polyesters.

5.2 Production Example 2 of Amorphous Polyester

Resin A2

A 5-liter four-neck flask equipped with a nitrogen inlet tube, a dehydration tube equipped with a fractional distillation tube through which hot water at 100° C. was allowed to flow, a stirrer, and a thermocouple was charged with raw material monomers other than trimellitic anhydride, and an esterification catalyst, as listed in Table 5-1, and the mixture was kept at 180° C. for 1 hour in a nitrogen atmosphere, then heated at from 180° to 230° C. at a rate of 10° C./hr, and thereafter subjected to a polycondensation reaction at 230° C. for 10 hours. Further, trimellitic anhydride as listed in Table 5-1 was added thereto, and the mixture was subjected to a reaction at 200° C., and then subjected to a reaction at 10 kPa until a desired softening point was reached, to provide an amorphous polyester.

5.3 Production Example 3 of Amorphous Polyester

Resin A4

A 5-liter four-neck flask equipped with a dehydration tube equipped with a nitrogen inlet tube, a stirrer, and a thermocouple was charged with raw material monomers other than trimellitic anhydride and an aromatic compound represented by the formula (Ia), and an esterification catalyst, as listed in Table 5-1, and the mixture was subjected to a polycondensation reaction at 230° C. for 10 hours in a nitrogen atmosphere, and further subjected to a reaction at 230° C. and 8.0 kPa for 1 hour (a conversion rate being 70 to 80% based on an amount of theoretical reaction water). Further, the above aromatic compound as listed in Table 5-1 was added thereto, and the mixture was subjected to a reaction at 180° C. for 5 hours. Thereafter, trimellitic anhydride as listed in Table 5-1 was added thereto, and the mixture was subjected to a reaction at 200° C., and then subjected to a reaction at 10 kPa until a desired softening point was reached, to provide an amorphous polyester.

5.4 Production Example 4 of Amorphous Polyester

Resin A5

A 5-liter four-neck flask equipped with a dehydration tube equipped with a nitrogen inlet tube, a stirrer, and a thermocouple was charged with raw material monomers other than trimellitic anhydride, and an esterification catalyst, as listed in Table 5-1, and the mixture was subjected to a polycondensation reaction at 230° C. for 10 hours in a nitrogen atmosphere, and further subjected to a reaction at 230° C. and 8.0 kPa for 1 hour. Further, trimellitic anhydride as listed in Table 5-1 was added thereto, and the mixture was subjected to a reaction at 200° C., and then subjected to a reaction at 10 kPa until a desired softening point was reached, to provide an amorphous polyester.

TABLE 5-1

| | Resin A1 Amount Used | | | Resin A2 Amount Used | | | Resin A3 Amount Used | | |
|---|---|---|---|---|---|---|---|---|---|
| | g | mol | molar ratio | g | mol | molar ratio | g | mol | molar ratio |
| Raw Material Monomer Alcohol Component | | | | | | | | | |
| 1,2-Propanediol | 1140 | 15 | 100 | 1140 | 15 | 100 | 570 | 7.5 | 50 |
| 2,3-Butanediol | — | — | — | — | — | — | 675 | 7.5 | 50 |
| BPA-PO[1] | — | — | — | — | — | — | — | — | — |
| BPA-EO[2] | — | — | — | — | — | — | — | — | — |
| Carboxylic Acid Component | | | | | | | | | |
| Terephthalic Acid | 1618.5 | 9.75 | 65 | 1618.5 | 9.75 | 65 | 1618.5 | 9.75 | 65 |
| Trimellitic Anhydride | 374.4 | 1.95 | 13 | 374.4 | 1.95 | 13 | 374.4 | 1.95 | 13 |
| Ferulic Acid[3] | 582 | 3 | 20 | — | — | — | 582 | 3 | 20 |
| Esterification Catalyst (including promoter) | | | | | | | | | |
| Tin(II) 2-Ethylhexanoate | 18.6 | — | — | 15.7 | — | — | 19.1 | — | — |
| Pyrogallic Acid | 1.9 | — | — | 1.6 | — | — | 1.9 | — | — |
| Aromatic Compound Represented by Formula (Ia) (mol %[4]) | | 10.1 | | | 0 | | | 10.1 | |
| Softening Point (° C.) | | 117.1 | | | 116.8 | | | 115.4 | |
| Temperature of Maximum Endothermic Peak (° C.) | | 68.3 | | | 69.4 | | | 69.2 | |
| Softening Point/ Temperature of Maximum Endothermic Peak | | 1.7 | | | 1.7 | | | 1.7 | |
| Glass Transition Temp. (° C.) | | 66.9 | | | 65.4 | | | 66.2 | |

TABLE 5-1-continued

| | | 31.4 | | | 26.5 | | | 26.7 | |
|---|---|---|---|---|---|---|---|---|---|
| Acid Value (mgKOH/g) | | 31.4 | | | 26.5 | | | 26.7 | |
| Hydroxyl Value (mgKOH/g) | | 35.8 | | | 31.6 | | | 34.2 | |

| | Resin A4 Amount Used | | | Resin A5 Amount Used | | | Resin A6 Amount Used | | |
|---|---|---|---|---|---|---|---|---|---|
| | g | mol | molar ratio | g | mol | molar ratio | g | mol | molar ratio |
| Raw Material Monomer | | | | | | | | | |
| Alcohol Component | | | | | | | | | |
| 1,2-Propanediol | — | — | — | — | — | — | 1140 | 15 | 100 |
| 2,3-Butanediol | — | — | — | — | — | — | — | — | — |
| BPA-PO[1] | 1715 | 4.9 | 70 | 1715 | 4.9 | 70 | — | — | — |
| BPA-EO[2] | 682.5 | 2.1 | 30 | 682.5 | 2.1 | 30 | — | — | — |
| Carboxylic Acid Component | | | | | | | | | |
| Terephthalic Acid | 755.3 | 4.55 | 65 | 755.3 | 4.55 | 65 | 1867.5 | 11.25 | 75 |
| Trimellitic Anhydride | 174.72 | 0.91 | 13 | 174.72 | 0.91 | 13 | 374.4 | 1.95 | 13 |
| Ferulic Acid[3] | 271.6 | 1.4 | 20 | — | — | — | 58.2 | 0.3 | 2 |
| Esterification Catalyst | | | | | | | | | |
| (including promoter) | | | | | | | | | |
| Tin(II) 2-Ethylhexanoate | 18.0 | — | — | 16.6 | — | — | 17.2 | — | — |
| Pyrogallic Acid | 1.8 | — | — | 1.7 | — | — | 1.7 | — | — |
| Aromatic Compound Represented by Formula (Ia) (mol %[4]) | | 10.1 | | | 0 | | | 1.05 | |
| Softening Point (° C.) | | 115.1 | | | 113.9 | | | 116.5 | |
| Temperature of Maximum Endothermic Peak (° C.) | | 68.4 | | | 68.6 | | | 70.2 | |
| Softening Point/Temperature of Maximum Endothermic Peak | | 1.7 | | | 1.7 | | | 1.7 | |
| Glass Transition Temp. (° C.) | | 66.8 | | | 65.6 | | | 65.7 | |
| Acid Value (mgKOH/g) | | 29.5 | | | 26.7 | | | 30.4 | |
| Hydroxyl Value (mgKOH/g) | | 32.9 | | | 34.2 | | | 39.4 | |

[1] Polyoxypropylene(2.2)-2,2-bis(4-hydroxyphenyl)propane
[2] Polyoxyethylene(2.2)-2,2-bis(4-hydroxyphenyl)propane
[3] Aromatic compound represented by the formula (Ia)
[4] of the entire raw material monomers

5.5 Production Example 1 for Hybrid Resin

Resin H1

A 5-liter four-neck flask equipped with a nitrogen inlet tube, a dehydration tube equipped with a fractional distillation tube through which hot water at 100° C. was allowed to flow, a stirrer, and a thermocouple was charged with raw material monomers of polyester other than trimellitic anhydride, and an esterification catalyst, as listed in Table 5-2, and the mixture was heated to 160° C. in a nitrogen atmosphere. Thereafter, a mixture of a dually reactive monomer, raw material monomers of a styrenic resin and a polymerization initiator, as listed in Table 5-2 was added dropwise thereto with a dropping funnel over 1 hour. After the dropwise addition, the addition polymerization reaction was matured for 1 hour, while keeping the mixture at 160° C. Thereafter, the mixture was subjected to a polycondensation reaction at 230° C. for 10 hours, and further subjected to a reaction at 230° C. and 8.0 kPa for 1 hour. Further, trimellitic anhydride as listed in Table 5-2 was added thereto, and the mixture was subjected to a reaction at 200° C. and 10 kPa until a desired softening point was reached, to provide a hybrid resin.

5.6 Production Example 2 for Hybrid Resin

Resin H2

A 5-liter four-neck flask equipped with a dehydration tube equipped with a nitrogen inlet tube, a stirrer, and a thermocouple was charged with raw material monomers of polyester other than trimellitic anhydride, and an esterification catalyst, as listed in Table 5-2, and the mixture was heated to 160° C. in a nitrogen atmosphere. Thereafter, a mixture of a dually reactive monomer, raw material monomers of a styrenic resin and a polymerization initiator as listed in Table 5-2 was added dropwise thereto with a dropping funnel over 1 hour. After the dropwise addition, the addition polymerization reaction was matured for 1 hour, while keeping the mixture at 160° C. Thereafter, the mixture was subjected to a polycondensation reaction at 230° C. for 10 hours, and further subjected to a reaction at 230° C. and 8.0 kPa for 1 hour. Further, trimellitic anhydride as listed in Table 5-2 was added thereto, and the mixture was subjected to a reaction at 200° C., and then subjected to a reaction at 10 kPa until a desired softening point was reached, to provide a hybrid resin.

TABLE 5-2

|  | Resin H1 | | | Resin H2 | | |
|---|---|---|---|---|---|---|
|  | g | mol | molar ratio | g | mol | molar ratio |
| Raw Material Monomers for Polyester (PES) Alcohol Component | | | | | | |
| 1,2-Propanediol | 1140 | 15 | 100 | — | — | — |
| BPA-PO[1] | — | — | — | 1715 | 4.9 | 70 |
| BPA-EO[2] | — | — | — | 682.5 | 2.1 | 30 |
| Carboxylic Acid Component | | | | | | |
| Terephthalic Acid | 1618.5 | 9.75 | 65 | 755.3 | 4.55 | 65 |
| Trimellitic Anhydride | 374.4 | 1.95 | 13 | 174.72 | 0.91 | 13 |
| Esterification Catalyst (including promoter) | | | | | | |
| Tin(II) 2-Ethylhexanoate | 15.7 | — | — | 16.6 | — | — |
| Pyrogallic Acid | 1.6 | — | — | 1.7 | — | — |
| Dually Reactive Monomer | 55.8 | 0.9 | 6 | 18.6 | 0.3 | 6 |
| Acrylic Acid | | | | | | |
| Raw Material Monomers for Styrenic Resin (St) | | | | | | |
| Styrene | 657.9 | — | — | 698.8 | — | — |
| 2-Ethylhexyl Acrylate | 125.3 | — | — | 133.1 | — | — |
| Polymerization Initiator | | | | | | |
| Dibutyl Peroxide | 62.6 | — | — | 66.5 | — | — |
| Total Amount of PES/Total Amount of St (weight ratio) | | 4 | | | 4 | |
| Softening Point (° C.) | | 114.6 | | | 113.1 | |
| Temperature of Maximum Endothermic Peak (° C.) | | 63.4 | | | 63.8 | |
| Softening Point/Temperature of Maximum Endothermic Peak | | 1.8 | | | 1.8 | |
| Glass Transition Temp. (° C.) | | 61.2 | | | 61.4 | |
| Acid Value (mgKOH/g) | | 28.4 | | | 26.4 | |
| Hydroxyl Value (mgKOH/g) | | 30.4 | | | 31.9 | |

[1] Polyoxypropylene(2.2)-2,2-bis(4-hydroxyphenyl)propane
[2] Polyoxyethylene(2.2)-2,2-bis(4-hydroxyphenyl)propane 5.7 Production Example 1 of Crystalline Polyesters Resins C3 to C6, and C8 to C13

A 5-liter four-neck flask equipped with a nitrogen inlet tube, a dehydration tube, a stirrer, and a thermocouple was charged with raw material monomers and an esterification catalyst, as listed in Tables 5-3 to 5-5, and the mixture was subjected to a reaction at 160° C. over 5 hours, heated to and subjected to a reaction at 200° C., to provide each of crystalline polyesters.

5.8 Production Example 2 of Crystalline Polyester

Resin C2

A 5-liter four-neck flask equipped with a nitrogen inlet tube, a dehydration tube, a stirrer, and a thermocouple was charged with raw material monomers other than trimellitic anhydride and an esterification catalyst, as listed in Table 5-3, and the mixture was subjected to a reaction at 160° C. over 5 hours, and thereafter heated to 200° C. Further, trimellitic anhydride as listed in Table 5-3 was added thereto, and the mixture was subjected to a reaction for 20 minutes, to provide a crystalline polyester.

5.9 Production Example 3 of Crystalline Polyester

Resin C7

A 5-liter four-neck flask equipped with a nitrogen inlet tube, a dehydration tube, a stirrer, and a thermocouple was charged with raw material monomers and an esterification catalyst, as listed in Table 5-4, and the mixture was subjected to a reaction at 180° C. over 5 hours, and thereafter heated to and subjected to a reaction at 200° C., to provide a crystalline polyester.

TABLE 5-3

|  | Resin C1 Amount Used | | | Resin C2 Amount Used | | | Resin C3 Amount Used | | |
|---|---|---|---|---|---|---|---|---|---|
|  | g | mol | molar ratio | g | mol | molar ratio | g | mol | molar ratio |
| Raw Material Monomers Alcohol Component | | | | | | | | | |
| 1,6-Hexanediol | 1770 | 15 | 100 | 1770 | 15 | 100 | 1239 | 11 | 70 |
| 1,4-Butanediol | — | — | — | — | — | — | 405 | 4.5 | 30 |

TABLE 5-3-continued

| Carboxylic Acid Component | | | | | | | | | |
|---|---|---|---|---|---|---|---|---|---|
| Fumaric Acid | 1566 | 13.5 | 90 | 1566 | 14 | 90 | 1566 | 14 | 90 |
| Trimellitic Anhydride | — | — | — | 144 | 0.8 | 5 | — | — | — |
| Ferulic Acid[1] | 582 | 3 | 20 | 582 | 3 | 20 | 582 | 3 | 20 |
| Esterification Catalyst (including promoter) | | | | | | | | | |
| Tin(II) 2-Ethylhexanoate | 19.6 | — | — | 20.3 | — | — | 19.0 | — | — |
| Pyrogallic Acid | — | — | — | — | — | — | — | — | — |
| Titanium Catalyst | — | — | — | — | — | — | — | — | — |
| Polymerization Inhibitor | | | | | | | | | |
| tert-Butyl Catechol | 2.0 | — | — | 2.0 | — | — | 1.9 | — | — |
| Aromatic Compound Represented by Formula (Ia) (mol %[2]) | | 9.5 | | | 9.3 | | | 9.5 | |
| Softening Point (° C.) | | 105.4 | | | 107.5 | | | 100.4 | |
| Temperature of Maximum Endothermic Peak (° C.) | | 103.6 | | | 101.5 | | | 98.5 | |
| Softening Point/Temperature of Maximum Endothermic Peak | | 1.02 | | | 1.06 | | | 1.02 | |

| | Resin C4 Amount Used | | | Resin C5 Amount Used | | | Resin C6 Amount Used | | |
|---|---|---|---|---|---|---|---|---|---|
| | g | mol | molar ratio | g | mol | molar ratio | g | mol | molar ratio |
| Raw Material Monomers Alcohol Component | | | | | | | | | |
| 1,6-Hexanediol | 1770 | 15 | 100 | 1770 | 15 | 100 | 1770 | 15 | 100 |
| 1,4-Butanediol | — | — | — | — | — | — | — | — | — |
| Carboxylic Acid Component | | | | | | | | | |
| Fumaric Acid | 1392 | 12 | 80 | 1566 | 13.5 | 90 | 1566 | 13.5 | 90 |
| Trimellitic Anhydride | — | — | — | — | — | — | — | — | — |
| Ferulic Acid[1] | 1164 | 6 | 40 | 582 | 3 | 20 | 582 | 3 | 20 |
| Esterification Catalyst (including promoter) | | | | | | | | | |
| Tin(II) 2-Ethylhexanoate | 21.6 | — | — | 19.6 | — | — | — | — | — |
| Pyrogallic Acid | — | — | — | 2.0 | — | — | 2.0 | — | — |
| Titanium Catalyst | — | — | — | — | — | — | 19.6 | — | — |
| Polymerization Inhibitor | | | | | | | | | |
| tert-Butyl Catechol | 2.2 | — | — | 2.0 | — | — | 2.0 | — | — |
| Aromatic Compound Represented by Formula (Ia) (mol %[2]) | | 18.2 | | | 9.5 | | | 9.5 | |
| Softening Point (° C.) | | 98.7 | | | 104.9 | | | 104.5 | |
| Temperature of Maximum Endothermic Peak (° C.) | | 94.1 | | | 102.8 | | | 103.4 | |
| Softening Point/Temperature of Maximum Endothermic Peak | | 1.05 | | | 1.02 | | | 1.01 | |

[1]Aromatic compound represented by the formula (Ia)
[2]of the entire raw material monomers

TABLE 5-4

| | Resin C7 Amount Used | | | Resin C8 Amount Used | | | Resin C9 Amount Used | | | Resin C10 Amount Used | | |
|---|---|---|---|---|---|---|---|---|---|---|---|---|
| | g | mol | molar ratio | g | mol | molar ratio | g | mol | molar ratio | g | mol | molar ratio |
| Raw Material Monomers Alcohol Component | | | | | | | | | | | | |
| 1,6-Hexanediol | 1770 | 15 | 100 | 1770 | 15 | 100 | 1593 | 13.5 | 90 | 1593 | 13.5 | 90 |
| Coniferyl Alcohol[1] | — | — | — | — | — | — | 540 | 3 | 20 | — | — | — |
| Sinapyl Alcohol[1] | — | — | — | — | — | — | — | — | — | 630 | 3 | 20 |
| Carboxylic Acid Component | | | | | | | | | | | | |
| Fumaric Acid | — | — | — | 1566 | 13.5 | 90 | 1740 | 15 | 100 | 1740 | 15 | 100 |
| Terephthalic Acid | 1992 | 12 | 80 | — | — | — | — | — | — | — | — | — |
| Ferulic Acid[1] | 582 | 3 | 20 | — | — | — | — | — | — | — | — | — |

TABLE 5-4-continued

| | Resin C7 Amount Used | | | Resin C8 Amount Used | | | Resin C9 Amount Used | | | Resin C10 Amount Used | | |
|---|---|---|---|---|---|---|---|---|---|---|---|---|
| | g | mol | molar ratio | g | mol | molar ratio | g | mol | molar ratio | g | mol | molar ratio |
| Syringic Acid[1] | — | — | — | 594 | 3 | 20 | — | — | — | — | — | — |
| Esterification Catalyst (including promoter) | | | | | | | | | | | | |
| Tin(II) 2-Ethylhexanoate | 21.7 | — | — | 19.7 | — | — | 19.4 | — | — | 19.8 | — | — |
| Pyrogallic Acid | 2.2 | — | — | 2.0 | — | — | 1.9 | — | — | 2.0 | — | — |
| Polymerization Inhibitor | | | | | | | | | | | | |
| tert-Butyl Catechol | — | — | — | 2.0 | — | — | 1.9 | — | — | 2.0 | — | — |
| Aromatic Compound Represented by Formula (Ia) (mol %[2]) | | 20 | | | 9.5 | | | 9.5 | | | 9.5 | |
| Softening Point (° C.) | | 123.1 | | | 106.1 | | | 105.7 | | | 105.3 | |
| Temperature of Maximum Endothermic Peak (° C.) | | 128.7 | | | 103.2 | | | 102.5 | | | 101.9 | |
| Softening Point/Temperature of Maximum Endothermic Peak | | 0.96 | | | 1.03 | | | 1.03 | | | 1.03 | |

[1]Aromatic compound represented by the formula (Ia)
[2]of the entire raw material monomers

TABLE 5-5

| | Resin C11 Amount Used | | | Resin C12 Amount Used | | | Resin C13 Amount Used | | |
|---|---|---|---|---|---|---|---|---|---|
| | g | mol | molar ratio | g | mol | molar ratio | g | mol | molar ratio |
| Raw Material Monomers Alcohol Component | | | | | | | | | |
| 1,6-Hexanediol | 1593 | 13.5 | 90 | 1770 | 15 | 100 | 1770 | 15 | 100 |
| Coniferyl Alcohol[1] | 540 | 3 | 20 | — | — | — | — | — | — |
| Carboxylic Acid Component | | | | | | | | | |
| Fumaric Acid | 1566 | 13.5 | 90 | 1740 | 15 | 100 | 1723 | 14.85 | 99 |
| Terephthalic Acid | — | — | — | — | — | — | — | — | — |
| Ferulic Acid[1] | 582 | 3 | 20 | — | — | — | 58 | 0.3 | 2 |
| Esterification Catalyst (including promoter) | | | | | | | | | |
| Tin(II) 2-Ethylhexanoate | 21.4 | — | — | 17.6 | — | — | 17.8 | — | — |
| Pyrogallic Acid | 2.1 | — | — | — | — | — | — | — | — |
| Polymerization Inhibitor | | | | | | | | | |
| tert-Butyl Catechol | 2.1 | — | — | 1.8 | — | — | 1.8 | — | — |
| Aromatic Compound Represented by Formula (Ia) (mol %[2]) | | 18.2 | | | 0 | | | 1.0 | |
| Softening Point (° C.) | | 100.6 | | | 111.6 | | | 110.1 | |
| Temperature of Maximum Endothermic Peak (° C.) | | 97.5 | | | 113.5 | | | 111.9 | |
| Softening Point/Temperature of Maximum Endothermic Peak | | 1.03 | | | 0.98 | | | 0.98 | |

[1]Aromatic compound represented by the formula (Ia)
[2]of the entire raw material monomers

5.10 Examples 1 to 12, 16 to 21 and 25 and Comparative Examples 1 to 4

One hundred parts by weight of resin binders as listed in Table 5-6, 1 part by weight of a negatively chargeable charge control agent "BONTRON S-34" (manufactured by Orient Chemical Co., Ltd., azo metal-containing compound), 4.0 parts by weight of a colorant "Regal 330R" (manufactured by Cabot Corporation, carbon black), and 2.0 parts by weight of a polypropylene wax "NP-105" (manufactured by MITSUI CHEMICALS, INC., melting point 140° C.) were mixed with a Henschel mixer, and the mixture obtained was melt-kneaded with a twin-screw extruder. After cooling, the melt-kneaded product obtained was roughly pulverized to a size of 1 mm or so with a hammer mill. The resulting roughly pulverized product was finely pulverized with an air jet-type pulverizer (IDS-2 Model, manufactured by Nippon Pneumatic Mfg. Co., Ltd.), and classified, to provide toner particles having a volume-median particle size ($D_{50}$) of 7.5 μm.

To 100 parts by weight of the resulting toner particles was added 1.0 part by weight of an external additive hydrophobic silica "Aerosil R-972" (manufactured by Nippon Aerosil Co., Ltd., average particle size: 16 nm, hydrophobic treatment agent: dimethyldichlorosilane), and the mixture was blended with a Henschel mixer, to provide each of the toners.

5.11 Examples 13 to 15

The same procedures as in Example 1 were carried out except that 6 parts by weight of a yellow pigment "Paliotol Yellow D1155" (manufactured by BASF, P.Y. 185) was used in Example 13, 6 parts by weight of a magenta pigment "Super Magenta R" (manufactured by DIC Corporation, P.R. 122) in Example 14, or 6 parts by weight of a cyan pigment "Toner Cyan BG" (manufactured by Clariant GmbH, C.I. Pigment Blue 15:3) in Example 15, in place of the carbon black "Regal 330R" as a colorant, to provide each of toners.

5.12 Example 22

The same procedures as in Example 1 were carried out except that 7 parts by weight of a charge control resin "FCA-701PT" (manufactured by FUJIKURA KASEI CO., LTD., quaternary ammonium salt group-containing styrene-acrylic copolymer, softening point: 123° C.) was used together with a resin binder, a colorant and the like, to provide a toner.

5.13 Example 23

The same procedures as in Example 1 were carried out except that 1.0 part by weight of a hydrophobic silica "TG-C243" (manufactured by Cabot Corporation, average particle size: 100 nm, hydrophobic treatment agents: hexamethyldisilazane and (+) octyltriethoxysilane) was used in place of "Aerosil R-972" as an external additive, to provide a toner.

5.14 Example 24

The same procedures as in Example 1 were carried out except that 1 part by weight of "LR-147" (manufactured by Nippon Carlit, Ltd., boron complex of benzilic acid compound) was used in place of "BONTRON S-34" (manufactured by Orient Chemical Co., Ltd.) as a negatively chargeable charge control agent, to provide a toner.

5.15 Test Example 1

Low-Temperature Fixing Ability

A toner was loaded on a copy machine "AR-505" (manufactured by Sharp Corporation), of which fixing device was modified so that fixing could be carried out outside the machine, provided that the evaluation of Example 22 was made using a modified apparatus of nonmagnetic monocomponent development method printer "HL-2040" (manufactured by Brother Industries Ltd.), to provide unfixed images.

While sequentially raising the temperature of a fixing roller from 100° to 240° C. in an increment of 10° C., the unfixed images were subjected to a fixing test at each temperature with a fixing device (fixing speed: 390 mm/sec) adjusted so that a total fixing pressure was 40 kgf. "UNICEF Cellophane" tape (MITSUBISHI PENCIL CO., LTD., width: 18 mm, JIS Z-1522) was adhered to the fixed images, and the resulting fixed images were allowed to pass through a fixing roller set at 30° C., and the tape was then removed. The optical reflective densities of the image before adhesion of the tape and after removal of the tape were measured with a reflective densitometer "RD-915" (manufactured by Macbeth Process Measurements Co.). The temperature of a fixing roller at which the ratio of the optical reflective densities (after removal of the tape/before adhesion of the tape) initially exceeds 90% is defined as the lowest fixing temperature. The low-temperature fixing ability was evaluated according to the following evaluation criteria. Here, the paper used in the fixing test was CopyBond SF-70NA (75 g/m$^2$), manufactured by Sharp Corporation. The results are shown in Table 5-6.

[Evaluation Criteria]

A: Lowest fixing temperature being lower than 140° C.;

B: Lowest fixing temperature being 140° C. or higher and lower than 170° C.; and C: Lowest fixing temperature being 170° C. or higher.

5.16 Test Example 2

Storage Ability

Four grams of a toner was allowed to stand for 72 hours under environmental conditions of a temperature of 50° C. and relative humidity of 60%. After allowing the toner to stand, the extent of generation of toner aggregation was visually observed, and the storage ability was evaluated in accordance with the following evaluation criteria. The results are shown in Table 5-6.

[Evaluation Criteria]

A: The aggregation is not found at all even after 72 hours.

B: Although the aggregation is not found after 48 hours, the aggregation is found after 72 hours.

C: The aggregation is found within 48 hours.

5.17 Test Example 3

Initial Rise in Triboelectric Charging

A 50 ml polyethylene bottle was charged with 0.6 g of a toner and 19.4 g of a silicone ferrite carrier (manufactured by Kanto Denka Kogyo, average particle size: 90 μm), provided that in Example 18 a carrier was changed to "P-01" (ferrite carrier: standard product of Image Society of Japan, average particle size: 70 μm), and the components were mixed with a ball-mill at a rate of 250 r/min for 10 minutes, and triboelectric charges at the time of 1 minute and 10 minutes were determined with a q/m meter (manufactured by EPPING). After a given period of mixing time, a developer in defined amounts was supplied into a cell provided in the q/m meter, and only the toner was aspirated for 90 seconds with the above-mentioned measurement apparatus through a sieve having a sieve opening of 32 μm (made of stainless steel, twilled, wire diameter: 0.0035 mm). The voltage change generated on the carrier at this time was monitored and initial rise in triboelectric charging was evaluated in accordance with the following evaluation criteria. The results are shown in Table 5-6.

[Evaluation Criteria]

A value for (triboelectric charges at a mixing time of 1 minute)/(triboelectric charges at a mixing time of 10 minutes) is:

A: 0.95 or more

B: 0.90 or more and less than 0.95

C: 0.85 or more and less than 0.90

D: less than 0.85

TABLE 5-6

| No. 5- | Resin Binder (Weight Ratio) | Amount of Aromatic Compound Represented by the formula (Ia) Contained (% by mol) Amorphous Resin | Amount of Aromatic Compound Represented by the formula (Ia) Contained (% by mol) Crystalline Resin | Charge Control Agent | Charge Control Resin | Colorant | External Additive | Low-Temp. Fixing Ability | Storage Ability | Initial Rise in Triboelectric Charging |
|---|---|---|---|---|---|---|---|---|---|---|
| Ex. 1 | Resin A1/Resin C1 (80/20) | A1(10.1) | C1(9.5) | S-34 | — | Black | R-972 | A | A | A |
| Ex. 2 | Resin A1/Resin C2 (80/20) | A1(10.1) | C2(9.3) | S-34 | — | Black | R-972 | B | A | A |
| Ex. 3 | Resin A1/Resin C3 (80/20) | A1(10.1) | C3(9.5) | S-34 | — | Black | R-972 | A | B | A |
| Ex. 4 | Resin A1/Resin C4 (80/20) | A1(10.1) | C4(18.2) | S-34 | — | Black | R-972 | B | A | A |
| Ex. 5 | Resin A1/Resin C5 (80/20) | A1(10.1) | C5(9.3) | S-34 | — | Black | R-972 | A | A | A |
| Ex. 6 | Resin A1/Resin C6 (80/20) | A1(10.1) | C6(9.5) | S-34 | — | Black | R-972 | A | B | A |
| Ex. 7 | Resin A1/Resin C7 (80/20) | A1(10.1) | C7(20) | S-34 | — | Black | R-972 | B | A | A |
| Ex. 8 | Resin A1/Resin C8 (80/20) | A1(10.1) | C8(9.5) | S-34 | — | Black | R-972 | A | A | A |
| Ex. 9 | Resin A1/Resin C9 (80/20) | A1(10.1) | C9(9.5) | S-34 | — | Black | R-972 | A | A | A |
| Ex. 10 | Resin A1/Resin C10 (80/20) | A1(10.1) | C10(9.5) | S-34 | — | Black | R-972 | A | A | A |
| Ex. 11 | Resin A1/Resin C11 (80/20) | A1(10.1) | C11(18.2) | S-34 | — | Black | R-972 | B | A | A |
| Ex. 12 | Resin A1/Resin C12 (80/20) | A1(10.1) | C12(0) | S-34 | — | Black | R-972 | A | A | B |
| Ex. 13 | Resin A1/Resin C1 (80/20) | A1(10.1) | C1(9.5) | S-34 | — | Yellow | R-972 | A | A | A |
| Ex. 14 | Resin A1/Resin C1 (80/20) | A1(10.1) | C1(9.5) | S-34 | — | Magenta | R-972 | A | A | A |
| Ex. 15 | Resin A1/Resin C1 (80/20) | A1(10.1) | C1(9.5) | S-34 | — | Cyan | R-972 | A | A | A |
| Ex. 16 | Resin A2/Resin C1 (80/20) | A2(0) | C1(9.5) | S-34 | — | Black | R-972 | A | A | B |
| Ex. 17 | Resin A3/Resin C1 (80/20) | A3(10.1) | C1(9.5) | S-34 | — | Black | R-972 | A | A | A |
| Ex. 18 | Resin A4/Resin C1 (80/20) | A4(10.1) | C1(9.5) | S-34 | — | Black | R-972 | B | A | A |
| Ex. 19 | Resin A5/Resin C1 (80/20) | A5(0) | C1(9.5) | S-34 | — | Black | R-972 | B | A | B |
| Ex. 20 | Resin H1/Resin C1 (80/20) | H1(0) | C1(9.5) | S-34 | — | Black | R-972 | B | B | B |
| Ex. 21 | Resin H2/Resin C1 (80/20) | H2(0) | C1(9.5) | S-34 | — | Black | R-972 | B | B | B |
| Ex. 22 | Resin A1/Resin C1 (80/20) | A1(10.1) | C1(9.5) | S-34 | FCA-701PT | Black | R-972 | B | A | B |
| Ex. 23 | Resin A1/Resin C1 (80/20) | A1(10.1) | C1(9.5) | S-34 | — | Black | TG-C243 | B | A | A |
| Ex. 24 | Resin A1/Resin C1 (80/20) | A1(10.1) | C1(9.5) | LR-147 | — | Black | R-972 | B | A | A |
| Ex. 25 | Resin A6/Resin C13 (80/20) | A6(1.1) | C13(1) | S-34 | — | Black | R-972 | A | A | C |
| Comp. Ex. 1 | Resin A2/Resin C12 (80/20) | A2(0) | C12(0) | S-34 | — | Black | R-972 | A | B | D |
| Comp. Ex. 2 | Resin A5/Resin C12 (80/20) | A5(0) | C12(0) | S-34 | — | Black | R-972 | B | B | D |
| Comp. Ex. 3 | Resin H1/Resin C12 (80/20) | H1(0) | C12(0) | S-34 | — | Black | R-972 | C | B | D |
| Comp. Ex. 4 | Resin H2/Resin C12 (80/20) | H2(0) | C12(0) | S-34 | — | Black | R-972 | C | B | D |

It can be seen from the above results that the toners of Examples 5-1 to 5-25 containing as a resin binder a polyester resin obtained using a specific aromatic compound at least in one of crystalline resins and amorphous resins are favorable in all low-temperature fixing ability and storage ability of toners, and further excellent in initial rise in triboelectric charging of toners, as compared to the toners of Comparative Examples 5-1 to 5-4.

Example 6

[Average Particle Size of Particles in Dispersion]
Distilled water was added to a cell for measurement, and a volume-median particle size ($D_{50}$) is measured at a concentration in which absorbance settles in an appropriate range, using a laser diffraction particle size analyzer (manufactured by Shimadzu Corporation, SALD-2000J).

6.1 Production Example 1 of Resins

Resins 1, 2, 4, 5, 6, 8, 11, and 12

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers (an alcohol component and a carboxylic acid component) other than trimellitic anhydride and an aromatic compound represented by the formula (Ia), and an esterification catalyst, as listed in Table 6-1 or 6-2, and the mixture was subjected to a reaction at 180° C. for 5 hours in a nitrogen atmosphere, heated from 180° to 230° C. at a rate of 5° C./hr, and then subjected to a polycondensation reaction at 230° C. until a conversion rate reached 90%. Further, the mixture was cooled to 180° C., the above aromatic compound as listed in Table 6-1 or 6-2 was then added thereto, and the mixture was subjected to a reaction at 180° C. for 5 hours. Thereafter, trimellitic anhydride as listed in Table 6-1 or 6-2 was added thereto, and the mixture was subjected to a reaction at 210° C. and a normal pressure for 1 hour, and then subjected to a reaction at 10 kPa until a softening point given in Table 6-1 or 6-2 was reached, to provide each of polyesters. Here, the conversion rate refers to a value calculated from carboxy groups and hydroxyl groups of the alcohol component and the carboxylic acid component, supposing that the conversion rate upon the completion of discharge of theoretical reaction water is defined as 100%.

6.2 Production Example 2 of Resin

Resin 3

A 5-liter four neck flask equipped with a dehydration tube equipped with a nitrogen inlet tube, a stirrer, and a thermocouple was charged with raw material monomers (an alcohol component and a carboxylic acid component) other than trimellitic anhydride and an aromatic compound represented by the formula (Ia), and an esterification catalyst, as listed in Table 6-1, and the mixture was subjected to a polycondensation reaction at 235° C. until a conversion rate reached 90% in a nitrogen atmosphere, and further subjected to a reaction at 235° C. and 8.0 kPa for 1 hour. Further, the above aromatic compound as listed in Table 6-1 was added thereto, and the mixture was subjected to a reaction at 180° C. for 5 hours. Thereafter, trimellitic anhydride as listed in Table 6-1 was added thereto, and the mixture was subjected to a reaction at 200° C., and then subjected to a reaction at 10 kPa until a softening point given in Table 6-1 was reached, to provide a polyester.

6.3 Production Example 3 of Resin

Resin 7

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers (an alcohol component and a carboxylic acid component) other than fumaric acid, trimellitic anhydride and an aromatic compound represented by the formula (Ia), and an esterification catalyst, as listed in Table 6-1, and the mixture was subjected to a reaction at 180° C. for 2 hours in a nitrogen atmosphere, then heated from 180° to 230° C. at a rate of 5° C./hr, and then subjected to a polycondensation reaction at 230° C. until a conversion rate reached 90%. Further, the mixture was cooled, the above aromatic compound as listed in Table 6-1 was then added thereto, and the mixture was subjected to a reaction at 180° C. for 5 hours. Thereafter, fumaric acid, trimellitic anhydride, and a polymerization inhibitor listed in Table 6-1 were added thereto, and the mixture was subjected to a reaction at from 180° C. to 210° C. at a normal pressure over 5 hours, and then subjected to a reaction at 10 kPa until a softening point given in Table 6-1 was reached, to provide a polyester.

6.4 Production Example 4 for Resin

Resin 9

A 5-liter four-neck flask equipped with a dehydration tube equipped with a nitrogen inlet tube, a stirrer, and a thermocouple was charged with raw material monomers of polyester (an alcohol component and carboxylic acid component) other than trimellitic anhydride and aromatic compound represented by the formula (Ia), and an esterification catalyst, as listed in Table 6-3, and the mixture was heated to 160° C. in a nitrogen atmosphere. Thereafter, a mixture of a dually reactive monomer (acrylic acid), raw material monomers of a vinyl resin and a polymerization initiator as listed in Table 6-3 was added dropwise thereto with a dropping funnel over 1 hour. After the dropwise addition, the addition polymerization reaction was matured for 1 hour, while keeping the mixture at 160° C. Thereafter, the mixture was heated to 180° C. and subjected to a reaction for 2 hours, and then heated to 210° C. at a rate of 5° C./hr and subjected to a reaction at 210° C. until a conversion rate reached to 90%. Thereafter, cooling to 180° C., the above aromatic compound as listed in Table 6-3 was added thereto, and the mixture was subjected to a reaction at 180° C. for 5 hours. Thereafter, trimellitic anhydride as listed in Table 6-3 was added thereto, and the mixture was subjected to a reaction at 200° C., and then subjected to a reaction at 10 kPa until a softening point given in Table 6-3 was reached, to provide a hybrid resin.

6.5 Production Example 5 of Resin

Resin 10

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers (an alcohol component and a carboxylic acid component) and an esterification catalyst, as listed in Table 6-1, and the mixture was subjected to a reaction at 180° C. for 2 hours in a nitrogen atmosphere, then heated from 180° to 210° C. at a rate of 5° C./hr, and thereafter subjected to a polycondensation reaction at 210° C. until a conversion rate reached 90%. Thereafter, the reaction mixture was subjected to a reaction at 20 kPa until a softening point given in Table 6-1 was reached.

6.6 Production Example 6 of Resins

Resins 13 and 14

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers (an alcohol component and a carboxylic acid component) other than trimellitic anhydride, and an esterification catalyst, as listed in Table 6-2, and the mixture was subjected to a reaction at 180° C. for 2 hours in a nitrogen atmosphere, thereafter heated from 180° to 230° C. at a rate of 5° C./hr, and then subjected to a polycondensation reaction at 230° C. until a conversion rate reached 90%. Further, trimellitic anhydride was added thereto, the mixture was subjected to a reaction at 210° C. and a normal pressure over 1 hour, and then subjected to a reaction at 10 kPa until a softening point given in Table 6-2 was reached, to provide polyesters.

6.7 Production Example 7 of Resin

Resin 15

A 5-liter four neck flask equipped with a dehydration tube equipped with a nitrogen inlet tube, a stirrer, and a thermocouple was charged with raw material monomers other than trimellitic anhydride, and an esterification catalyst, as listed in Table 6-2, and the mixture was subjected to a polycondensation reaction at 235° C. until a conversion rate reached 90% in a nitrogen atmosphere, and further subjected to a reaction at 235° C. and 8.0 kPa for 1 hour. Thereafter, the mixture was cooled to 210° C., trimellitic anhydride as listed in Table 6-2 was added thereto, the mixture was subjected to a reaction at 210° C. and a normal pressure for 1 hour, and then subjected to a reaction at 10 kPa until a softening point given in Table 6-2 was reached, to provide a polyester.

TABLE 6-1

|  | Resin 1 Amount Used | | | Resin 2 Amount Used | | | Resin 3 Amount Used | | | Resin 4 Amount Used | | |
| --- | --- | --- | --- | --- | --- | --- | --- | --- | --- | --- | --- | --- |
|  | g | mol | molar ratio | g | mol | molar ratio | g | mol | molar ratio | g | mol | molar ratio |
| Alcohol Component | | | | | | | | | | | | |
| 1,2-Propanediol | 1064 | 14 | 70 | 1064 | 14 | 70 | — | — | — | 798 | 10.5 | 70 |
| 2,3-Butanediol | 540 | 6 | 30 | 540 | 6 | 30 | — | — | — | 405 | 4.5 | 30 |
| BPA-PO[1] | — | — | — | — | — | — | 2450 | 7 | 70 | — | — | — |
| BPA-EO[2] | — | — | — | — | — | — | 975 | 3 | 30 | — | — | — |
| Coniferyl Alcohol[3] | — | — | — | — | — | — | — | — | — | — | — | — |
| Sinapyl Alcohol[3] | — | — | — | — | — | — | — | — | — | — | — | — |
| Carboxylic Acid Component | | | | | | | | | | | | |
| Ferulic Acid[3] | 1940 | 10 | 50 | 1552 | 8 | 40 | 970 | 5 | 50 | — | — | — |
| Syringic Acid[3] | — | — | — | — | — | — | — | — | — | 1485 | 7.5 | 50 |
| Terephthalic Acid | 1992 | 12 | 60 | 1660 | 10 | 50 | 996 | 6 | 60 | 1494 | 9 | 60 |
| Alkenylsuccinic Anhydride A | — | — | — | 1072 | 4 | 20 | — | — | — | — | — | — |
| Trimellitic Anhydride | 384 | 2 | 10 | 384 | 2 | 10 | 192 | 1 | 10 | 288 | 1.5 | 10 |
| Fumaric Acid | — | — | — | — | — | — | — | — | — | — | — | — |
| Esterification Catalyst (including promoter) | | | | | | | | | | | | |
| Tin(II) 2-Ethylhexanoate | 29.6 | — | — | 31.4 | — | — | 27.9 | — | — | 22.4 | — | — |
| Pyrogallic Acid | 3.0 | — | — | 3.1 | — | — | 2.8 | — | — | 2.2 | — | — |
| Polymerization Inhibitor | | | | | | | | | | | | |
| tert-Butyl Catechol | — | — | — | — | — | — | — | — | — | — | — | — |
| Softening Point (° C.) | | 104.2 | | | 103.4 | | | 100.6 | | | 105.9 | |
| Glass Transition Temp. (° C.) | | 60.2 | | | 55.4 | | | 60.1 | | | 58.6 | |
| Acid Value (mgKOH/g) | | 20.6 | | | 15.6 | | | 18.6 | | | 22.4 | |
| Hydroxyl Value (mgKOH/g) | | 48.9 | | | 44.2 | | | 35.8 | | | 51.2 | |

|  | Resin 5 Amount Used | | | Resin 6 Amount Used | | | Resin 7 Amount Used | | |
| --- | --- | --- | --- | --- | --- | --- | --- | --- | --- |
|  | g | mol | molar ratio | g | mol | molar ratio | g | mol | molar ratio |
| Alcohol Component | | | | | | | | | |
| 1,2-Propanediol | 1064 | 14 | 70 | 1064 | 14 | 70 | 798 | 10.5 | 70 |
| 2,3-Butanediol | 360 | 4 | 20 | 360 | 4 | 20 | 405 | 4.5 | 30 |
| BPA-PO[1] | — | — | — | — | — | — | — | — | — |
| BPA-EO[2] | — | — | — | — | — | — | — | — | — |
| Coniferyl Alcohol[3] | 720 | 4 | 20 | — | — | — | — | — | — |
| Sinapyl Alcohol[3] | — | — | — | 840 | 4 | 20 | — | — | — |
| Carboxylic Acid Component | | | | | | | | | |
| Ferulic Acid[3] | — | — | — | — | — | — | 1455 | 7.5 | 50 |
| Syringic Acid[3] | — | — | — | — | — | — | — | — | — |
| Terephthalic Acid | 2324 | 14 | 70 | 2324 | 14 | 70 | 1494 | 9 | 60 |
| Alkenylsuccinic Anhydride A | — | — | — | — | — | — | — | — | — |
| Trimellitic Anhydride | 384 | 2 | 10 | 384 | 2 | 10 | 288 | 1.5 | 10 |
| Fumaric Acid | — | — | — | — | — | — | 348 | 3 | 20 |
| Esterification Catalyst (including promoter) | | | | | | | | | |
| Tin(II) 2-Ethylhexanoate | 24.3 | — | — | 24.9 | — | — | 23.9 | — | — |
| Pyrogallic Acid | 2.4 | — | — | 2.5 | — | — | 2.4 | — | — |
| Polymerization Inhibitor | | | | | | | | | |
| tert-Butyl Catechol | — | — | — | — | — | — | 2.4 | — | — |
| Softening Point (° C.) | | 103.6 | | | 101.8 | | | 102.5 | |
| Glass Transition Temp. (° C.) | | 61.6 | | | 61 | | | 56.4 | |
| Acid Value (mgKOH/g) | | 24.8 | | | 27.8 | | | 25.3 | |
| Hydroxyl Value (mgKOH/g) | | 46.3 | | | 46.6 | | | 40.1 | |

[1] Polyoxypropylene(2.2)-2,2-bis(4-hydroxyphenyl)propane
[2] Polyoxyethylene(2.0)-2,2-bis(4-hydroxyphenyl)propane
[3] Aromatic compound represented by the formula (Ia)

TABLE 6-2

|  | Resin 8 Amount Used | | | Resin 10 Amount Used | | | Resin 11 Amount Used | | | Resin 12 Amount Used | | |
|---|---|---|---|---|---|---|---|---|---|---|---|---|
|  | g | mol | molar ratio | g | mol | molar ratio | g | mol | molar ratio | g | mol | molar ratio |
| Alcohol Component | | | | | | | | | | | | |
| 1,2-Propanediol | 1140 | 15 | 100 | 798 | 10.5 | 70 | 798 | 10.5 | 70 | 798 | 10.5 | 70 |
| 2,3-Butanediol | — | — | — | 405 | 4.5 | 30 | 405 | 4.5 | 30 | 270 | 3 | 20 |
| BPA-PO[1] | — | — | — | — | — | — | — | — | — | — | — | — |
| BPA-EO[2] | — | — | — | — | — | — | — | — | — | — | — | — |
| Coniferyl Alcohol[3] | — | — | — | — | — | — | — | — | — | 540 | 3 | 20 |
| Sinapyl Alcohol[3] | — | — | — | — | — | — | — | — | — | — | — | — |
| Carboxylic Acid Component | | | | | | | | | | | | |
| Ferulic Acid[3] | 873 | 4.5 | 30 | 4365 | 22.5 | 150 | 727.5 | 3.75 | 25 | 1455 | 7.5 | 50 |
| Syringic Acid[3] | — | — | — | — | — | — | 742.5 | 3.75 | 25 | — | — | — |
| Terephthalic Acid | 1245 | 7.5 | 50 | — | — | — | 1494 | 9 | 60 | 1494 | 9 | 60 |
| Alkenylsuccinic Anhydride A | — | — | — | — | — | — | — | — | — | — | — | — |
| Trimellitic Anhydride | 576 | 3 | 20 | — | — | — | 288 | 1.5 | 10 | 288 | 1.5 | 10 |
| Fumaric Acid | — | — | — | — | — | — | — | — | — | — | — | — |
| Esterification Catalyst (including promoter) | | | | | | | | | | | | |
| Tin(II) 2-Ethylhexanoate | 19.2 | — | — | 27.8 | — | — | 22.3 | — | — | 24.2 | — | — |
| Pyrogallic Acid | 1.9 | — | — | 2.8 | — | — | 2.2 | — | — | 2.4 | — | — |
| Polymerization Inhibitor | | | | | | | | | | | | |
| tert-Butyl Catechol | — | | | — | | | — | | | — | | |
| Softening Point (° C.) | 143.6 | | | 96.2 | | | 103.7 | | | 102.3 | | |
| Glass Transition Temp. (° C.) | 67.3 | | | 51.3 | | | 58.4 | | | 56.6 | | |
| Acid Value (mgKOH/g) | 18.5 | | | 11.2 | | | 24.9 | | | 21.3 | | |
| Hydroxyl Value (mgKOH/g) | 47.7 | | | 88.4 | | | 33.3 | | | 42.1 | | |

|  | Resin 13 Amount Used | | | Resin 14 Amount Used | | | Resin 15 Amount Used | | |
|---|---|---|---|---|---|---|---|---|---|
|  | g | mol | molar ratio | g | mol | molar ratio | g | mol | molar ratio |
| Alcohol Component | | | | | | | | | |
| 1,2-Propanediol | 912 | 12 | 80 | 912 | 12 | 80 | — | — | — |
| 2,3-Butanediol | 270 | 3 | 20 | 270 | 3 | 20 | — | — | — |
| BPA-PO[1] | — | — | — | — | — | — | 2450 | 7 | 70 |
| BPA-EO[2] | — | — | — | — | — | — | 975 | 3 | 30 |
| Coniferyl Alcohol[3] | — | — | — | — | — | — | — | — | — |
| Sinapyl Alcohol[3] | — | — | — | — | — | — | — | — | — |
| Carboxylic Acid Component | | | | | | | | | |
| Ferulic Acid[3] | — | — | — | — | — | — | — | — | — |
| Syringic Acid[3] | — | — | — | — | — | — | — | — | — |
| Terephthalic Acid | 1992 | 12 | 80 | 1743 | 10.5 | 70 | 1328 | 8 | 80 |
| Alkenylsuccinic Anhydride A | — | — | — | — | — | — | — | — | — |
| Trimellitic Anhydride | 288 | 1.5 | 10 | 576 | 3 | 20 | 192 | 1 | 10 |
| Fumaric Acid | — | — | — | — | — | — | — | — | — |
| Esterification Catalyst (including promoter) | | | | | | | | | |
| Tin(II) 2-Ethylhexanoate | 17.3 | — | — | 17.5 | — | — | 24.7 | — | — |
| Pyrogallic Acid | 1.7 | — | — | 1.8 | — | — | 2.5 | — | — |
| Polymerization Inhibitor | | | | | | | | | |
| tert-Butyl Catechol | — | | | — | | | — | | |
| Softening Point (° C.) | 103.5 | | | 145.9 | | | 103.5 | | |
| Glass Transition Temp. (° C.) | 58.4 | | | 66.9 | | | 62.3 | | |
| Acid Value (mgKOH/g) | 37.7 | | | 30.5 | | | 30.8 | | |
| Hydroxyl Value (mgKOH/g) | 48.2 | | | 45.5 | | | 42.5 | | |

[1] Polyoxypropylene(2.2)-2,2-bis(4-hydroxyphenyl)propane
[2] Polyoxyethylene(2.0)-2,2-bis(4-hydroxyphenyl)propane
[3] Aromatic compound represented by the formula (Ia)

TABLE 6-3

| | Resin 9 Amount Used | | |
|---|---|---|---|
| | g | mol | ratio |
| Raw Material Monomers of Polyester (P) | | | molar ratio |
| Alcohol Component | | | |
| 1,2-Propanediol | 789 | 10.5 | 70 |
| 2,3-Butanediol | 405 | 5.3 | 30 |
| Carboxylic Acid Component | | | |
| Ferulic Acid[1)] | 1455 | 7.3 | 50 |
| Terephthalic Acid | 1245 | 7.5 | 50 |
| Trimellitic Anhydride | 288 | 1.5 | 10 |
| Esterification Catalyst (including promoter) | | | |
| Tin(II) 2-Ethylhexanoate | 21.2 | — | — |
| Pyrogallic Acid | 2.1 | — | — |
| Dually Reactive Monomer | | | |
| Acrylic Acid | 55.8 | 0.9 | 6 |
| Raw Material Monomers of Vinyl Resin (V) | | | weight ratio |
| Styrene | 922 | — | 84 |
| 2-Ethylhexyl Acrylate | 176 | — | 16 |
| Polymerization Initiator | | | |
| Dibutyl Peroxide | 44 | — | 4 |
| Total Weight of P/Total Weight of V | | | 4 |
| Softening Point (° C.) | | | 103.4 |
| Glass Transition Temp. (° C.) | | | 59.1 |
| Acid Value (mgKOH/g) | | | 25.6 |
| Hydroxyl Value (mgKOH/g) | | | 49.6 |

[1)]Aromatic compound represented by the formula (Ia)

6.8 Examples 1 to 20 and Comparative Examples 1 and 2

[Preparation of Resin Dispersion]

To a 5-L vessel equipped with a stirrer, a reflux condenser, a dropping funnel, a thermometer and a nitrogen inlet tube, 600 g of methyl ethyl ketone was supplied, and 200 g of a resin binder, as listed in Table 6-4, was added thereto at room temperature to dissolve. Ten grams of triethylamine was added to the resulting solution to neutralize the solution, and subsequently 2,000 g of ion-exchanged water was added thereto. Thereafter, methyl ethyl ketone was distilled off from the mixture at a stirring rate of 250 r/min at a temperature of 50° C. or less under a reduced pressure, to provide a self-dispersible aqueous dispersion of resin particles (resin content: 9.6% by weight (on a solid basis)). Polyester particles (primary particles) dispersed in the resulting resin dispersion had an average particle size (volume-median particle size) of 0.3 μm.

[Preparation of Colorant Dispersion]

Fifty grams of a colorant as listed in Table 6-4, 5 g of a nonionic surfactant (EMULGEN 150, manufactured by KAO Corporation, polyoxyethylene lauryl ether, HLB: 18.4, cloud point: 100° C. or more) and 200 g of ion-exchanged water were mixed, and copper phthalocyanine was dissolved. The mixture was dispersed for 10 minutes with a homogenizer to provide a colorant dispersion in which a pigment was dispersed in an average particle size (volume-median particle size) of 120 nm.

[Preparation of Releasing Agent Dispersion]

Fifty grams of a releasing agent as listed in Table 6-4, 5 g of a cationic surfactant (SANISOL B50, manufactured by KAO Corporation) and 200 g of ion-exchanged water were heated to 95° C., and a paraffin wax was dispersed with a homogenizer. Thereafter, the mixture was subjected to a dispersion treatment with a pressure jetting homogenizer, to provide a releasing agent dispersion in which the paraffin wax was dispersed in an average particle size (volume-median particle size) of 550 nm.

[Preparation of Charge Control Agent Dispersion]

Fifty grams of a charge control agent as listed in Table 6-4, 5 g of a nonionic surfactant (EMULGEN 150, manufactured by KAO Corporation, polyoxyethylene lauryl ether, HLB: 18.4, cloud point: 100° C. or more) and 200 g of ion-exchanged water were mixed, and the mixture was dispersed for 10 minutes using glass beads with a sand grinder, to prepare a charge control agent dispersion in which the charge control agent was dispersed in an average particle size (volume-median particle size) of 500 nm.

[Colorant]
Black pigment: "Mougl-L" (manufactured by Cabot Corporation), carbon black
Cyan pigment: "ECB-301" (manufactured by DAIN-ICHISEIKA COLOR & CHEMICALS MFG. CO.), Pigment Blue 15:3
Magenta pigment: "Super Magenta R" (manufactured by DIC Corporation), Pigment Red 122
Yellow pigment: "Paliotol Yellow D1155" (manufactured by BASF), Pigment Yellow 185

[Releasing Agent]
Wax-A: "Hiwax NP-056" (manufactured by MITSUI CHEMICALS, INC.), polypropylene wax, melting point 125° C.
Wax-B: "HNP-9" (manufactured by Nippon Seiro), paraffin wax, melting point 75° C.

[Colorant]
Black pigment: "Mougl-L" (manufactured by Cabot Corporation), carbon black
Cyan pigment: "ECB-301" (manufactured by DAIN-ICHISEIKA COLOR & CHEMICALS MFG. CO.), Pigment Blue 15:3
Magenta pigment: "Super Magenta R" (manufactured by DIC Corporation), Pigment Red 122
Yellow pigment: "Paliotol Yellow D1155" (manufactured by BASF), Pigment Yellow 185

[Releasing Agent]
Wax-A: "Hiwax NP-056" (manufactured by MITSUI CHEMICALS, INC.), polypropylene wax, melting point: 125° C.
Wax-B: "HNP-9" (manufactured by Nippon Seiro), paraffin wax, melting point: 75° C.

[Aggregating Step]

Four-hundred and ninety grams of the resulting resin particle dispersion, 20 g of colorant dispersion, 15 g of a releasing agent dispersion, 7 g of charge control agent dispersion and 2 g of a cationic surfactant (SANISOL B50, manufactured by KAO Corporation) were mixed in a round-shaped stainless steel flask with a homogenizer to disperse. Thereafter, the dispersion was heated to 48° C., while stirring the contents inside the flask in a heating oil bath. Further, after the dispersion was kept at 48° C. for 1 hour, it was confirmed that aggregated particles having an average particle size (volume-median particle size) of 6.0 μm were formed.

[Unifying Step]

Three grams of an anionic surfactant (PELEX SS-L, manufactured by KAO Corporation) was added to the aggregated particle dispersion in which the aggregated particles were formed, and thereafter the above-mentioned stainless steel flask was equipped with a reflux tube. The dispersion was heated to 80° C. at a rate of 5° C./min while continuously stirring, and kept thereat for 5 hours, to unify and fuse the aggregated particles. Thereafter, the unified particles were cooled, filtered, and sufficiently washed with ion-exchanged water and dried, to provide colored powder of fine resin particles. The resulting colored powder of fine resin particles had a volume-median particle size ($D_{50}$) of 6.3 μm.

[Surface-Treating Step]

To 100 parts by weight of the resulting colored powder of fine resin particles was added 1.0 part by weight of an external additive, and the mixture was mixed with a Henschel mixer and subjected to an external addition treatment, to provide a cyan toner. The resulting cyan toner had a volume-median particle size ($D_{50}$) of 6.5 μm.

The colorant, the releasing agent, the charge control agent, and the external additive used in each of Examples and Comparative Examples are as following.

[Colorant]
Black pigment: "Mougl-L" (manufactured by Cabot Corporation), carbon black
Cyan pigment: "ECB-301" (manufactured by DAINICHISEIKA COLOR & CHEMICALS MFG. CO.), Pigment Blue 15:3
Magenta pigment: "Super Magenta R" (manufactured by DIC Corporation), Pigment Red 122
Yellow pigment: "Paliotol Yellow D1155" (manufactured by BASF), Pigment Yellow 185

[Releasing Agent]
Wax-A: "Hiwax NP-056" (manufactured by MITSUI CHEMICALS, INC.), polypropylene wax, melting point: 125° C.
Wax-B: "HNP-9" (manufactured by Nippon Seiro), paraffin wax, melting point: 75° C.

[Charge Control Agent]
CCA-A: "BONTRON S-34" (manufactured by Orient Chemical Co. Ltd.), negatively chargeable charge control agent
CCA-B: "BONTRON N-04" (manufactured by Orient Chemical Co. Ltd.), positively chargeable charge control agent
CCA-C: "LR-147" (manufactured by Nippon Carlit, Ltd.), negatively chargeable charge control agent
CCA-D: "BONTRON E-84" (manufactured by Orient Chemical Co. Ltd.), negatively chargeable charge control agent

[External Additive]
Silica-A: "R-972" (manufactured by Nippon Aerosil Co., Ltd.), negatively chargeable hydrophobic silica, average particle size: 16 nm, hydrophobic treatment agent: DMDS (dimethyldichlorosilane)
Silica-B: "HDK H3050VP" (manufactured by Clariant GmbH), positively chargeable hydrophobic silica, average particle size: 8 nm, hydrophobic treatment agent: aminosilane
Silica-C: "SI-Y" (manufactured by Nippon Aerosil Co., Ltd.), negatively chargeable hydrophobic silica, average particle size: 40 nm, hydrophobic treatment agent: dimethylsilicone oil 6.9 Test Example 1

Low-Temperature Fixing Ability

The toner was loaded on a copy machine "AR-505" (manufactured by Sharp Corporation), of which fixing device was modified so that fixing could be carried out outside the machine, provided that the evaluation of Example 15 was made using a modified apparatus of nonmagnetic monocomponent development method printer "HL-2040" (manufactured by Brother Industries Ltd.), to provide unfixed images. While sequentially raising the temperature of a fixing roller from 100° to 240° C. in an increment of 10° C., the unfixed images were subjected to a fixing test at each temperature with a fixing device (fixing speed: 390 mm/sec) adjusted so that a total fixing pressure was 40 kgf. "UNICEF Cellophane" tape (MITSUBISHI PENCIL CO., LTD., width: 18 mm, JIS Z-1522) was adhered to the fixed images, and the resulting fixed images were allowed to pass through a fixing roller set at 30° C., and the tape was then removed. The optical reflective densities of the image before adhesion of the tape and after removal of the tape were measured with a reflective densitometer "RD-915" (manufactured by Macbeth Process Measurements Co.). The temperature of a fixing roller at which the ratio of the optical reflective densities (after removal of the tape/before adhesion of the tape) initially exceeds 90% is defined as the lowest fixing temperature. The low-temperature fixing ability was evaluated according to the following evaluation criteria. The results are shown in Table 6-4. Here, the paper used in the fixing test was CopyBond SF-70NA (75 g/m$^2$), manufactured by Sharp Corporation.

[Evaluation Criteria]
A: Lowest fixing temperature being lower than 150° C.;
B: Lowest fixing temperature being 150° C. or higher and lower than 170° C.; and
C: Lowest fixing temperature being 170° C. or higher.

6.10 Test Example 2

Storage Ability

Four grams of a toner was allowed to stand for 72 hours under environmental conditions of a temperature of 55° C. and relative humidity of 60%. After allowing the toner to stand, the extent of generation of toner aggregation was visually observed, and the storage ability was evaluated in accordance with the following evaluation criteria. The results are shown in Table 6-4.

[Evaluation Criteria]
A: The aggregation is not found at all even after 72 hours.
B: Although the aggregation is not found after 48 hours, the aggregation is found after 72 hours.
C: The aggregation is found within 48 hours.

6.11 Test Example 3

Initial Rise in Triboelectric Charging

A 50 ml polyethylene bottle was charged with 0.6 g of a toner and 19.4 g of a silicone ferrite carrier (manufactured by Kanto Denka Kogyo, average particle size: 90 μm), provided that in Example 15 a carrier was changed to "P-01" (ferrite carrier: standard product of Image Society of Japan, average particle size: 70 μm), and the components were mixed with a ball-mill at a rate of 250 r/min for 10 minutes, and triboelectric charges at the time of 1 minute and 10 minutes were determined with a q/m meter (manufactured by EPPING).

After a given period of mixing time, a developer in defined amounts was supplied into a cell provided in the q/m meter, and only the toner was aspirated for 90 seconds with the above-mentioned measurement apparatus through a sieve having a sieve opening of 32 μm (made of stainless steel, twilled, wire diameter: 0.0035 mm). The voltage change generated on the carrier at this time was monitored, and initial rise in triboelectric charging was evaluated in accordance with the following evaluation criteria. The results are shown in Table 6-4.

[Evaluation Criteria]

A value for (triboelectric charges at a mixing time of 1 minute)/(triboelectric charges at a mixing time of 10 minutes) is:

A: 0.95 or more
B: 0.9 or more and less than 0.95
C: less than 0.9

6.12 Test Example 4

Triboelectric Stability under High-Temperature, High-Humidity Conditions

A 50 ml polyethylene bottle was charged with 0.6 g of a toner and 19.4 g of a silicone ferrite carrier (manufactured by Kanto Denka Kogyo, average particle size: 90 μm) (provided that, in Example 15, carrier was changed to "P-01" (ferrite carrier: Image Society of Japan standard product, average particle size: 70 μm)) at a temperature of 32° C. and relative humidity of 85%, and the contents were mixed with a ball-mill at a rate of 250 r/min, and triboelectric charges of the toner were determined with a Q/M meter (manufactured by EPPING) in according with the following method.

After a given period of mixing time, a mixture of a toner and a carrier in defined amounts was supplied into a cell provided in the Q/M meter, and only the toner was aspirated for 90 seconds through a sieve having a sieve opening of 32 μm (made of stainless steel, twilled, wire diameter: 0.0035 mm). The voltage change generated on the carrier at this time was monitored, and the value of [Total Electric Charges (μC) After 90 Seconds/Weight (g) of Toner Aspirated] was obtained as triboelectric charges (μC/g). A ratio of triboelectric charges after a 60-second mixing time to triboelectric charges after a 600-second mixing time, i.e. triboelectric charges after 60-second mixing time/triboelectric charges after 600-second mixing time, was calculated, and triboelectric stability was evaluated in accordance with the following criteria. The results are shown in Table 6-4.

[Evaluation Criteria]

A: 0.8 or more
B: 0.6 or more and less than 0.8
C: less than 0.6

6.13 Test Example 5

Resistance to Background Fogging

A toner was loaded to "PAGEPRESTO N-4" (manufactured by CASIO COMPUTER CO., LTD., fixing: contact fixing method, nonmagnetic monocomponent development method) (provided that the evaluation of Example 15 was made using a modified apparatus with nonmagnetic monocomponent development method printer "HL-2040" (manufactured by Brother Industries Ltd.)), and the steps up to transferring were carried out, and fixing was carried out with an external fixing device. A toner was loaded to this apparatus, and printing was carried out for 2,000 sheets. Thereafter, a solid image of a square having 2 cm each side was printed at a position 2 cm away from the top center of an A4 sheet (210 mm×297 mm), and background fogging was evaluated in accordance with the method as shown below using the above A4 sheet.

(1) In a part where background fogging was generated by solid image printing at a position of additionally 2 cm below a distance corresponding to a circumference of a developer roller (7.2 cm) from the top center of the sheet, i.e. 9.2 cm from the top center, L* values, a* values, and b* values were determined at four (4) points taken along the sides of the square, 0.5 cm away from each of the four corners, within the square having 2 cm each side with a color-difference-meter "CR-321" (manufactured by Minolta), and an average for each value was calculated.

(2) L* values, a* values, and b* values were determined at 4 points in the blank sheet portion at distances 4 cm and 8 cm to the left and to the right, away from the center located 10.2 cm away from the top end of the image in the same manner as in (1), and an average for each value was calculated.

A difference in the two values in (1) and (2) (ΔE) was obtained by the following formula, and the extent of the generation of background fogging was evaluated in accordance with the following evaluation criteria.

The results are shown in Table 6-4.

$$\Delta E = \sqrt{(L_1^* - L_2^*)^2 + (a_1^* - a_2^*)^2 + (b_1^* b_2^*)^2} \qquad [\text{Math 2}]$$

wherein $L_1^*$, $a_1^*$ and $b_1^*$ are each of the measurement values in the item (1), and each of $L_2^*$, $a_2^*$ and $b_2^*$ are each of the measurement values in the item (2).

[Evaluation Criteria]

A: ΔE is less than 0.5.
B: ΔE is 0.5 or more and less than 1.
C: ΔE is 1 or more.

TABLE 6-4

| | Resin Binder | | | | | | | | |
| | Resin | | Mixing Weight Ratio | | Amount of Aromatic Compound (Ia) Contained | | | Releasing | Charge Control |
| No. 6- | Resin L | Resin H | Resin L | Resin H | Resin L | Resin H | Colorant | Agent | Agent |
|---|---|---|---|---|---|---|---|---|---|
| Ex. 1 | Resin 1 | Resin 8 | 70 | 30 | 23 | 15 | Black# | WaX-A | CCA-A |
| Ex. 2 | Resin 2 | Resin 8 | 70 | 30 | 18 | 15 | Black# | Wax-A | CCA-A |
| Ex. 3 | Resin 3 | Resin 8 | 70 | 30 | 23 | 15 | Black# | Wax-A | CCA-A |
| Ex. 4 | Resin 4 | Resin 8 | 70 | 30 | 23 | 15 | Black# | Wax-A | CCA-A |
| Ex. 5 | Resin 5 | Resin 8 | 70 | 30 | 11 | 15 | Black# | Wax-A | CCA-A |
| Ex. 6 | Resin 6 | Resin 8 | 70 | 30 | 11 | 15 | Black# | Wax-A | CCA-A |
| Ex. 7 | Resin 7 | Resin 8 | 70 | 30 | 21 | 15 | Black# | Wax-A | CCA-A |
| Ex. 8 | Resin 1 | — | 100 | 0 | 23 | — | Black# | Wax-A | CCA-A |
| Ex. 9 | — | Resin 8 | 0 | 100 | — | 15 | Black# | Wax-A | CCA-A |
| Ex. 10 | Resin 9 | Resin 8 | 70 | 30 | 23 | 15 | Black# | Wax-A | CCA-A |
| Ex. 11 | Resin 10 | Resin 8 | 70 | 30 | 60 | 15 | Black# | Wax-A | CCA-A |
| Ex. 12 | Resin 11 | Resin 8 | 70 | 30 | 23 | 15 | Black# | Wax-A | CCA-A |
| Ex. 13 | Resin 12 | Resin 8 | 70 | 30 | 30 | 15 | Black# | Wax-A | CCA-A |
| Ex. 14 | Resin 1 | Resin 8 | 30 | 70 | 23 | 15 | Black# | Wax-A | CCA-A |

TABLE 6-4-continued

| | | | | | | | | | |
|---|---|---|---|---|---|---|---|---|---|
| Ex. 15 | Resin 1 | Resin 8 | 70 | 30 | 23 | 15 | Black# | Wax-A | CCA-B |
| Ex. 16 | Resin 1 | Resin 8 | 70 | 30 | 23 | 15 | Cyan# | Wax-B | CCA-C |
| Ex. 17 | Resin 1 | Resin 8 | 70 | 30 | 23 | 15 | Magenta# | Wax-B | CCA-D |
| Ex. 18 | Resin 1 | Resin 8 | 70 | 30 | 23 | 15 | Yellow# | Wax-B | CCA-C |
| Ex. 19 | Resin 1 | Resin 14 | 70 | 30 | 23 | 0 | Black# | Wax-A | CCA-A |
| Ex. 20 | Resin 13 | Resin 8 | 70 | 30 | 0 | 15 | Black# | Wax-A | CCA-A |
| Comp. Ex. 1 | Resin 13 | Resin 14 | 70 | 30 | 0 | 0 | Black# | Wax-A | CCA-A |
| Comp. Ex. 2 | Resin 15 | Resin 14 | 70 | 30 | 0 | 0 | Black# | Wax-A | CCA-A |

| No. 6- | External Additive | Low-Temp. Fixing Ability | Storage Ability | Initial Rise in Triboelectric Charging | Triboelectric Stability | Background Fogging |
|---|---|---|---|---|---|---|
| Ex. 1 | Silica-A | A | A | A | B | A |
| Ex. 2 | Silica-A | A | B | A | B | A |
| Ex. 3 | Silica-A | B | A | A | B | A |
| Ex. 4 | Silica-A | A | A | A | B | A |
| Ex. 5 | Silica-A | A | A | A | B | A |
| Ex. 6 | Silica-A | A | A | A | B | A |
| Ex. 7 | Silica-A | A | B | A | B | B |
| Ex. 8 | Silica-A | A | B | A | B | A |
| Ex. 9 | Silica-A | B | A | A | B | B |
| Ex. 10 | Silica-A | A | B | A | B | A |
| Ex. 11 | Silica-A | A | B | A | B | A |
| Ex. 12 | Silica-A | A | A | A | B | A |
| Ex. 13 | Silica-A | A | A | A | B | A |
| Ex. 14 | Silica-A | B | A | A | B | A |
| Ex. 15 | Silica-B | A | A | A | B | A |
| Ex. 16 | Silica-C | A | A | A | B | A |
| Ex. 17 | Silica-C | A | A | A | B | A |
| Ex. 18 | Silica-C | A | A | A | B | A |
| Ex. 19 | Silica-A | A | B | B | B | B |
| Ex. 20 | Silica-A | B | A | B | B | B |
| Comp. Ex. 1 | Silica-A | A | B | C | C | C |
| Comp. Ex. 2 | Silica-A | B | B | C | C | C |

Remarks 1) In the resin binder, Resin L is a resin having a softening point of 125° C. or less, and Resin H is a resin having a softening point exceeding 125° C.
Remarks 2) Amount of the aromatic compound represented by the formula (Ia) (% by mol) contained in a total amount of the carboxylic acid component and the alcohol component.
Added Remarks: Black#: black pigment, Cyan#: cyan pigment, Magenta#: magenta pigment, Yellow#: yellow pigment.

It can be seen from the above results that the toners of Examples 6-1 to 6-20 containing as a resin binder a polyester resin obtained using a specific aromatic compound as a carboxylic acid component and/or alcohol component are favorable in both low-temperature fixing ability and storage ability of toners, and further excellent in initial rise in triboelectric charging, triboelectric stability under high-temperature, high-humidity conditions and resistance to background fogging, as compared to the toners of Comparative Examples 6-1 and 6-2.

INDUSTRIAL APPLICABILITY

The toner for electrophotography containing a polyester resin for a toner of the present invention is suitably used for a resin binder of a toner used in developing and the like of latent images formed in electrophotography, electrostatic recording method, electrostatic printing method or the like.

The invention claimed is:

1. A polyester resin for a toner, obtained by a process comprising polycondensing a carboxylic acid component and an alcohol component, wherein at least one of the carboxylic acid component and the alcohol component comprises an aromatic compound represented by formula (Ia):

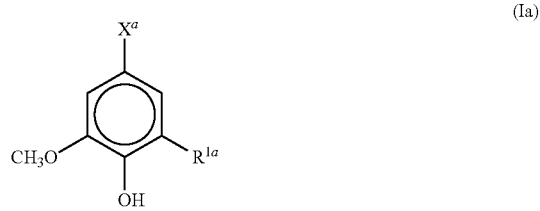

(Ia)

wherein $R^{1a}$ is a hydrogen atom, a hydroxyl group, or a methoxy group; and $X^a$ is a hydrogen atom, an aldehyde group, an allyl group, a vinyl group, a methoxy group, or a hydroxyl group or carboxyl group which may have a linking group.

2. The polyester resin for a toner according to claim 1, wherein the aromatic compound represented by formula (Ia) is present in an amount of from 0.5 to 80% by mol, of a total amount of the carboxylic acid component and the alcohol component constituting the polyester resin.

3. The polyester resin for a toner according to claim 1, wherein the linking group in $X^a$ is a divalent hydrocarbon group having 2 to 4 carbon atoms.

4. The polyester resin for a toner according to claim 1, wherein the carboxylic acid component comprises at least one succinic acid compound selected from the group consisting of an alkylsuccinic acid of which the alkyl moiety has 9 to 18 carbon atoms and an alkenylsuccinic acid of which the alkenyl moiety has 9 to 18 carbon atoms.

5. The polyester resin for a toner according to claim 4, wherein the succinic acid compound is present in an amount of from 3 to 60% by mol, relative to the total amount of the carboxylic acid component.

6. A polyester resin for a toner, obtained by a process comprising polycondensing a reaction product obtained by polycondensing of one or more aromatic compounds, represented by formula (Ib):

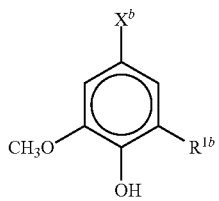

(Ib)

wherein $R^{1b}$ is a hydrogen atom, a hydroxyl group, or a methoxy group; and $X^b$ is a hydroxyl group or carboxyl group which may have a linking group, with
 at least one of a carboxylic acid component and an alcohol component.

7. The polyester resin for a toner according to claim 6, wherein the reaction product has a weight-average molecular weight of from 350 to 2000.

8. The polyester resin for a toner according to claim 6, wherein the linking group in $X^b$ in the formula (Ib) is an unsaturated divalent hydrocarbon group having 2 to 4 carbon atoms.

9. A polyester resin for a toner obtained by a process comprising polycondensing:
 (A) a reaction product obtained by reacting
  (a) an aromatic compound represented by formula (Ic):

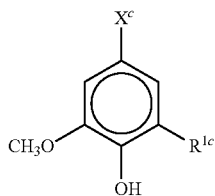

(Ic)

wherein $R^{1c}$ is a hydrogen atom, a hydroxyl group or a methoxy group; and $X^c$ is an unsaturated hydrocarbon group which may have a hydroxyl group or carboxyl group, and
  (b) a carboxylic acid having an unsaturated reactive group, with
 a carboxylic acid component, and
 an alcohol component.

10. The polyester resin for a toner according to claim 9, wherein the carboxylic acid having an unsaturated reactive group comprises at least one member selected from the group consisting of (meth)acrylic acid, fumaric acid, and maleic acid.

11. The polyester resin for a toner according to claim 9, wherein the unsaturated hydrocarbon group in the formula (Ic) has 2 to 4 carbon atoms.

12. A resin binder for use in a toner for electrophotography, comprising the polyester resin for a toner as defined in claim 1.

13. A resin binder for use in a toner for electrophotography comprising a high-softening point resin and a low-softening point resin, of which softening points differ by 10° C. or more, wherein at least one of the high-softening point resin and the low-softening point resin is the polyester resin as defined in claim 1.

14. A resin binder for use in a toner for electrophotography comprising an amorphous resin and a crystalline resin, wherein both of the amorphous resin and the crystalline resin are polycondensation resins obtained by a process comprising polycondensing an alcohol component and a carboxylic acid component, and wherein at least one of the amorphous resin and the crystalline resin is the polyester resin as defined in claim 1.

15. The resin binder according to claim 14, wherein the crystalline resin is a polycondensation resin in which at least one of the carboxylic acid component and the alcohol component comprises an aromatic compound represented by formula (Ia), wherein the aromatic compound represented by formula (Ia) is present in an amount of from 0.5 to 40% by mol of the raw material monomers for a crystalline resin.

16. The resin binder according to claim 14, wherein the amorphous resin is a polycondensation resin in which at least one of the carboxylic acid component and the alcohol component comprises an aromatic compound represented by formula (Ia), wherein the aromatic compound represented by formula (Ia) is present in an amount of from 0.5 to 80% by mol of the raw material monomers for an amorphous resin.

17. A toner for electrophotography comprising the resin binder as defined in claim 12.

18. A toner for electrophotography obtained by a method comprising forming particles from raw materials comprising a resin binder in an aqueous medium, wherein the resin binder comprises the polyester resin as defined in claim 1.

* * * * *